(12) United States Patent
Zhang et al.

(10) Patent No.: US 10,979,187 B2
(45) Date of Patent: Apr. 13, 2021

(54) REFERENCE SIGNAL TRANSMISSION METHOD AND APPARATUS

(71) Applicant: Huawei Technologies Co., Ltd., Shenzhen (CN)

(72) Inventors: Yongping Zhang, Beijing (CN); Jinnan Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 16/180,900

(22) Filed: Nov. 5, 2018

(65) Prior Publication Data
US 2019/0074947 A1  Mar. 7, 2019

Related U.S. Application Data

(63) Continuation of application No. PCT/CN2016/081341, filed on May 6, 2016.

(51) Int. Cl.
 *H04L 5/00* (2006.01)
 *H04B 7/04* (2017.01)

(52) U.S. Cl.
 CPC ............ *H04L 5/0048* (2013.01); *H04B 7/04* (2013.01); *H04L 5/0064* (2013.01); *H04L 5/0094* (2013.01)

(58) Field of Classification Search
 CPC ... H04L 5/0048; H04L 5/0053; H04L 5/0057; H04L 5/0051; H04L 1/20;
(Continued)

(56) References Cited

U.S. PATENT DOCUMENTS

| 2011/0116436 A1 | 5/2011 | Bachu et al. |
| 2013/0114425 A1 | 5/2013 | Sayana et al. |

(Continued)

FOREIGN PATENT DOCUMENTS

| CN | 101355412 A | 1/2009 |
| CN | 101499963 A | 8/2009 |

(Continued)

OTHER PUBLICATIONS

"CSI-RS design for 12 and 16 ports," 3GPP TSG RAN WG1 Meeting #82bis, Malmo, Sweden, R1-155836,, pp. 1-4, 3rd Generation Partnership Project, Valbonne, France (Oct. 5-9, 2015).

(Continued)

*Primary Examiner* — Awet Haile
(74) *Attorney, Agent, or Firm* — Leydig, Voit & Mayer, Ltd.

(57) ABSTRACT

This application provides a reference signal transmission method and an apparatus, to resolve a prior-art problem of relatively high overheads of resources occupied by transmitted reference signals in a communications system. The method includes: configuring, by a transmitting device, one reference signal group corresponding to one port in the first time symbol, and configuring one reference signal corresponding to the port in each of time symbols except the first time symbol. This reduces overheads of resources occupied by transmitted reference signals in the communications system and improves service data transmission efficiency while ensuring that a receiving device can obtain a channel parameter of the port.

7 Claims, 15 Drawing Sheets

(58) Field of Classification Search
CPC . H04W 72/0446; H04W 24/10; H04W 72/04; H04B 7/0413; H04B 17/309; H04J 11/005
See application file for complete search history.

(56) References Cited

U.S. PATENT DOCUMENTS

| | | | |
|---|---|---|---|
| 2014/0119228 A1 | 5/2014 | Wang et al. | |
| 2014/0314072 A1 | 10/2014 | Awad et al. | |
| 2016/0112173 A1* | 4/2016 | Wang | H04L 5/0048 370/329 |
| 2016/0301511 A1* | 10/2016 | Yoon | H04B 7/0626 |
| 2017/0202014 A1* | 7/2017 | Moon | H04L 47/824 |
| 2018/0070342 A1 | 3/2018 | Hoshino et al. | |
| 2018/0115919 A1 | 4/2018 | Kakishima et al. | |

FOREIGN PATENT DOCUMENTS

| | | |
|---|---|---|
| CN | 101771444 A | 7/2010 |
| CN | 102088434 A | 6/2011 |
| CN | 102422587 A | 4/2012 |
| CN | 103095631 A | 5/2013 |
| CN | 103475606 A | 12/2013 |
| CN | 103931133 A | 7/2014 |
| CN | 103944665 A | 7/2014 |
| CN | 104782054 A | 7/2015 |
| EP | 2456154 A2 | 5/2012 |
| EP | 2717621 A4 | 6/2014 |
| WO | 2010106729 A1 | 9/2010 |
| WO | 2014077742 A1 | 5/2014 |
| WO | 2015045696 A1 | 4/2015 |

OTHER PUBLICATIONS

"3rd Generation Partnership Project; Technical Specification Group Radio Access Network; Evolved Universal Terrestrial Radio Access (E-UTRA); Physical channels and modulation (Release 13)," 3GPP TS 36.211 V13.0.0, pp. 1-142, 3rd Generation Partnership Project, Valbonne, France (Dec. 2015).

* cited by examiner

801 A transmitting device obtains configuration information for a plurality of ports of the transmitting device, where the configuration information is used to indicate locations of resources occupied by reference signals corresponding to the plurality of ports 802 The transmitting device sends, on the resources that are indicated by the configuration information and that are occupied by the reference signals corresponding to the plurality of ports, the reference signals corresponding to the plurality of ports

FIG. 8

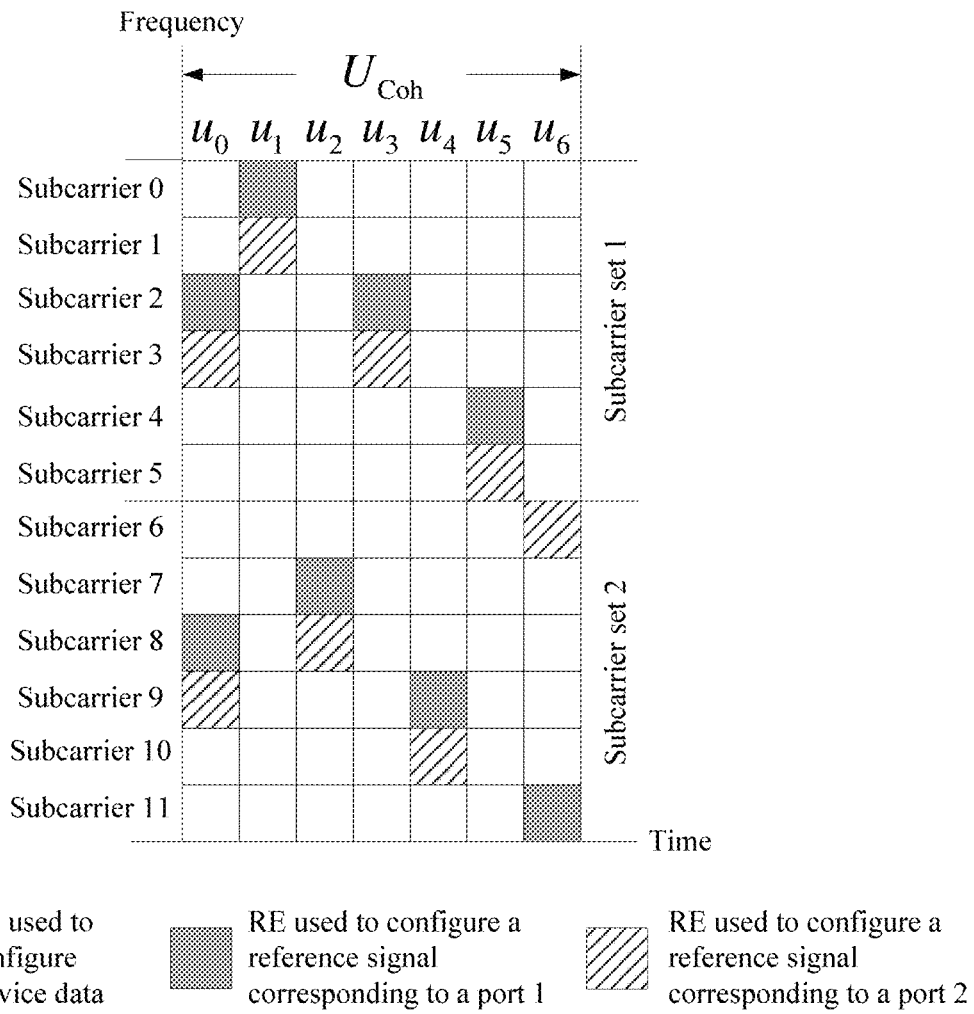

FIG. 9

REFERENCE SIGNAL TRANSMISSION METHOD AND APPARATUS

CROSS-REFERENCE TO RELATED APPLICATION

This application is a continuation of International Patent Application No. PCT/CN2016/081341, filed on May 6, 2016, the disclosure of which is hereby incorporated by reference in its entirety.

TECHNICAL FIELD

This application relates to the field of communications technologies, and in particular, to a reference signal transmission method and an apparatus.

BACKGROUND

With development of communications technologies, to increase a channel capacity and improve channel reliability, and further improve communication quality, a large quantity of wireless communications systems use a multiple-antenna technology, that is, a multiple input multiple output (MIMO) technology.

In a communications system using the MIMO technology, at least one crystal oscillator is usually used to provide an up-conversion/down-conversion carrier frequency signal source of a radio frequency channel during an up-conversion/down-conversion process. In an actual system, there is inevitably a defect in a crystal oscillator, and the defect in the crystal oscillator causes obvious random deviations of an output frequency of the crystal oscillator. These frequency deviations may be referred to as a phase noise (PN). When a carrier frequency used in the communications system is higher, impact of the PN is more obvious. To ensure service data transmission accuracy in the communications system, a receive end needs to be capable of tracking a phase noise status and compensating for an effect of a phase noise.

A phase noise changes rapidly. Using an orthogonal frequency-division multiplexing (OFDM) system as an example, phase noises are different even in adjacent OFDM symbols. In this case, in the communications system, a channel parameter that does not exceed a coherence bandwidth in frequency domain keeps unchanged in a coherence time (using an OFDM system as an example, the coherence time usually includes duration corresponding to a plurality of OFDM symbols). However, due to the phase noise that changes rapidly, to ensure that the receiving device can accurately receive data, the receiving device needs to be capable of jointly estimating changed phase noises corresponding to the OFDM symbols and the channel parameters within the different coherence bandwidths, that is, channel parameters, in the OFDM symbols, including the phase noises. A most direct method is configuring at least one reference signal in each OFDM symbol corresponding to each subband. The subband is obtained by dividing a bandwidth range allocated to the receiving device in the communications system, each subband includes a plurality of subcarrier, and a bandwidth of each subband is less than or equal to a coherence bandwidth.

For example, when a bandwidth range allocated by a communications system to the receiving device is divided into two subbands and each time period (one coherence time) includes seven OFDM symbols, the communications system needs to configure, specific to one port, at least one reference signal in each OFDM symbol corresponding to each subband. A specific manner of configuring a reference signal is shown in FIG. 1. It can be learnt from a reference-signal resource mapping diagram, specific to one port, shown in the figure that, reference signals are configured on at least 14 of 42 resource elements (REs). Consequently, reference-signal resource overheads are relatively high.

When there are a relatively large quantity of ports in a communications system, the communications system needs to configure a reference signal specific to each port in the foregoing manner. As a result, reference-signal resource overheads become considerably high.

SUMMARY

Embodiments of the present disclosure provide a reference signal transmission method and an apparatus, to resolve a prior-art problem of relatively high overheads of resources occupied by transmitted reference signals in a communications system.

According to a first aspect, an embodiment of the present disclosure provides a reference signal transmission method, where the method is applied to a transmitting device in a communications system. The method includes: determining, by the transmitting device by obtaining configuration information of a reference signal for a first port of the transmitting device, a location of a resource occupied by the reference signal corresponding to the first port; and sending, on the resource, the reference signal corresponding to the first port, where the configuration information includes: in time domain, a location of a first time symbol; and in frequency domain, a location of each subcarrier that is in a subcarrier group within a specified bandwidth range and that is corresponding to the first time symbol, and a location of a subcarrier that is within the bandwidth range and that is corresponding to each of time symbols, in a time period occupied by the resource, except the first time symbol; the subcarrier group includes a plurality of subcarriers; the bandwidth range is configured by the transmitting device; and the bandwidth range includes a plurality of subcarriers.

It can be learnt from the configuration information that one reference signal group is configured in the first time symbol and one reference signal is configured in each of time symbols except the first time symbol. Compared with the prior art in which at least one reference signal is configured in each OFDM symbol corresponding to each subband, in the foregoing method, on the premise that a receiving device can obtain a channel parameter of the first port, overheads of resources occupied by transmitted reference signals in the communications system can be reduced, so that service data transmission efficiency is improved.

In a possible design, the transmitting device may obtain the location of the first time symbol in the following two manners:

a first manner: obtaining, by the transmitting device, a port number of the first port, and determining, based on a stored correspondence between a port number and a location of a time symbol, the location of the first time symbol corresponding to the port number of the first port; or a second manner: determining, by the transmitting device, the location of the first time symbol based on any one or a combination of the following: the port number/of the first port, a timeslot number Slot_ID of the resource, a cell number Cell_ID of the transmitting device, and a receiving device number UE_ID.

The transmitting device can accurately obtain the location of the first time symbol in the foregoing two manners.

In a possible design, the location of the first time symbol satisfies the following formula:

$$u_{index}=\mathrm{mod}(X,U_{Coh})$$

where $u_{index}$ is the location of the first time symbol; $U_{Coh}$ is a quantity of time symbols included in the time period occupied by the resource; and X is 1, or a sum of 1 and any one or a combination of Slot_ID, Cell_ID, and UE_ID In the foregoing method, when a plurality of parameters used to calculate the location of the first time symbol include port numbers, because the port numbers are different, locations, obtained through calculation by the transmitting device, of first time symbols corresponding to the at least one port are different obviously. In this case, each port has a unique first time symbol, that is, a reference signal is configured specific to each port in a time division manner.

In a possible design, the location of the first time symbol satisfies the following formula:

$$u_{index}=\mathrm{mod}(Y,U_{Coh})$$

where $u_{index}$ is the location of the first time symbol; $U_{Coh}$ is a quantity of time symbols included in the time period occupied by the resource; and Y is any one of Slot_ID, Cell_ID, and UE_ID, a sum of any two of the three items, or a sum of the three items.

In the foregoing method, when a plurality of parameters used to calculate the location of the first time symbol do not include a port number, because other parameters are fixed values, locations, obtained through calculation by the transmitting device, of first time symbols corresponding to the at least one port are the same obviously. In this case, to avoid interference, in the first time symbol, subcarrier groups corresponding to the first time symbol corresponding to different ports are different, that is, a reference signal is configured specific to the at least one port in a frequency division manner.

In a possible design, the transmitting device determines, based on any one or a combination of the following: l, Slot_ID, Cell_ID, and UE_ID, the location of each subcarrier that is in the subcarrier group and that is corresponding to the first time symbol.

In a possible design, based on the foregoing design, the location of each subcarrier that is in the subcarrier group and that is corresponding to the first time symbol satisfies the following formula:

$$k1_{index}(n)=\mathrm{mod}(P,K_{SB})+(n-1)\cdot K_{SB}$$

where n=1, 2, ... N; N is a quantity of subcarriers that are in the subcarrier group and that are corresponding to the first time symbol; $k1_{index}(n)$ is a location of an $n^{th}$ subcarrier that is in the subcarrier group and that is corresponding to the first time symbol; $K_{SB}$ is a quantity of subcarriers included in each subcarrier set when the bandwidth range is averagely divided into a plurality of subcarrier sets; and P is any one of Slot_ID, Cell_ID, and UE_ID, a sum of any two of the three items, or a sum of the three items.

In a possible design, based on the foregoing design, the location of each subcarrier that is in the subcarrier group and that is corresponding to the first time symbol satisfies the following formula:

$$k1_{index}(n)=\mathrm{mod}(Q,K_{SB})+(n-1)\cdot K_{SB}$$

where n=1, 2, ... N; N is a quantity of subcarriers that are in the subcarrier group and that are corresponding to the first time symbol; $k1_{index}(n)$ is a location of an $n^{th}$ subcarrier that is in the subcarrier group and that is corresponding to the first time symbol; $K_{SB}$ is a quantity of subcarriers included in each subcarrier set when the bandwidth range is averagely divided into a plurality of subcarrier sets; and Q is 1, or a sum of 1 and any one or a combination of Slot_ID, Cell_ID, and UE_ID.

In a possible design, the transmitting device may determine, based on 1 or based on 1 and any one or a combination of the following: Slot_ID, Cell_ID, and UE_ID, the location of each subcarrier that is in the subcarrier group and that is corresponding to the first time symbol.

When the communications system uses the frequency division manner to configure a reference signal specific to each port, different ports are corresponding to a same first time symbol. Therefore, to avoid interference between the different ports, that reference signals corresponding to the different ports occupy different resources needs to be ensured. In this case, when calculating a location of the subcarrier that is in the subcarrier group and that is corresponding to the first time symbol corresponding to each port, the transmitting device needs to use a variable, that is, a port number, to ensure that interference does not occur between the different ports.

In a possible design, when the transmitting device determines, based on 1, the location of each subcarrier that is in the subcarrier group and that is corresponding to the first time symbol, the location of each subcarrier that is in the subcarrier group and that is corresponding to the first time symbol satisfies the following formula:

$$k1_{index}(n)=\mathrm{mod}(l,K_{SB})+(n-1)\cdot K_{SB}$$

where n=1, 2, ... N; N is a quantity of subcarriers that are in the subcarrier group and that are corresponding to the first time symbol; $k1_{index}(n)$ is a location of an n subcarrier that is in the subcarrier group and that is corresponding to the first time symbol; and $K_{SB}$ is a quantity of subcarriers included in each subcarrier set when the bandwidth range is averagely divided into a plurality of subcarrier sets.

In a possible design, when the transmitting device determines, based on 1 and any one or a combination of the following: Slot_ID, Cell_ID, and UE_ID, the location of each subcarrier that is in the subcarrier group and that is corresponding to the first time symbol, the location of each subcarrier that is in the subcarrier group and that is corresponding to the first time symbol satisfies the following formula:

$$k1_{index}(n)=\mathrm{mod}(l+P,K_{SB})+(n-1)\cdot K_{SB}$$

where n=1, 2, ... N; N is a quantity of subcarriers that are in the subcarrier group and that are corresponding to the first time symbol; $k1_{index}(n)$ is a location of an n subcarrier that is in the subcarrier group and that is corresponding to the first time symbol; $K_{SB}$ is a quantity of subcarriers included in each subcarrier set when the bandwidth range is averagely divided into a plurality of subcarrier sets; and P is any one of Slot_ID, Cell_ID, and UE_ID, a sum of any two of the three items, or a sum of the three items.

In a possible design, the obtaining, by the transmitting device, a location of a subcarrier that is within the bandwidth range and that is corresponding to each of time symbols in a time period except the first time symbol includes:

determining, by the transmitting device based on l and any one or a combination of the following: a location u of a second time symbol in the time period, Slot_ID, Cell_ID, and UE_ID, a location of a subcarrier that is within the bandwidth range and that is corresponding to the second time symbol, where the second time symbol is any time symbol in the time period other than the first time symbol.

In the foregoing method, a plurality of parameters used when the transmitting device calculates the location of the subcarrier corresponding to each of the other symbols include port numbers. Because the port numbers are different, locations, obtained through calculation by the transmitting device, of subcarriers corresponding to each of the other time symbols corresponding to the different ports are different obviously. In this case, interference between the different ports can be avoided.

In a possible design, the location of the subcarrier that is within the bandwidth range and that is corresponding to the second time symbol satisfies the following formula:

$$k2_{index}=\mathrm{mod}(l+R,K)$$

where $k2_{index}$ is the location of the subcarrier that is within the bandwidth range and that is corresponding to the second time symbol; R is any one of u, Slot_ID, Cell_ID, and UE_ID, a sum of any two or three of the four items, a sum of the four items, or $R=u\times K_{SB}+T$; T is any one of u, Slot_ID, Cell_ID, and UE_ID, a sum of any two of the four items, a sum of three of the four items, or a sum of the four items; $K_{SB}$ is a quantity of subcarriers included in each subcarrier set when the bandwidth range is averagely divided into a plurality of subcarrier sets; and K is a total quantity of subcarriers included within the bandwidth range.

According to a second aspect, an embodiment of the present disclosure further provides a reference signal transmission method, where the method is applied to a receiving device in a communications system, and the communications system further includes the transmitting device in the foregoing embodiment. The method includes: obtaining, by the receiving device, scheduling information of the transmitting device; obtaining configuration information of a reference signal for a first port based on the scheduling information; receiving, by the receiving device on a resource indicated by the configuration information, the reference signal corresponding to the first port that is sent by the transmitting device; performing, by the receiving device, channel estimation based on the received reference signal, determining a channel parameter of each subcarrier that is in a subcarrier group and that is corresponding to a first time symbol, and determining a channel parameter of a subcarrier corresponding to each of the other time symbols; and determining a channel parameter of the first port based on the channel parameter of each subcarrier that is in the subcarrier group and that is corresponding to the first time symbol and based on the channel parameter of the subcarrier corresponding to each of the other time symbols; where the configuration information includes: in time domain, a location of the first time symbol; and in frequency domain, a location of each subcarrier that is in the subcarrier group within a bandwidth range and that is corresponding to the first time symbol, and a location of the subcarrier that is within the bandwidth range and that is corresponding to each of time symbols, in a time period occupied by the resource, except the first time symbol; and a subcarrier group corresponding to the first time symbol corresponding to each port includes a plurality of subcarriers.

It can be learnt from the configuration information that one reference signal group is configured in the first time symbol and one reference signal is configured in each of time symbols except the first time symbol. Compared with the prior art in which at least one reference signal is configured in each OFDM symbol corresponding to each subband, in the foregoing method, on the premise that the receiving device can obtain the channel parameter of the first port, overheads of resources occupied by transmitted reference signals in the communications system can be reduced, so that service data transmission efficiency is improved.

In a possible design, the method for determining content in the configuration information by the receiving device is the same as that for determining corresponding content in the configuration information by the transmitting device.

In this way, it can be ensured that the configuration information obtained by the receiving device is the same as the configuration information obtained by the transmitting device, so as to ensure that the receiving device can accurately receive the reference signal that is on the resource indicated by the configuration information.

In a possible design, a quantity of a plurality of subcarrier sets that are obtained by dividing the bandwidth range is the same as a quantity of subcarriers that are included in the subcarrier group and that are corresponding to the first time symbol, and each subcarrier set includes one subcarrier that is in the subcarrier group and that is corresponding to the first time symbol; and the receiving device may determine, by using the following steps, the channel parameter of the first port based on the channel parameter of each subcarrier that is in the subcarrier group and that is corresponding to the first time symbol and based on the channel parameter of the subcarrier corresponding to each of the other time symbols:

using, by the receiving device, the channel parameter of each subcarrier that is in the subcarrier group and that is corresponding to the first time symbol, as a channel parameter of a subcarrier set to which each subcarrier that is in the subcarrier group and that is corresponding to the first time symbol belongs, and using the channel parameter of the subcarrier corresponding to each of the other time symbols, as a channel parameter of a first subcarrier set to which the subcarrier corresponding to each of the other time symbols belongs, where the subcarrier set is obtained by grouping the plurality of subcarriers within the bandwidth range, and each subcarrier set includes one subcarrier that is in the subcarrier group and that is corresponding to the first time symbol;

determining, by the receiving device, a channel parameter of each of subcarrier sets, corresponding to a time symbol, except the first subcarrier set based on the channel parameter of the subcarrier set to which each subcarrier that is in the subcarrier group and that is corresponding to the first time symbol belongs and based on the channel parameter of the first subcarrier set to which the subcarrier corresponding to each of the other time symbols belongs; and determining, by the receiving device, the channel parameter of the first port based on a channel parameter of each subcarrier set corresponding to each time symbol in the time period.

According to the foregoing method, the receiving device may determine the channel parameter of the first port based on the channel parameter of each subcarrier that is in the subcarrier group and that is corresponding to the first time symbol and based on the channel parameter of the subcarrier corresponding to each of the other time symbols.

In a possible design, the receiving device may determine the channel parameter of each of the subcarrier sets, corresponding to the time symbol, except the first subcarrier set by using the following steps:

determining, by the receiving device based on the channel parameter of the subcarrier set to which each subcarrier that is in the subcarrier group and that is corresponding to the first time symbol belongs and based on a channel parameter of the first subcarrier set to which a subcarrier corresponding to a third time symbol belongs, a channel parameter of a second subcarrier set corresponding to the third time symbol, where the third time symbol is any time symbol in the time period other than the first time symbol, and the second subcarrier set is any subcarrier set that is other than the first subcarrier set and that is corresponding to the third time symbol; and the determining, by the receiving device, a channel parameter of a second subcarrier set corresponding to the third time symbol includes:

multiplying, by the receiving device, a channel parameter of the second subcarrier set corresponding to the first time symbol by the channel parameter of the first subcarrier set corresponding to the third time symbol, and dividing an obtained multiplication result by a channel parameter of the first subcarrier set corresponding to the first time symbol, to obtain the channel parameter of the second subcarrier set corresponding to the third time symbol.

According to the foregoing method, the receiving device may determine the channel parameter of each of the subcarrier sets, corresponding to each of the other time symbols, except the first subcarrier set.

According to a third aspect, an embodiment of the present disclosure provides a reference signal transmission method, where the method is applied to a transmitting device in a communications system. The method includes: determining, by the transmitting device by obtaining configuration information for a plurality of ports of the transmitting device, locations of resources occupied by reference signals corresponding to the plurality of ports; and sending, on the resources, the reference signals corresponding to the plurality of ports, where the configuration information includes: in time domain, a location of a first time symbol; and in frequency domain, a location of each subcarrier that is in a subcarrier group within a specified bandwidth range and that is corresponding to the first time symbol corresponding to each port, and a location of a subcarrier that is within the bandwidth range and that is corresponding to each of time symbols, corresponding to each port and in a time period occupied by the resources, except the first time symbol; the subcarrier group includes a plurality of subcarriers; the bandwidth range is configured by the transmitting device; and the bandwidth range includes a plurality of subcarriers.

It can be learnt from the configuration information that one reference signal group is configured in the first time symbol corresponding to each port and one reference signal is configured in each of time symbols, corresponding to each port, except the first time symbol. Compared with the prior art in which at least one reference signal is configured in each OFDM symbol corresponding to each subband corresponding to each port, in the foregoing method, on the premise that the receiving device can obtain a channel parameter of each of the plurality of ports, overheads of resources occupied by transmitted reference signals in the communications system can be reduced, so that service data transmission efficiency is improved. In addition, the transmitting device may send the reference signals corresponding to the plurality of ports each time, and therefore the receiving device may obtain channel parameters of the plurality of ports each time. This improves working efficiency of the transmitting device and the receiving device in the communications system, and reduces a time for determining, by the receiving device, the channel parameters of the plurality of ports of the transmitting device.

In a possible design, the transmitting device may obtain the location of the first time symbol in the following two manners:

a first manner: obtaining, by the transmitting device, a port number of each of the plurality of ports; determining a first port group including the port number of each of the plurality of ports; and determining, based on a stored correspondence between a port group and a location of a time symbol, the location of the first time symbol corresponding to the first port group, where in the correspondence between a port group and a location of a time symbol, one or more port groups are corresponding to the location of the first time symbol; or a second manner: determining, by the transmitting device, the location of the first time symbol based on any one or a combination of the following: a timeslot number Slot_ID of the resource, a cell number Cell_ID of the transmitting device, and a receiving device number UE_ID.

The transmitting device can accurately obtain the location of the first time symbol in the foregoing two manners.

In a possible design, the location of the first time symbol satisfies the following formula:

$$u_{index} = \mod(Y, U_{Coh})$$

where $u_{index}$ is the location of the first time symbol; $U_{Coh}$ is a quantity of time symbols included in the time period occupied by the resource; and Y is any one of Slot_ID, Cell_ID, and UE_ID, a sum of any two of the three items, or a sum of the three items.

In a possible design, the transmitting device may determine, based on a port number of a first port or based on l and any one or a combination of the following: Slot_ID, Cell_ID, and UE_ID, a location of each subcarrier that is in the subcarrier group and that is corresponding to the first time symbol corresponding to the first port, where the first port is any of the plurality of ports.

In the foregoing design, the plurality of ports are corresponding to a same first time symbol. Therefore, to avoid interference between different ports, that reference signals corresponding to the different ports occupy different resources needs to be ensured. In this case, when calculating the location of the subcarrier that is in the subcarrier group and that is corresponding to the first time symbol corresponding to each of the plurality of ports, the transmitting device needs to use a variable, that is, a port number, to ensure that interference does not occur between the different ports.

In a possible design, when the transmitting device determines, based on l, the location of each subcarrier that is in the subcarrier group and that is corresponding to the first time symbol corresponding to the first port, the location of each subcarrier that is in the subcarrier group and that is corresponding to the first time symbol corresponding to the first port satisfies the following formula:

$$k1_{index}(n) = \mod(l, K_{SB}) + (n-1) \cdot K_{SB}$$

where n=1, 2, ... N; N is a quantity of subcarriers that are in the subcarrier group and that are corresponding to the first time symbol corresponding to the first port; $k1_{index}(n)$ is a location of an $n^{th}$ subcarrier that is in the subcarrier group and that is corresponding to the first time symbol corresponding to the first port; and $K_{SB}$ is a quantity of subcarriers included in each subcarrier set when the bandwidth range is averagely divided into a plurality of subcarrier sets.

In a possible design, when the transmitting device determines, based on l and any one or a combination of the following: Slot_ID, Cell_ID, and UE_ID, the location of each subcarrier that is in the subcarrier group and that is corresponding to the first time symbol corresponding to the first port, the location of each subcarrier that is in the subcarrier group and that is corresponding to the first time symbol corresponding to the first port satisfies the following formula:

$$k1_{index}(n) = \mod(l+P, K_{SB}) + (n-1) \cdot K_{SB}$$

where n=1, 2 ... N; N is a quantity of subcarriers that are in the subcarrier group and that are corresponding to the first time symbol corresponding to the first port; $k1_{index}(n)$ is a location of an $n^{th}$ subcarrier that is in the subcarrier group and that is corresponding to the first time symbol corresponding to the first port; $K_{SB}$ is a quantity of subcarriers included in each subcarrier set when the bandwidth range is averagely divided into a plurality of subcarrier sets; and P is any one of Slot_ID, Cell_ID, and UE_ID, a sum of any two of the three items, or a sum of the three items.

In a possible design, the transmitting device may determine, based on the port number l of the first port and any one or a combination of the following: u, Slot_ID, Cell_ID, and UE_ID, a location of a subcarrier that is within the bandwidth range and that is corresponding to the second time symbol corresponding to the first port, where the first port is any of the plurality of ports, and the second time symbol is any time symbol in the time period other than the first time symbol.

In the foregoing method, a plurality of parameters used when the transmitting device calculates a location of the subcarrier corresponding to the second time symbol corresponding to each port include port numbers. Because the port numbers are different, locations, obtained through calculation by the transmitting device, of subcarriers corresponding to the second time symbol corresponding to the different ports are different obviously. In this case, interference between the different ports can be avoided.

In a possible design, the location of the subcarrier that is within the bandwidth range and that is corresponding to the second time symbol corresponding to the first port satisfies the following formula:

$$k2_{index} = \mod(l+R, K)$$

where $k2_{index}$ is the location of the subcarrier that is within the bandwidth range and that is corresponding to the second time symbol corresponding to the first port; R is any one of u, Slot_ID, Cell_ID, and UE_ID, a sum of any two or three of the four items, a sum of the four items, or $R = u \times K_{SB} + T$; T is any one of u, Slot_ID, Cell_ID, and UE_ID, a sum of any two of the four items, a sum of three of the four items, or a sum of the four items; $K_{SB}$ is a quantity of subcarriers included in each subcarrier set when the bandwidth range is averagely divided into a plurality of subcarrier sets; and K is a total quantity of subcarriers included within the bandwidth range.

In a possible design, by using the following method, the transmitting device sends, on the resources that are indicated by the configuration information and that are occupied by the reference signals corresponding to the plurality of ports, the reference signals corresponding to the plurality of ports; the transmitting device multiplies the reference signals corresponding to the plurality of ports by a preset orthogonal cover code, to obtain processed reference signals corresponding to the plurality of ports, where the orthogonal cover code is configured specific to the plurality of ports; and the transmitting device sends, on the resources, the processed signals corresponding to the plurality of ports.

The code division manner is used to configure the reference signals corresponding to the plurality of ports, so as to avoid mutual interference between the plurality of ports that is caused when the transmitting device simultaneously sends the reference signals corresponding to the plurality of ports and the receiving device performs channel measurement on the plurality of ports, thereby improving accuracy of channel measurement by the receiving device.

According to a fourth aspect, an embodiment of the present disclosure further provides a reference signal transmission method, where the method is applied to a receiving device in a communications system, and the communications system further includes the transmitting device in the foregoing embodiment. The method includes: obtaining, by the receiving device, scheduling information of the transmitting device; obtaining, by the receiving device, configuration information of reference signals for a plurality of ports based on the scheduling information; receiving, by the receiving device on resources indicated by the configuration information, the reference signals corresponding to the plurality of ports that are sent by the transmitting device; performing, by the receiving device, channel estimation based on the received reference signals, determining a channel parameter of each subcarrier that is in a subcarrier group and that is corresponding to a first time symbol corresponding to each port, and determining a channel parameter of a subcarrier corresponding to each of the other time symbols corresponding to each port; and finally determining a channel parameter of each of the plurality of ports based on the channel parameter of each subcarrier that is in the subcarrier group and that is corresponding to the first time symbol corresponding to each port and based on the channel parameter of the subcarrier corresponding to each of the other time symbols corresponding to each port; where the configuration information includes: in time domain, a location of the first time symbol; and in frequency domain, a location of each subcarrier that is in the subcarrier group within a bandwidth range and that is corresponding to the first time symbol corresponding to each port, and a location of the subcarrier that is within the bandwidth range and that is corresponding to each of time symbols, corresponding to each port and in a time period occupied by the resources, except the first time symbol; and the subcarrier group corresponding to the first time symbol corresponding to each port includes a plurality of subcarriers.

It can be learnt from the configuration information that one reference signal group is configured in the first time symbol corresponding to each port and one reference signal is configured in each of time symbols, corresponding to each port, except the first time symbol. Compared with the prior art in which at least one reference signal is configured in each OFDM symbol corresponding to each subband corresponding to each port, in the foregoing method, on the premise that the receiving device can obtain the channel parameter of each of the plurality of ports, overheads of resources occupied by transmitted reference signals in the communications system can be reduced, so that service data transmission efficiency is improved. In addition, the transmitting device may send the reference signals corresponding to the plurality of ports each time, and therefore the receiving device may obtain channel parameters of the plurality of ports each time. This improves working efficiency of the transmitting device and the receiving device in the communications system, and reduces a time for determining, by the receiving device, the channel parameters of the plurality of ports of the transmitting device.

In a possible design, the method for determining content in the configuration information by the receiving device is the same as that for determining corresponding content in the configuration information by the transmitting device.

In this way, it can be ensured that the configuration information obtained by the receiving device is the same as the configuration information obtained by the transmitting device, so as to ensure that the receiving device can accurately receive the reference signals that are on the resources indicated by the configuration information.

In a possible design, a quantity of a plurality of subcarrier sets that are obtained by dividing the bandwidth range is the same as a quantity of subcarriers that are included in the subcarrier group and that are corresponding to the first time symbol corresponding to each port, and each subcarrier set includes one subcarrier that is in the subcarrier group and that is corresponding to the first time symbol corresponding to each port; and the receiving device may determine, by using the following steps, the channel parameter of each of the plurality of ports based on the channel parameter of each subcarrier that is in the subcarrier group and that is corresponding to the first time symbol corresponding to each port and based on the channel parameter of the subcarrier corresponding to each of the other time symbols corresponding to each port:

using, by the receiving device, a channel parameter of each subcarrier that is in the subcarrier group and that is corresponding to the first time symbol corresponding to the first port, as a channel parameter of a subcarrier set to which each subcarrier that is in the subcarrier group and that is corresponding to the first time symbol corresponding to the first port belongs, and using a channel parameter of the subcarrier corresponding to each of the other time symbols corresponding to the first port, as a channel parameter of a first subcarrier set to which the subcarrier corresponding to each of the other time symbols corresponding to the first port belongs, where the first port is any of the plurality of ports, the subcarrier set is obtained by grouping the plurality of subcarriers within the bandwidth range, and each subcarrier set includes one subcarrier that is in the subcarrier group and that is corresponding to the first time symbol corresponding to the first port;

determining, by the receiving device, a channel parameter of each of subcarrier sets, corresponding to a time symbol corresponding to the first port, except the first subcarrier set based on the channel parameter of the subcarrier set to which each subcarrier that is in the subcarrier group and that is corresponding to the first time symbol corresponding to the first port belongs and based on the channel parameter of the first subcarrier set to which the subcarrier corresponding to each of the other time symbols corresponding to the first port belongs; and determining, by the receiving device, a channel parameter of the first port based on a channel parameter of each subcarrier set corresponding to each time symbol, in the time period, corresponding to the first port.

According to the foregoing method, the receiving device may determine the channel parameter of each of the plurality of ports based on the channel parameter of each subcarrier that is in the subcarrier group and that is corresponding to the first time symbol corresponding to each port and based on the channel parameter of the subcarrier corresponding to each of the other time symbols corresponding to each port.

In a possible design, the receiving device may determine, by using the following steps, the channel parameter of each of the subcarrier sets, corresponding to the time symbol corresponding to the first port, except the first subcarrier set:

determining, by the receiving device based on the channel parameter of the subcarrier set to which each subcarrier that is in the subcarrier group and that is corresponding to the first time symbol corresponding to the first port belongs and based on a channel parameter of the first subcarrier set to which a subcarrier corresponding to a third time symbol corresponding to the first port belongs, a channel parameter of a second subcarrier set corresponding to the third time symbol corresponding to the first port, where the third time symbol is any time symbol in the time period other than the first time symbol, and the second subcarrier set is any subcarrier set that is other than the first subcarrier set and that is corresponding to the third time symbol; and the determining, by the receiving device, a channel parameter of a second subcarrier set corresponding to the third time symbol corresponding to the first port includes:

multiplying, by the receiving device, a channel parameter of the second subcarrier set corresponding to the first time symbol corresponding to the first port by the channel parameter of the first subcarrier set corresponding to the third time symbol corresponding to the first port, and dividing an obtained multiplication result by a channel parameter of the first subcarrier set corresponding to the first time symbol corresponding to the first port, to obtain the channel parameter of the second subcarrier set corresponding to the third time symbol corresponding to the first port.

According to the foregoing method, the receiving device may determine a channel parameter of each of subcarrier sets, corresponding to each of the other time symbols corresponding to the first port, except the first subcarrier set.

According to a fifth aspect, an embodiment of the present disclosure further provides a transmitting device, where the transmitting device is applied to a communications system, and the transmitting device has functions of implementing operations of the transmitting device in the method instance of the first aspect. The functions may be implemented by using hardware, or may be implemented by hardware executing corresponding software. The hardware or software includes one or more modules corresponding to the foregoing functions.

In a possible design, a structure of the transmitting device includes an obtaining unit and a transmitting unit, where these units can perform corresponding functions in the foregoing method example. For details, refer to the detailed description in the method example. Details are not described herein again.

In a possible design, a structure of the transmitting device includes a transceiver, a processor, a bus, and a memory. The transceiver is configured to perform communication interaction with another device in the communications system, and the processor is configured to support the transmitting device in performing corresponding functions in the foregoing method. The memory is coupled to the processor and stores a program instruction and data that are required by the transmitting device.

According to a sixth aspect, an embodiment of the present disclosure further provides a receiving device, where the receiving device is applied to a communications system, the communications system further includes the foregoing transmitting device, and the receiving device has functions of implementing operations of the receiving device in the method instance of the second aspect. The functions may be implemented by using hardware, or may be implemented by hardware executing corresponding software. The hardware or software includes one or more modules corresponding to the foregoing functions.

In a possible design, a structure of the receiving device includes an obtaining unit, a receiving unit, and a processing unit, where these units can perform corresponding functions in the foregoing method example. For details, refer to the detailed description in the method example. Details are not described herein again.

In a possible design, a structure of the receiving device includes a transceiver, a processor, a bus, and a memory. The transceiver is configured to perform communication interaction with another device in the communications system, and the processor is configured to support the receiving device in performing corresponding functions in the foregoing method. The memory is coupled to the processor and stores a program instruction and data that are required by the receiving device.

According to a seventh aspect, an embodiment of the present disclosure provides a communications system, where the communications system includes a transmitting device and a receiving device. The transmitting device has functions of implementing operations of the transmitting device in the method instance of the first aspect, and the receiving device has functions of implementing operations of the receiving device in the method instance of the second aspect.

According to an eighth aspect, an embodiment of the present disclosure further provides a transmitting device, where the transmitting device is applied to a communications system, and the transmitting device has functions of implementing operations of the transmitting device in the method instance of the third aspect. The functions may be implemented by using hardware, or may be implemented by hardware executing corresponding software. The hardware or software includes one or more modules corresponding to the foregoing functions.

In a possible design, a structure of the transmitting device includes an obtaining unit and a transmitting unit, where these units can perform corresponding functions in the foregoing method example. For details, refer to the detailed description in the method example. Details are not described herein again.

In a possible design, a structure of the transmitting device includes a transceiver, a processor, a bus, and a memory. The transceiver is configured to perform communication interaction with another device in the communications system, and the processor is configured to support the transmitting device in performing corresponding functions in the foregoing method. The memory is coupled to the processor and stores a program instruction and data that are required by the transmitting device.

According to a ninth aspect, an embodiment of the present disclosure further provides a receiving device, where the receiving device is applied to a communications system, the communications system further includes the foregoing transmitting device, and the receiving device has functions of implementing operations of the receiving device in the method instance of the fourth aspect. The functions may be implemented by using hardware, or may be implemented by hardware executing corresponding software. The hardware or software includes one or more modules corresponding to the foregoing functions.

In a possible design, a structure of the receiving device includes an obtaining unit, a receiving unit, and a transmitting unit, where these units can perform corresponding functions in the foregoing method example. For details, refer to the detailed description in the method example. Details are not described herein again.

In a possible design, a structure of the receiving device includes a transceiver, a processor, a bus, and a memory. The transceiver is configured to perform communication interaction with another device in the communications system, and the processor is configured to support the receiving device in performing corresponding functions in the foregoing method. The memory is coupled to the processor and stores a program instruction and data that are required by the receiving device.

According to a tenth aspect, an embodiment of the present disclosure provides a communications system, where the communications system includes a transmitting device and a receiving device. The transmitting device has functions of implementing operations of the transmitting device in the method instance of the third aspect, and the receiving device has functions of implementing operations of the receiving device in the method instance of the fourth aspect.

In the embodiments of the present disclosure, the transmitting device may send a reference signal/reference signals corresponding to one or more ports; and during sending, one reference signal group corresponding to each port is configured in the first time symbol and one reference signal corresponding to each port is configured in each of time symbols except the first time symbol. Therefore, on the premise that the receiving device can obtain the channel parameter of each port, overheads of resources occupied by transmitted reference signals in the communications system can be reduced, so that service data transmission efficiency is improved.

BRIEF DESCRIPTION OF DRAWINGS

FIG. 8 is a flowchart of still another reference signal transmission method according to an embodiment of the present disclosure;

FIG. 9 is still another schematic resource mapping diagram specific to two ports according to an embodiment of the present disclosure;

DESCRIPTION OF EMBODIMENTS

Figure 1:
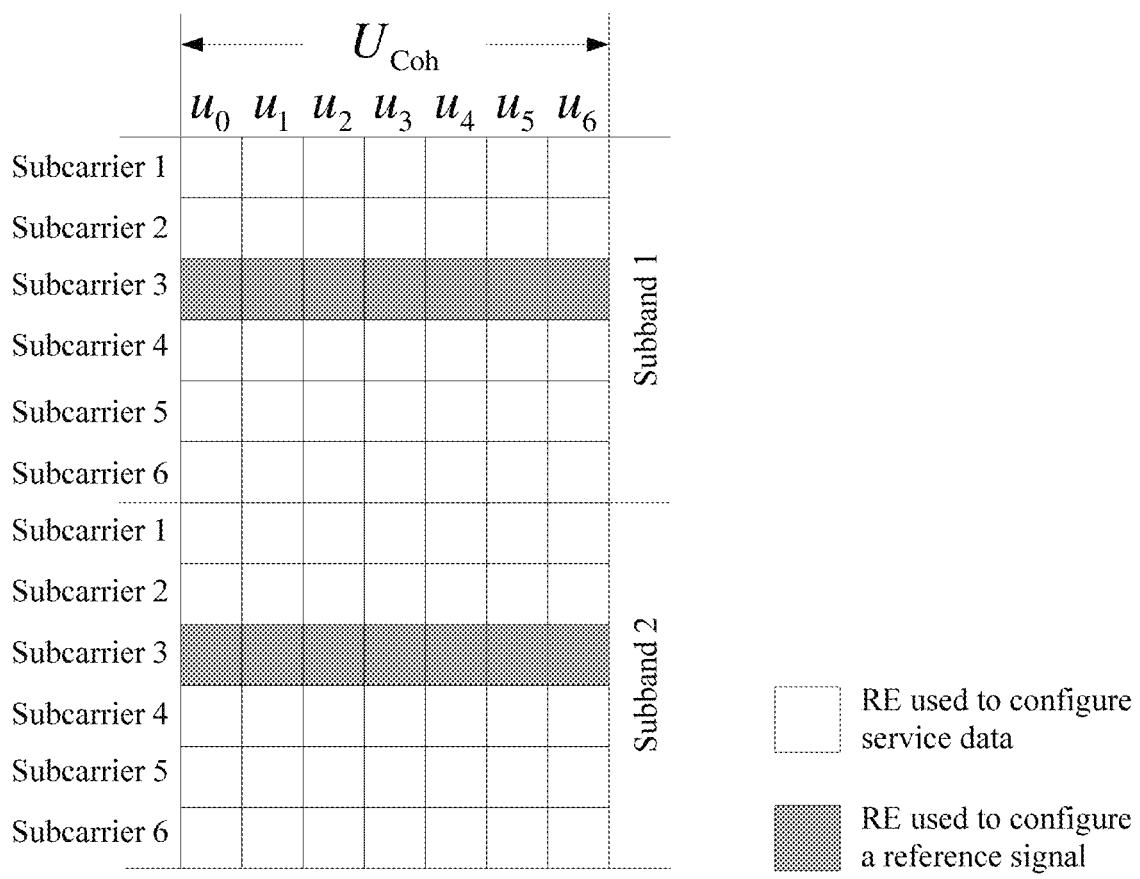
FIG. 1 is a schematic resource mapping diagram specific to one port provided in the prior art.

To make the objectives, technical solutions, and advantages of the present disclosure clearer, the following further describes the present disclosure in detail with reference to the accompanying drawings. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

The embodiments of the present disclosure provide a reference signal transmission method and an apparatus, to resolve a prior-art problem of relatively high overheads of resources occupied by transmitted reference signals in a communications system. The method and the apparatus are based on a same disclosure idea. Because principles of resolving problems by using the method and the apparatus are similar, mutual reference may be made to implementations of the apparatus and the method. Repeated content is not described herein again.

In the technical solutions of the present disclosure, a transmitting device sends, on a resource indicated by configuration information of a reference signal for a first port, the reference signal corresponding to the first port; and a receiving device receives, on the resource, the reference signal corresponding to the first port that is sent by the transmitting device, and determines a channel parameter of the first port based on the received reference signal. The configuration information includes: in time domain, a location of a first time symbol; and in frequency domain, a location of each subcarrier that is in a subcarrier group within a specified bandwidth range and that is corresponding to the first time symbol, and a location of a subcarrier that is within the bandwidth range and that is corresponding to each of time symbols, in a time period occupied by the resource, except the first time symbol. It can be learnt from the configuration information that one reference signal group is configured in the first time symbol and one reference signal is configured in each of time symbols except the first time symbol. Compared with the prior art in which at least one reference signal is configured in each OFDM symbol corresponding to each subband, in the method according to the embodiments of the present disclosure, on the premise that the receiving device can obtain the channel parameter of the first port, overheads of resources occupied by transmitted reference signals in the communications system can be reduced, so that service data transmission efficiency is improved.

The following describes some terms in this application for ease of understanding by persons skilled in the art.

(1) A transmitting device in the embodiments of the present disclosure is a device that can transmit service data to another device by using at least one port, and the transmitting device includes but is not limited to: a transmit and receive point (TRP), a base station, an evolved NodeB (eNB), a radio network controller (RNC), a NodeB (Node B, or NB), a base station controller (BSC), a base transceiver station (BTS), a Home NodeB (such as a Home evolved NodeB, or Home Node B, or HNB), a baseband unit (BBU), and an access point (AP).

(2) A receiving device in the present disclosure is a device that can perform receiving and demodulation to obtain service data sent by a transmitting device, and the receiving device may also be referred to as a terminal device or a user equipment (UE), for example, a handheld device, in-vehicle device, wearable device, computing device, and mobile station (MS) having a wireless connection function or another processing device connected to a wireless modem, and a mobile terminal that communicates with one or more core networks by using a radio access network.

(3) A time symbol in the present disclosure is a time unit for a transmitting device to transmit a signal (such as service data or a reference signal) in time domain. Generally, in a communications system, one coherence time may be divided into a plurality of time slices or time symbols. For example, in an OFDM system, a time symbol may be referred to as an OFDM symbol.

(5) A bandwidth range in the present disclosure is configured by a transmitting device for a receiving device, and the bandwidth range includes a plurality of subcarriers.

(6) A subcarrier set in the present disclosure may also be referred to as a subband, and is obtained by a communications system by averagely dividing a bandwidth range configured by a transmitting device. The bandwidth range is divided into a plurality of subcarrier sets, and the plurality of subcarrier sets each include a same quantity of a plurality of subcarriers. Generally, a bandwidth of a plurality of subcarriers included in each subcarrier set is less than or equal to a coherence bandwidth.

(7) "A plurality of" refers to at least two.

In addition, it should be understood that in the descriptions of this application, terms such as "first" and "second" are used merely for differential description, but cannot be understood as indication or implication of relative importance and cannot be understood as indication or implication of sequences.

In a conventional communications system, due to a phase noise, to ensure that a receiving device can accurately demodulate data, the receiving device needs to be capable of estimating changed phase noises corresponding to time symbols and channel parameters within different coherence bandwidths together, that is, channel parameters, in the time symbols, including the phase noises. A most direct method is configuring at least one reference signal in each time symbol corresponding to each subcarrier set.

Figure 2:
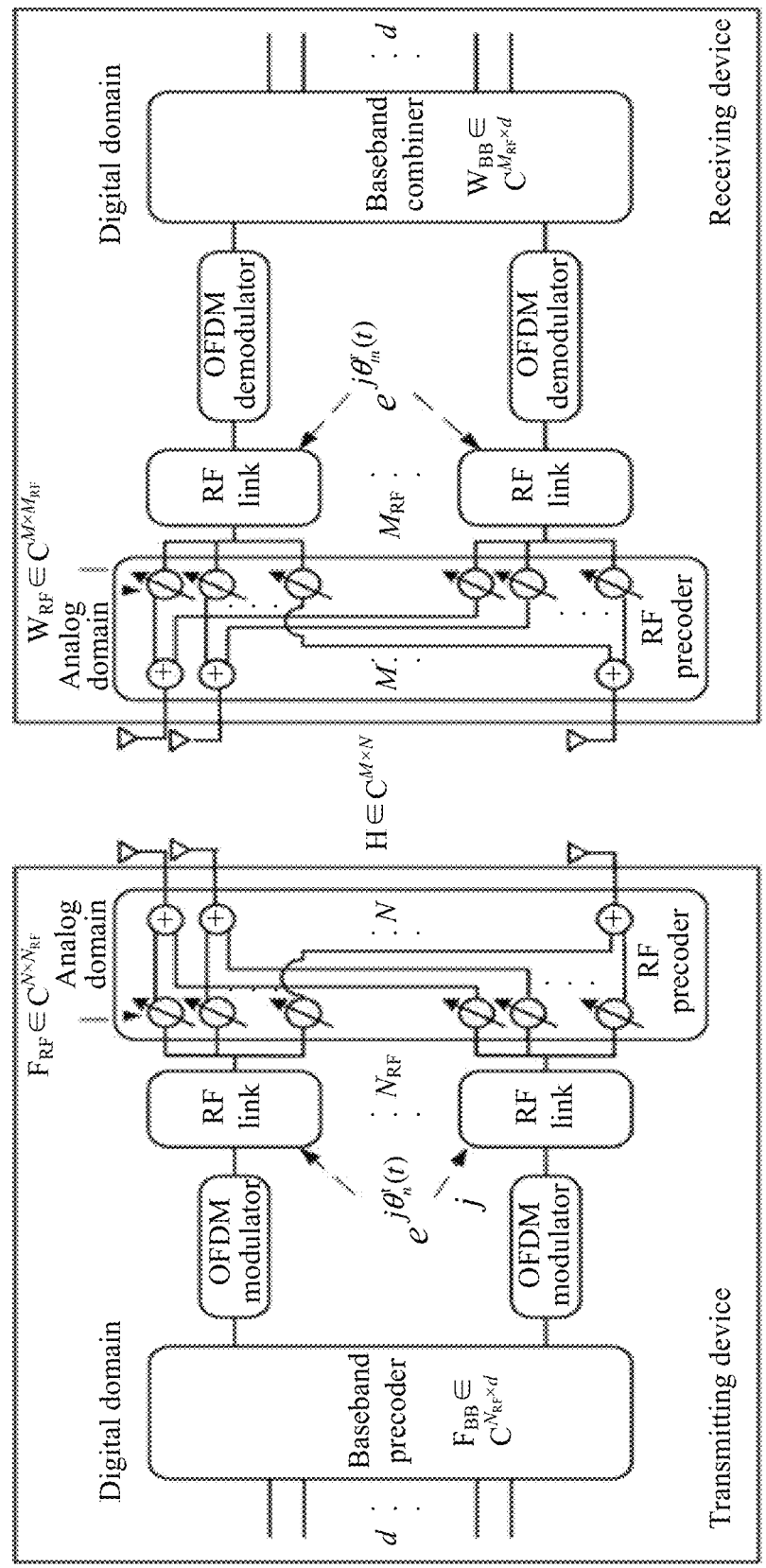
FIG. 2 is a schematic architectural diagram of a reference signal transmission system provided in the prior art.

For example, in a MIMO-OFDM communications system shown in FIG. 2, N transmit antennas are configured in a transmitting device, and M receive antennas are configured in a receiving device, where these transmit antennas and receive antennas are respectively connected to $N_{RF}$ RF links and $M_{RF}$ links through full connection. When the transmitting device sends d data streams, $d \leq M_{RF} \leq M$ and $d \leq N_{RF} \leq N$ hold true. It should be noted that, $N_{RF}$ ports, $N_{RF}$ transmit channels, and $N_{RF}$ radio frequency links have same meaning in the embodiments of the present disclosure.

A process of sending the d data streams by the transmitting device is as follows:

Digital domain precoding is first performed on the d data streams $X(k) \in \mathbb{C}^{d \times 1}$ by a base station precoder, referring to Formula 1:

$$S(k) = F_{BB}(k)X(k) \qquad \text{Formula 1}$$

where $S(k) = \{S_l(k), l=1, 2, \ldots N_{RF}\}$, and $F_{BB}(k) \in \mathbb{C}^{N_{RF} \times d}$ represents a digital domain precoding vector used for a $k^{th}$ subcarrier;

$S_l(k)$ is placed on a $k^{th}$ subcarrier of an $l^{th}$ OFDM modulator, and an output $l^{th}$ time domain signal $s_l(t)$ may be obtained after K-point inverse fast Fourier transform (IFFT) processing is performed by the $l^{th}$ OFDM modulator;

$s_l(t)$ is multiplied by a crystal oscillator signal $e^{j(2\pi f_c t + \theta_T(t))}$ in an RF link, that is, up-conversion processing is performed, to obtain a radio frequency signal, where $\theta_T(t)$ represents a phase noise caused by a defect in a crystal oscillator; and after analog precoding $f_{RF} \in \mathbb{C}^{N \times N_{RF}}$ processing is performed by an RF precoder on the radio frequency signal, a processed radio frequency signal is sent to the receiving device, where the sent radio frequency signal arrives at the receiving device after passing through a corresponding channel $h(t)$; $H \in \mathbb{C}^{M \times N}$ is used to represent a channel parameter of $h(t)$ corresponding to a subcarrier in frequency domain.

Likewise, a process of demodulating the d data streams by the receiving device is as follows:

after the receiving device receives the signal, the RF precoder first performs analog domain combination on the signal by using a precoding vector $W_{RF} \in \mathbb{C}^{M \times M_{RF}}$;

down-conversion processing is separately performed on $M_{RF}$ combined signals based on a crystal oscillator signal $e^{-j(2\pi f_c t + \theta_r(t))}$ in an RF link to obtain a baseband signal, where $\theta_R(t)$ represents a phase noise in the receiving device caused by a defect in a crystal oscillator; and after analog-to-digital conversion, serial-to-parallel conversion, and discrete Fourier transform (DFT) processing are performed on the baseband signal, a baseband combiner performs digital domain combination on a processed baseband signal by using a precoding vector $W_{BB} \in \mathbb{C}^{M_{RF} \times d}$, to obtain a receiving signal.

If only a receiving signal on a subcarrier is considered, the receiving signal R may be represented by Formula 2:

$$R = W_{BB}^H P_R W_{RF}^H H F_{RF} P_T F_{BB} X + N_z \qquad \text{Formula 2}$$

where impact on a MIMO link by phase noises caused during up-conversion and down-conversion is represented respectively by using matrices $P_R \in \mathbb{C}^{M_{RF} \times M_{RF}}$ and $P_T \in \mathbb{C}^{N_{RF} \times N_{RF}}$; a phase noise keeps unchanged in a same OFDM time symbol and changes in different OFDM symbols, that is, $P_R$ and $P_T$ are diagonal matrices; any element $$e^{j\theta_i^R(u)}$$

on a diagonal line of $P_R$ and $P_T$ represents a phase noise, in a $u^{th}$ OFDM symbol, on a radio frequency channel of an $l^{th}$ transmitting device; and any element $$e^{j\theta_i^T(u)}$$

on a diagonal line of $P_T$ represents a phase noise, in a $u^{th}$ OFDM symbol, on a radio frequency channel of an $l^{th}$ receiving device. During a processing process of signal sending and receiving, if a plurality of baseband signals of the transmitting device and the receiving device may use one crystal oscillator signal, elements on diagonal lines of $P_R$ and $P_T$ are the same. However, in actual application, in a high-frequency communications system, an architecture in which a crystal oscillator is shared poses a challenge to deployment and other aspects, and is difficult to be implemented in practice. A multi-crystal-oscillator architecture is usually used, so that a plurality of crystal oscillators provide an up-conversion carrier frequency signal source on the $N_{RF}$ radio frequency channels, where a quantity of crystal oscillators is greater than 1 and is less than or equal to $N_{RF}$. Each crystal oscillator causes an independent random phase noise, and in this case, elements on the diagonal line of $P_T$ may be different.

First, based on Formula 2, Formula 3 may be used to define an equivalent channel parameter $\tilde{H} \in \mathbb{C}^{M_{RF} \times N_{RF}}$ for data transmission in the MIMO-OFDM communications system. Referring to Formula 3:

$$\tilde{H} = W_{RF}^H H F_{RF} \qquad \text{Formula 3}$$

According to Formula 2 and Formula 3, to accurately demodulate data, the receiving device needs to obtain a data parameter $P_R \tilde{H} P_T F_{BB}$, and a corresponding digital combination vector $W_{BB}$ needs to be designed based on the parameter. The transmitting device usually informs the receiving device of $F_{BB}$ by using signaling. Therefore, to accurately demodulate data, the receiving device needs to obtain a channel parameter $\hat{H} = P_R \tilde{H} P_T$ including a phase noise.

To enable the receiving device to obtain the channel parameter including the phase noise, the transmitting device may send a reference signal to the receiving device.

A phase noise changes rapidly. In time domain, a phase noise (that is, $P_R$ or $P_T$) keeps unchanged in different subbands corresponding to a same OFDM symbol, but phase noises are different in different OFDM symbols. The equivalent channel parameter $\tilde{H}$ usually does not change in a relatively long time period, that is, $\tilde{H}$ keeps unchanged on a same subband corresponding to each OFDM symbol in a coherence time, but changes on different subbands corresponding to each OFDM symbol. Obviously, it can be learnt from the foregoing descriptions that channel parameters $\hat{H}$ including phase noises are different on different subbands corresponding to each OFDM symbol.

When a bandwidth range allocated to the receiving device in the communications system is divided into two subbands and each time period includes seven OFDM symbols, the communications system needs to configure, specific to one port, at least one reference signal on each subband corresponding to each OFDM symbol. A specific manner of configuring a reference signal is described still by using the resource mapping diagram shown in FIG. 1.

The transmitting device sends a reference signal on a third subcarrier in a subband 1 corresponding to an OFDM symbol $u_0$, and therefore the receiving device receives the reference signal on the third subcarrier in the subband 1 corresponding to $u_0$. Then, the receiving device may obtain, based on the received reference signal and a reference signal that is agreed on, a channel parameter of the subband 1 corresponding to $u_0$ corresponding to the port (that is, a channel parameter $\hat{H}_1(u_0)$ including a phase noise). The reference signal that is agreed on is agreed on between the transmitting device and the receiving device and is a reference signal sent by the transmitting device. In this way, the receiving device can demodulate, by using $\hat{H}_1(u_0)$, service data that is received by the receiving device on the subband 1 corresponding to $u_0$.

Therefore, the transmitting device sends a reference signal on a subcarrier in each subband corresponding to each OFDM symbol, and the receiving device may obtain a channel parameter $\tilde{H}$ of each subband corresponding to each OFDM symbol corresponding to the port, so that the receiving device can demodulate, by using $\tilde{H}$, service data that is received by the receiving device on each subband corresponding to each OFDM symbol.

Persons skilled in the art understand that, to avoid interference on channel measurement performed on another port, when the transmitting device has a plurality of ports, the transmitting device needs to use the foregoing method to configure a reference signal specific to each port, and the transmitting device can send only a reference signal corresponding to one port each time. In contrast, a resource configured to be occupied by a reference signal corresponding to another port is idle, and is not used to send a reference signal or service data.

Obviously, overheads of resources occupied by a reference signal configured by the transmitting device specific to each port are relatively high. Further, when the transmitting device sends a reference signal corresponding to one port, a resource occupied by a reference signal corresponding to another port is idle. As a result, service data occupies a relatively small quantity of resources, and service data transmission efficiency is relative low.

The reference signal transmission method provided in the embodiments of the present disclosure is applicable to various single-channel or multichannel wireless communications systems, for example, the MIMO-OFDM communications system shown in FIG. 2. The communications system includes a transmitting device and a receiving device, and the transmitting device has at least one port.

Figure 3:
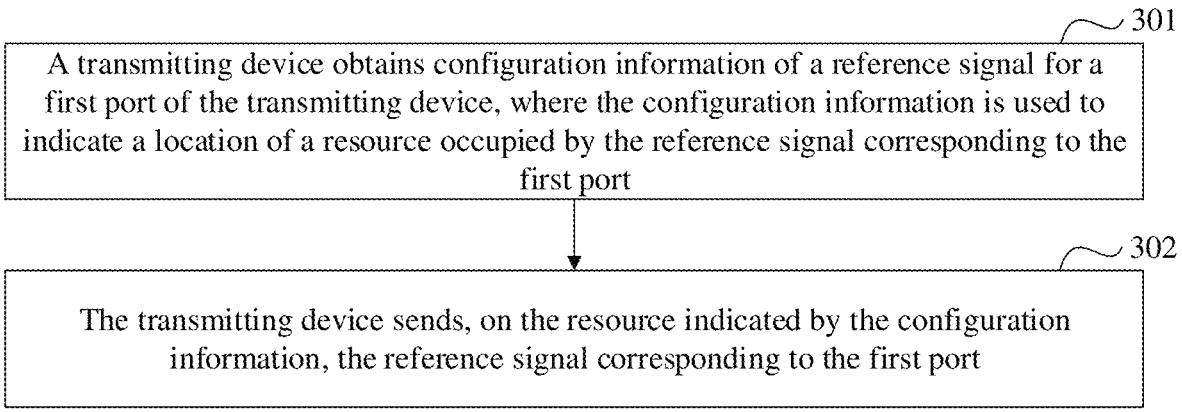
FIG. 3 is a flowchart of a reference signal transmission method according to an embodiment of the present disclosure.

An embodiment of the present disclosure provides a reference signal transmission method, which is applied to the transmitting device in the communications system. Referring to FIG. 3, a specific procedure for the method includes the following steps.

Step 301: The transmitting device obtains configuration information of a reference signal for a first port of the transmitting device, where the configuration information is used to indicate a location of a resource occupied by the reference signal corresponding to the first port; the configuration information includes: in time domain, a location of a first time symbol; and in frequency domain, a location of each subcarrier that is in a subcarrier group within a specified bandwidth range and that is corresponding to the first time symbol, and a location of a subcarrier that is within the bandwidth range and that is corresponding to each of time symbols, in a time period occupied by the resource, except the first time symbol; the subcarrier group includes a plurality of subcarriers; the bandwidth range is configured by the transmitting device; and the bandwidth range includes a plurality of subcarriers; and Optionally, the first port is one of the at least one port of the transmitting device.

Optionally, the transmitting device may obtain the location of the first time symbol in the following two manners:

a first manner: obtaining, by the transmitting device, a port number of the first port, and determining, based on a stored correspondence between a port number and a location of a time symbol, the location of the first time symbol corresponding to the port number of the first port; or a second manner: determining, by the transmitting device, the location of the first time symbol based on any one or a combination of the following: the port number 1 of the first port, a timeslot number Slot_ID of the resource, a cell number Cell_ID of the transmitting device, and a receiving device number UE_ID.

In the first manner, the transmitting device stores the correspondence between a port number and a location of a time symbol. In a plurality of correspondences, one time symbol may be corresponding to a unique port number (that is, a reference signal corresponding to a port corresponding to the port number and a reference signal corresponding to another port are configured in a time division manner). Alternatively, one time symbol may be corresponding to a plurality of port numbers; to avoid interference, in the time symbol, a subcarrier group corresponding to the time symbol corresponding to a port corresponding to each of the plurality of port numbers is different from a subcarrier group corresponding to the time symbol corresponding to another port (that is, reference signals corresponding to a plurality of ports corresponding to the plurality of port numbers are configured in a frequency division manner).

In the second manner, the transmitting device calculates, by using a plurality of parameters, a location of a first time symbol corresponding to the at least one port (including the first port) of the transmitting device, where when the plurality of parameters include port numbers, because the port numbers are different, locations, obtained through calculation by the transmitting device, of first time symbols corresponding to the at least one port are different obviously. In this case, each port has a unique first time symbol (that is, a reference signal is configured specific to each port in a time division manner); or when the plurality of parameters do not include a variable, that is, a port number, because other parameters are fixed values, locations, obtained through calculation by the transmitting device, of first time symbols corresponding to the at least one port are the same obviously. In this case, to avoid interference, in the first time symbol, subcarrier groups corresponding to the first time symbols corresponding to the at least one port are different (that is, a reference signal is configured specific to the at least one port in a frequency division manner).

Optionally, when the plurality of parameters include port numbers, the location of the first time symbol satisfies the following Formula 4:

$$u_{index}=\text{mod}(X, U_{Coh}) \quad \text{Formula 4}$$

where $u_{index}$ is the location of the first time symbol; $U_{Coh}$ is a quantity of time symbols included in the time period occupied by the resource; and X is l, or a sum of l and any one or a combination of Slot_ID, Cell_ID, and UE_ID.

Optionally, when the plurality of parameters do not include a port number, the location of the first time symbol satisfies the following Formula 5:

$$u_{index}=\text{mod}(Y, U_{Coh}) \quad \text{Formula 5}$$

where $u_{index}$ is the location of the first time symbol; $U_{Coh}$ is a quantity of time symbols included in the time period occupied by the resource; and Y is any one of Slot_ID, Cell_ID, and UE_ID, a sum of any two of the three items, or a sum of the three items.

Optionally, if the transmitting device obtains the location of the first time symbol by using different calculation methods, the obtaining, by the transmitting device, a location of each subcarrier that is in a subcarrier group and that is corresponding to the first time symbol is further affected.

When the transmitting device determines the location of the first time symbol by using Formula 4, the obtaining, by the transmitting device, a location of each subcarrier that is in a subcarrier group and that is corresponding to the first time symbol includes:

determining, by the transmitting device based on any one or a combination of the following: l, Slot_ID, Cell_ID, and UE_ID, the location of each subcarrier that is in the subcarrier group and that is corresponding to the first time symbol. Optionally, when the bandwidth range is averagely divided into a plurality of subcarrier sets, a quantity of the plurality of subcarrier sets is the same as a quantity of subcarriers that are included in the subcarrier group and that are corresponding to the first time symbol, and each subcarrier set includes one subcarrier that is in the subcarrier group and that is corresponding to the first time symbol; and the location of each subcarrier that is in the subcarrier group and that is corresponding to the first time symbol satisfies the following Formula 6 or Formula 7:

$$k1_{index}(n)=\mathrm{mod}(P,K_{SB})+(n-1)\cdot K_{SB} \qquad \text{Formula 6}$$

$$k1_{index}(n)=\mathrm{mod}(Q,K_{SB})+(n-1)\cdot K_{SB} \qquad \text{Formula 7}$$

where n=1, 2, ... N; N is a quantity of subcarriers that are in the subcarrier group and that are corresponding to the first time symbol; $k1_{index}(n)$ is a location of an $n^{th}$ subcarrier that is in the subcarrier group and that is corresponding to the first time symbol; $K_{SB}$ is a quantity of subcarriers included in each subcarrier set when the bandwidth range is averagely divided into a plurality of subcarrier sets; P in Formula 6 is any one of Slot_ID, Cell_ID, and UE_ID, a sum of any two of the three items, or a sum of the three items; and Q in Formula 7 is l, or a sum of l and any one or a combination of Slot_ID, Cell_ID, and UE_ID.

Because the transmitting device determines, by using Formula 4, a location of the first time symbol corresponding to the first port, that is, configures a reference signal specific to each port in a time division manner, different ports are corresponding to different first time symbols. Obviously, if different ports are corresponding to different first time symbols, resources occupied by reference signals corresponding to the different ports are different definitely. Therefore, during calculation of a location of each subcarrier that is in the subcarrier group and that is corresponding to the first time symbol corresponding to the first port, an interference problem does not need to be considered. When the transmitting device calculates, by using the plurality of parameters, the location of each subcarrier that is in the subcarrier group and that is corresponding to the first time symbol, the plurality of parameters may not include a port number, as shown in Formula 6; or may include port numbers, as shown in Formula 7. This is not limited in the present disclosure.

When the transmitting device determines the location of the first time symbol by using Formula 5, the obtaining, by the transmitting device, a location of each subcarrier that is in a subcarrier group and that is corresponding to the first time symbol includes:

determining, by the transmitting device based on l or based on l and any one or a combination of the following: Slot_ID, Cell_ID, and UE_ID, the location of each subcarrier that is in the subcarrier group and that is corresponding to the first time symbol. Optionally, when the bandwidth range is averagely divided into a plurality of subcarrier sets, a quantity of the plurality of subcarrier sets is the same as a quantity of subcarriers that are included in the subcarrier group and that are corresponding to the first time symbol, and each subcarrier set includes one subcarrier that is in the subcarrier group and that is corresponding to the first time symbol; and the location of each subcarrier that is in the subcarrier group and that is corresponding to the first time symbol satisfies the following Formula 8 or Formula 9:

when the transmitting device determines, based on l, the location of each subcarrier that is in the subcarrier group and that is corresponding to the first time symbol, the location of each subcarrier that is in the subcarrier group and that is corresponding to the first time symbol satisfies the following Formula 8:

$$k1_{index}(n)=\mathrm{mod}(l,K_{SB})+(n-1)\cdot K_{SB} \qquad \text{Formula 8}$$

when the transmitting device determines, based on l and any one or a combination of the following: Slot_ID, Cell_ID, and UE_ID, the location of each subcarrier that is in the subcarrier group and that is corresponding to the first time symbol, the location of each subcarrier that is in the subcarrier group and that is corresponding to the first time symbol satisfies the following Formula 9:

$$k1_{index}(n)=\mathrm{mod}(l+P,K_{SB})+(n-1)\cdot K_{SB} \qquad \text{Formula 9}$$

where n=1 ... N; N is a quantity of subcarriers that are in the subcarrier group and that are corresponding to the first time symbol; $k1_{index}(n)$ is a location of an $n^{th}$ subcarrier that is in the subcarrier group and that is corresponding to the first time symbol; $K_{SB}$ is a quantity of subcarriers included in each subcarrier set when the bandwidth range is averagely divided into a plurality of subcarrier sets; and P in Formula 9 is any one of Slot_ID, Cell_ID, and UE_ID, a sum of any two of the three items, or a sum of the three items.

Because the transmitting device determines, by using Formula 5, a location of the first time symbol corresponding to the first port, that is, configures a reference signal specific to each port in a frequency division manner, different ports are corresponding to a same first time symbol. Therefore, to avoid interference between the different ports, that reference signals corresponding to the different ports occupy different resources needs to be ensured. Based on the foregoing conclusion, when calculating the location of the subcarrier that is in the subcarrier group and that is corresponding to the first time symbol corresponding to each port, the transmitting device needs to use a port number, as shown in Formula 8; or use the plurality of parameters including port numbers, as shown in Formula 9.

Optionally, the obtaining, by the transmitting device, a location of a subcarrier that is within the bandwidth range and that is corresponding to each of time symbols in a time period except the first time symbol includes:

determining, by the transmitting device based on l and any one or a combination of the following: a location u of a second time symbol in the time period, Slot_ID, Cell_ID, and UE_ID, a location of a subcarrier that is within the bandwidth range and that is corresponding to the second time symbol, where the second time symbol is any time symbol in the time period other than the first time symbol. Specifically, when the bandwidth range is averagely divided into a plurality of subcarrier sets, a quantity of the plurality of subcarrier sets is the same as a quantity of subcarriers that are included in the subcarrier group and that are corresponding to the first time symbol, and each subcarrier set includes one subcarrier that is in the subcarrier group and that is corresponding to the first time symbol; and the location of the subcarrier that is within the bandwidth range and that is corresponding to the second time symbol satisfies the following Formula 10:

$$k2_{index} = \mod(l+R, K) \quad \text{Formula 10}$$

where $k2_{index}$ is the location of the subcarrier that is within the bandwidth range and that is corresponding to the second time symbol; R is any one of u, Slot_ID, Cell_ID, and UE_ID, a sum of any two or three of the four items, a sum of the four items, or $R = u \times K_{SB} + T$; T is any one of u, Slot_ID, Cell_ID, and UE_ID, a sum of any two of the four items, a sum of three of the four items, or a sum of the four items; $K_{SB}$ is a quantity of subcarriers included in each subcarrier set when the bandwidth range is averagely divided into a plurality of subcarrier sets; and K is a total quantity of subcarriers included within the bandwidth range.

In the foregoing method, the transmitting device may determine the configuration information of the reference signal for the first port. It can be learnt from the configuration information that one reference signal group is configured in the first time symbol and one reference signal is configured in each of time symbols except the first time symbol. Compared with the prior art in which at least one reference signal is configured in each OFDM symbol corresponding to each subband, in the method according to this embodiment of the present disclosure, on the premise that the receiving device can obtain a channel parameter of the first port, overheads of resources occupied by transmitted reference signals in the communications system can be reduced, so that service data transmission efficiency is improved.

Figure 4:
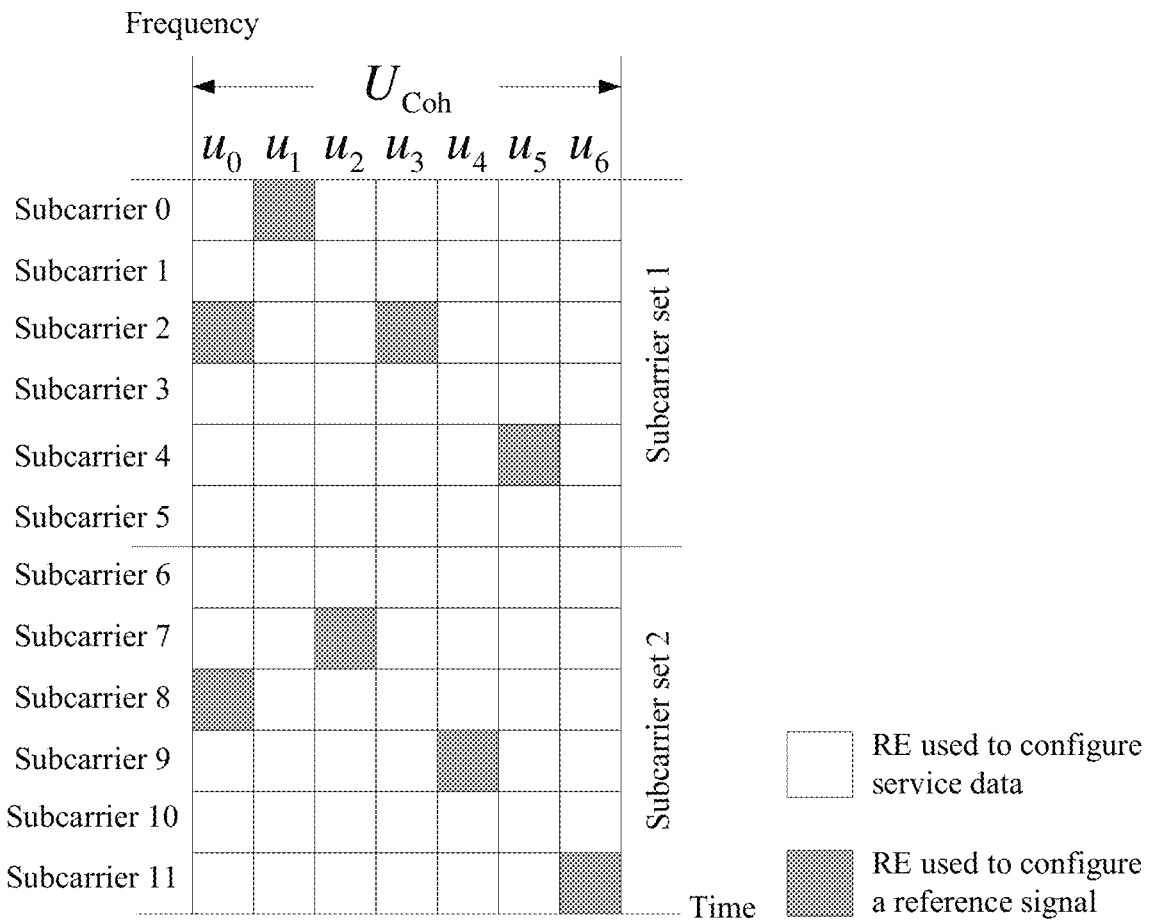
FIG. 4 is a schematic resource mapping diagram specific to one port according to an embodiment of the present disclosure.

For example, when a bandwidth range allocated by a communications system to the receiving device is divided into two subcarrier sets and each time period (one coherence time) includes seven time symbols, a manner of configuring, by the communications system, a reference signal specific to the first port is shown in FIG. 4. A first time symbol is $u_0$, a subcarrier group that is used to configure a reference signal and that is corresponding to $u_0$ includes a subcarrier 2 in a subcarrier set 1 and a subcarrier 8 in a subcarrier set 2, and each of the other six time symbols is corresponding to one subcarrier used to configure a reference signal. As shown in the figure, it can be learnt from a reference-signal resource mapping diagram, specific to one port, shown in the figure that, reference signals are configured on eight REs included in 42 REs. Compared with the prior art shown in FIG. 1 in which reference signals are configured on at least 14 REs, the reference signal transmission method provided in this embodiment of the present disclosure can reduce overheads of resources occupied by reference signals.

Step 302: The transmitting device sends, on the resource indicated by the configuration information, the reference signal corresponding to the first port.

Optionally, when there are a plurality of ports of the transmitting device, the transmitting device may determine configuration information of a reference signal for each port by using the method in step 301. According to step 301, the transmitting device may configure the reference signals specific to the plurality of ports in a time division manner or a frequency division manner. To avoid interference on channel measurement performed on different ports, when the transmitting device sends a reference signal corresponding to one of the plurality of ports, a resource occupied by a reference signal corresponding to another port is idle, and is not used to send a reference signal or service data.

For example, the transmitting device in a communications system includes two ports: a port 1 and a port 2, a bandwidth range allocated by the communications system to the receiving device is divided into two subcarrier sets, and each time period includes seven time symbols.

Figure 5:
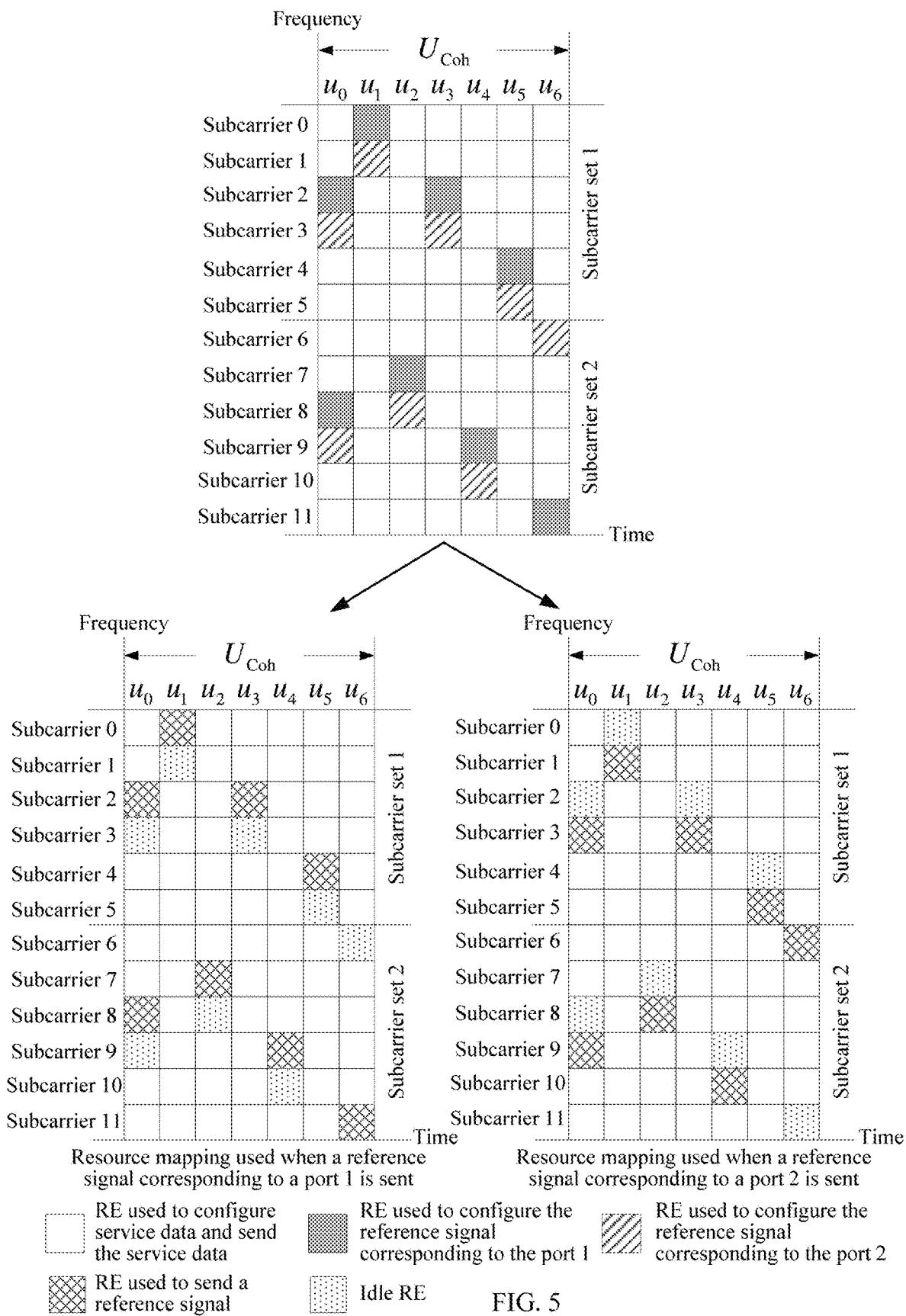
FIG. 5 is a schematic resource mapping diagram specific to two ports according to an embodiment of the present disclosure.

When the transmitting device configures reference signals specific to the port 1 and the port 2 in a frequency division manner, referring to FIG. 5, a first time symbol corresponding to the port 1 and a first time symbol corresponding to the port 2 are the same, and both are a time symbol $u_0$. When sending a reference signal corresponding to the port 1, the transmitting device sends, on a resource occupied by the reference signal corresponding to the port 1, the reference signal corresponding to the port 1, a resource occupied by a reference signal corresponding to the port 2 is idle, and service data is sent on the other resources. Likewise, when sending the reference signal corresponding to the port 2, the transmitting device sends, on the resource occupied by the reference signal corresponding to the port 2, the reference signal corresponding to the port 2, the resource occupied by the reference signal corresponding to the port 1 is idle, and service data is sent on the other resources.

Figure 6:
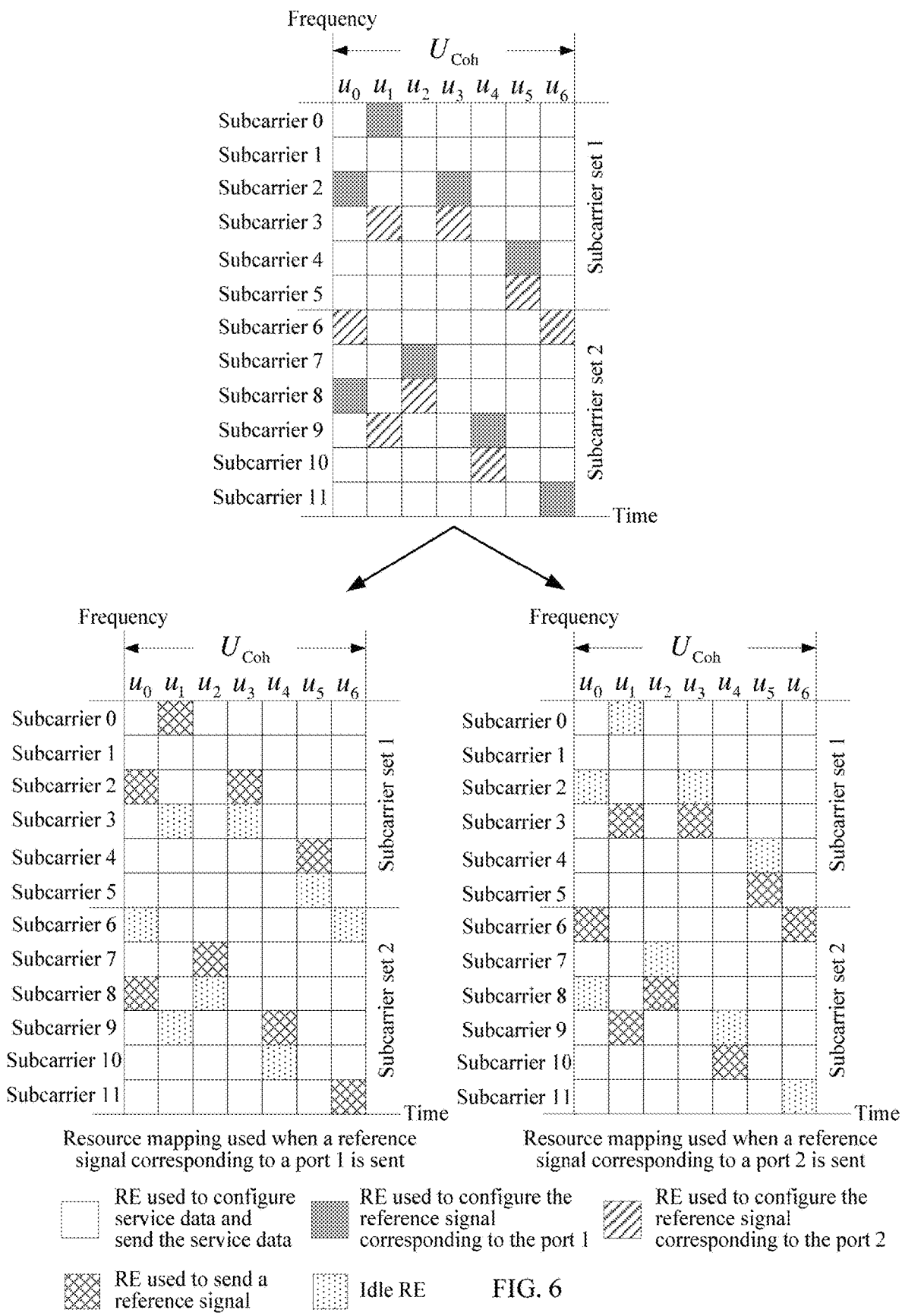
FIG. 6 is another schematic resource mapping diagram specific to two ports according to an embodiment of the present disclosure.

When the transmitting device configures reference signals specific to the port 1 and the port 2 in a time division manner, referring to FIG. 6, a first time symbol corresponding to the port 1 is $u_0$ and a first time symbol corresponding to the port 2 is $u_1$. When sending a reference signal corresponding to the port 1, the transmitting device sends, on a resource occupied by the reference signal corresponding to the port 1, the reference signal corresponding to the port 1, a resource occupied by a reference signal corresponding to the port 2 is idle, and service data is sent on the other resources. Likewise, when sending the reference signal corresponding to the port 2, the transmitting device sends, on the resource occupied by the reference signal corresponding to the port 2, the reference signal corresponding to the port 2, the resource occupied by the reference signal corresponding to the port 1 is idle, and service data is sent on the other resources.

In the reference signal transmission method provided in this embodiment of the present disclosure, the transmitting device sends, on the resource indicated by the configuration information of the reference signal for the first port, the reference signal corresponding to the first port; and the receiving device receives, on the resource, the reference signal corresponding to the first port that is sent by the transmitting device, and determines the channel parameter of the first port based on the received reference signal. The configuration information includes: in time domain, the location of the first time symbol; and in frequency domain, the location of each subcarrier that is in the subcarrier group within the specified bandwidth range and that is corresponding to the first time symbol, and the location of the subcarrier that is within the bandwidth range and that is corresponding to each of time symbols, in the time period occupied by the resource, except the first time symbol. It can be learnt from the configuration information that one reference signal group is configured in the first time symbol and one reference signal is configured in each of time symbols except the first time symbol. Compared with the prior art in which at least one reference signal is configured in each OFDM symbol corresponding to each subband, in the method according to this embodiment of the present disclosure, on the premise that the receiving device can obtain the channel parameter of the first port, overheads of resources occupied by transmitted reference signals in the communications system can be reduced, so that service data transmission efficiency is improved.

Figure 7:
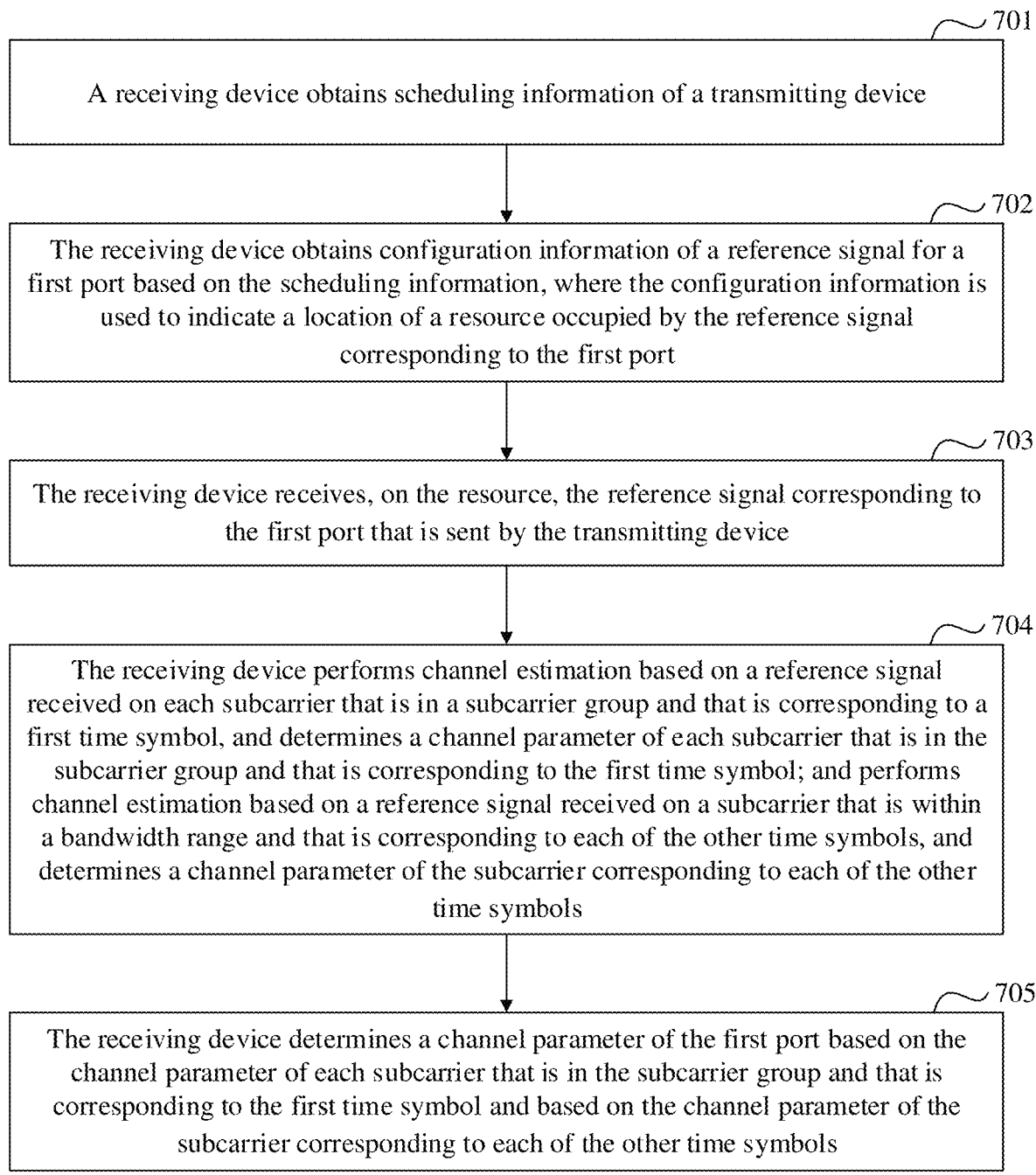
FIG. 7 is a flowchart of another reference signal transmission method according to an embodiment of the present disclosure.

Based on the foregoing embodiment, an embodiment of the present disclosure further provides another reference signal transmission method, which is applied to a receiving device in a communications system. A transmitting device in the communications system can implement the reference signal transmission method shown in FIG. 3, and send a reference signal to the receiving device. Referring to FIG. 7, a specific procedure for the method includes the following steps.

Step 701: The receiving device obtains scheduling information of the transmitting device, where the scheduling information includes a port number 1 of a first port and a bandwidth range configured by the transmitting device, and the bandwidth range includes a plurality of subcarriers.

Before sending a reference signal corresponding to the first port to the receiving device, the transmitting device in the communications system needs to send the scheduling information to the receiving device in advance, so that the receiving device obtains, based on the scheduling information, a location of a resource occupied by the reference signal corresponding to the first port.

Optionally, the scheduling information includes the port number of the first port and the bandwidth range configured by the transmitting device for the receiving device, and may further include information such as a timeslot number Slot_ID of the resource and a cell number Cell_ID of the transmitting device. This is not limited in the present disclosure.

Step 702: The receiving device obtains configuration information of a reference signal for the first port based on the scheduling information, where the configuration information is used to indicate a location of a resource occupied by the reference signal corresponding to the first port; the configuration information includes: in time domain, a location of a first time symbol; and in frequency domain, a location of each subcarrier that is in a subcarrier group within the bandwidth range and that is corresponding to the first time symbol, and a location of a subcarrier that is within the bandwidth range and that is corresponding to each of time symbols, in a time period occupied by the resource, except the first time symbol; and a subcarrier group corresponding to the first time symbol corresponding to each port includes a plurality of subcarriers.

Because the transmitting device in the communications device uses the reference signal transmission method shown in FIG. 3 to send a reference signal to the receiving device, to ensure that the receiving device can accurately receive the reference signal corresponding to the first port that is sent by the transmitting device, the configuration information for the first port that is obtained by the receiving device in step 702 is the same as the configuration information of the reference signal for the first port that is obtained by the transmitting device in step 301. The transmitting device and the receiving device jointly agree on, in advance, a method for determining the configuration information for the first port. Obviously, a method and a principle that are used by the receiving device to determine the configuration information of the reference signal for the first port are the same as those used by the transmitting device to determine the configuration information of the reference signal for the first port. In this embodiment of the present disclosure, for the principle used by the receiving device to determine the configuration information of the reference signal for the first port, refer to the principle used by the receiving device to determine the configuration information of the reference signal for the first port in step 301 in the foregoing embodiment. Repeated content is not described herein again.

Optionally, the receiving device may obtain the location of the first time symbol in the following two manners:

a first manner: determining, by the receiving device based on a stored correspondence between a port number and a location of a time symbol, the location of the first time symbol corresponding to the port number of the first port, where the receiving device and the transmitting device store a same correspondence between a port number and a location of a time symbol; or a second manner: when the scheduling information further includes the timeslot number Slot_ID of the resource and the cell number Cell_ID of the transmitting device, determining, by the receiving device, the location of the first time symbol based on any one or a combination of the following: 1, Slot_ID, Cell_ID, and a receiving device number UE_ID.

In the second manner, when the transmitting device configures a reference signal specific to each port in a time division manner, the location of the first time symbol that is determined by the receiving device satisfies the following Formula 4:

$$u_{index} = \mathrm{mod}(X, U_{Coh}) \quad \text{Formula 4}$$

where $u_{index}$ is the location of the first time symbol; $U_{Coh}$ is a quantity of time symbols included in the time period occupied by the resource; and X is 1, or a sum of 1 and any one or a combination of Slot_ID, Cell_ID, and UE_ID. When the transmitting device and the receiving device agree on using Formula 4, X in Formula 4 used by the transmitting device and the receiving device is a same parameter or a sum of same parameters.

In the second manner, when the transmitting device configures a reference signal specific to each port in a frequency division manner, the location of the first time symbol that is determined by the receiving device satisfies the following Formula 5:

$$u_{index} = \mathrm{mod}(Y, U_{Coh}) \quad \text{Formula 5}$$

where $u_{index}$ is the location of the first time symbol; $U_{Coh}$ is a quantity of time symbols included in the time period occupied by the resource; and Y is any one of Slot_ID, Cell_ID, and UE_ID, a sum of any two of the three items, or a sum of the three items. When the transmitting device and the receiving device agree on using Formula 5, Y in Formula 5 used by the transmitting device and the receiving device is a same parameter or a sum of same parameters.

When the receiving device determines the location of the first time symbol by using Formula 4, the obtaining, by the receiving device, a location of each subcarrier that is in a subcarrier group and that is corresponding to the first time symbol includes:

determining, by the receiving device based on any one or a combination of the following: 1, Slot_ID, Cell_ID, and UE_ID, the location of each subcarrier that is in the subcarrier group and that is corresponding to the first time symbol. Optionally, when the bandwidth range is averagely divided into a plurality of subcarrier sets, a quantity of the plurality of subcarrier sets is the same as a quantity of subcarriers that are included in the subcarrier group and that are corresponding to the first time symbol, and each subcarrier set includes one subcarrier that is in the subcarrier group and that is corresponding to the first time symbol; and the location of each subcarrier that is in the subcarrier group and that is corresponding to the first time symbol satisfies the following Formula 6 or Formula 7:

$$k1_{index}(n) = \mathrm{mod}(P, K_{SB}) + (n-1) \cdot K_{SB} \quad \text{Formula 6}$$

$$k1_{index}(n) = \mathrm{mod}(Q, K_{SB}) + (n-1) \cdot K_{SB} \quad \text{Formula 7}$$

where n=1, 2, ... N; N is a quantity of subcarriers that are in the subcarrier group and that are corresponding to the first time symbol; $k1_{index}(n)$ is a location of an $n^{th}$ subcarrier that is in the subcarrier group and that is corresponding to the first time symbol; $K_{SB}$ is a quantity of subcarriers included in each subcarrier set when the bandwidth range is averagely divided into a plurality of subcarrier sets; P in Formula 6 is any one of Slot_ID, Cell_ID, and UE_ID, a sum of any two of the three items, or a sum of the three items; and Q in Formula 7 is l, or a sum of l and any one or a combination of Slot_ID, Cell_ID, and UE_ID. When the transmitting device and the receiving device agree on using Formula 6, P in Formula 6 used by the transmitting device and the receiving device is a same parameter or a sum of same parameters; when the transmitting device and the receiving device agree on using Formula 7, Q in Formula 7 used by the transmitting device and the receiving device is a same parameter or a sum of same parameters.

When the receiving device determines the location of the first time symbol by using Formula 5, the obtaining, by the receiving device, a location of each subcarrier that is in a subcarrier group and that is corresponding to the first time symbol includes:

determining, by the receiving device based on l or based on l and any one or a combination of the following: Slot_ID, Cell_ID, and UE_ID, the location of each subcarrier that is in the subcarrier group and that is corresponding to the first time symbol. Optionally, when the bandwidth range is averagely divided into a plurality of subcarrier sets, a quantity of the plurality of subcarrier sets is the same as a quantity of subcarriers that are included in the subcarrier group and that are corresponding to the first time symbol, and each subcarrier set includes one subcarrier that is in the subcarrier group and that is corresponding to the first time symbol; and the location of each subcarrier that is in the subcarrier group and that is corresponding to the first time symbol satisfies the following Formula 8 or Formula 9:

when the receiving device determines, based on l, the location of each subcarrier that is in the subcarrier group and that is corresponding to the first time symbol, the location of each subcarrier that is in the subcarrier group and that is corresponding to the first time symbol satisfies the following Formula 8:

$$k1_{index}(n)=\mod(l,K_{SB})+(n-1)\cdot K_{SB} \quad \text{Formula 8}$$

when the receiving device determines, based on l and any one or a combination of the following: Slot_ID, Cell_ID, and UE_ID, the location of each subcarrier that is in the subcarrier group and that is corresponding to the first time symbol, the location of each subcarrier that is in the subcarrier group and that is corresponding to the first time symbol satisfies the following Formula 9:

$$k1_{index}(n)=\mod(l+P,K_{SB})+(n-1)\cdot K_{SB} \quad \text{Formula 9}$$

where n=1, 2, ... N; N is a quantity of subcarriers that are in the subcarrier group and that are corresponding to the first time symbol; $k1(n)$ is a location of an $n^{th}$ subcarrier that is in the subcarrier group and that is corresponding to the first time symbol; $K_{SB}$ is a quantity of subcarriers included in each subcarrier set when the bandwidth range is averagely divided into a plurality of subcarrier sets; and P is any one of Slot_ID, Cell_ID, and UE_ID, a sum of any two of the three items, or a sum of the three items. When the transmitting device and the receiving device agree on using Formula 9, P in Formula 9 used by the transmitting device and the receiving device is a same parameter or a sum of same parameters.

Optionally, the obtaining, by the receiving device, a location of a subcarrier that is within the bandwidth range and that is corresponding to each of time symbols in a time period except the first time symbol includes:

determining, by the receiving device based on l and any one or a combination of the following: a location u of a second time symbol in the time period, Slot_ID, Cell_ID, and UE_ID, a location of a subcarrier that is within the bandwidth range and that is corresponding to the second time symbol, where the second time symbol is any time symbol in the time period other than the first time symbol. Specifically, when the bandwidth range is averagely divided into a plurality of subcarrier sets, a quantity of the plurality of subcarrier sets is the same as a quantity of subcarriers that are included in the subcarrier group and that are corresponding to the first time symbol, and each subcarrier set includes one subcarrier that is in the subcarrier group and that is corresponding to the first time symbol; and the location of the subcarrier that is within the bandwidth range and that is corresponding to the second time symbol satisfies the following Formula 10:

$$k2_{index}=\mod(l+R,K) \quad \text{Formula 10}$$

where $k2_{index}$ is the location of the subcarrier that is within the bandwidth range and that is corresponding to the second time symbol; R is any one of u, Slot_ID, Cell_ID, and UE_ID, a sum of any two or three of the four items, a sum of the four items, or $R=u\times K_{SB}+T$; T is any one of u, Slot_ID, Cell_ID, and UE_ID, a sum of any two of the four items, a sum of three of the four items, or a sum of the four items; $K_{SB}$ is a quantity of subcarriers included in each subcarrier set when the bandwidth range is averagely divided into a plurality of subcarrier sets; and K is a total quantity of subcarriers included within the bandwidth range. When the transmitting device and the receiving device agree on using Formula 10, R in Formula 10 used by the transmitting device and the receiving device is a same parameter or a sum of same parameters; and when $R=u\times K_{SB}$ T holds true, T is also a same parameter or a sum of same parameters.

In the foregoing method, the receiving device may determine the configuration information of the reference signal for the first port. It can be learnt from the configuration information that one reference signal group is configured in the first time symbol and one reference signal is configured in each of time symbols except the first time symbol. Compared with the prior art in which at least one reference signal is configured in each OFDM symbol corresponding to each subband, in the method according to this embodiment of the present disclosure, on the premise that the receiving device can obtain a channel parameter of the first port, overheads of resources occupied by transmitted reference signals in the communications system can be reduced, so that service data transmission efficiency is improved.

Step 703: The receiving device receives, on the resource, the reference signal corresponding to the first port that is sent by the transmitting device.

Step 704: The receiving device performs channel estimation based on a reference signal received on each subcarrier that is in the subcarrier group and that is corresponding to the first time symbol, and determines a channel parameter of each subcarrier that is in the subcarrier group and that is corresponding to the first time symbol; and performs channel estimation based on a reference signal received on the subcarrier that is within the bandwidth range and that is corresponding to each of the other time symbols, and determines a channel parameter of the subcarrier corresponding to each of the other time symbols.

In step 704, the receiving device may obtain, through a conventional technology by using a reference signal received on any subcarrier corresponding to any time symbol and a reference signal agreed on between the receiving device and the transmitting device (that is, a reference signal sent by the transmitting device), a channel parameter of the subcarrier corresponding to the time symbol. A specific method is not described in this embodiment of the present disclosure again.

It should be noted that all the channel parameters determined in this step are channel parameters including phase noises.

Step 705: The receiving device determines a channel parameter of the first port based on the channel parameter of each subcarrier that is in the subcarrier group and that is corresponding to the first time symbol and based on the channel parameter of the subcarrier corresponding to each of the other time symbols.

Optionally, when the bandwidth range is averagely divided into a plurality of subcarrier sets, a quantity of the plurality of subcarrier sets is the same as a quantity of subcarriers that are included in the subcarrier group and that are corresponding to the first time symbol, and each subcarrier set includes one subcarrier that is in the subcarrier group and that is corresponding to the first time symbol; and the determining, by the receiving device, a channel parameter of the first port based on the channel parameter of each subcarrier that is in the subcarrier group and that is corresponding to the first time symbol and based on the channel parameter of the subcarrier corresponding to each of the other time symbols includes:

using, by the receiving device, the channel parameter of each subcarrier that is in the subcarrier group and that is corresponding to the first time symbol, as a channel parameter of a subcarrier set to which each subcarrier that is in the subcarrier group and that is corresponding to the first time symbol belongs, and using the channel parameter of the subcarrier corresponding to each of the other time symbols, as a channel parameter of a first subcarrier set to which the subcarrier corresponding to each of the other time symbols belongs, where the subcarrier set is obtained by grouping the plurality of subcarriers within the bandwidth range, and each subcarrier set includes one subcarrier that is in the subcarrier group and that is corresponding to the first time symbol;

determining, by the receiving device, a channel parameter of each of subcarrier sets, corresponding to a time symbol, except the first subcarrier set based on the channel parameter of the subcarrier set to which each subcarrier that is in the subcarrier group and that is corresponding to the first time symbol belongs and based on the channel parameter of the first subcarrier set to which the subcarrier corresponding to each of the other time symbols belongs; and determining, by the receiving device, the channel parameter of the first port based on a channel parameter of each subcarrier set corresponding to each time symbol in the time period.

Optionally, the determining, by the receiving device, a channel parameter of each of subcarrier sets, corresponding to a time symbol, except the first subcarrier set includes:

determining, by the receiving device based on the channel parameter of the subcarrier set to which each subcarrier that is in the subcarrier group and that is corresponding to the first time symbol belongs and based on a channel parameter of the first subcarrier set to which a subcarrier corresponding to a third time symbol belongs, a channel parameter of a second subcarrier set corresponding to the third time symbol, where the third time symbol is any time symbol in the time period other than the first time symbol, and the second subcarrier set is any subcarrier set that is other than the first subcarrier set and that is corresponding to the third time symbol; and the determining, by the receiving device, a channel parameter of a second subcarrier set corresponding to the third time symbol includes:

multiplying, by the receiving device, a channel parameter of the second subcarrier set corresponding to the first time symbol by the channel parameter of the first subcarrier set corresponding to the third time symbol, and dividing an obtained multiplication result by a channel parameter of the first subcarrier set corresponding to the first time symbol, to obtain the channel parameter of the second subcarrier set corresponding to the third time symbol.

Resource mapping, specific to one port, shown in FIG. 4 is still used as an example. By using step 704, the receiving device may determine a channel parameter of a subcarrier 2 corresponding to $u_0$ and a channel parameter of a subcarrier 8 corresponding to $u_0$, use the channel parameter of the subcarrier 2 corresponding to $u_0$, as a channel parameter $\hat{H}_1(u_0)$ of a subcarrier set 1 corresponding to $u_0$, and use the channel parameter of the subcarrier 8 corresponding to $u_0$, as a channel parameter $\hat{H}_2(u_0)$ of a subcarrier set 2 corresponding to $u_0$. In consideration of impact of a noise, $\hat{H}_1(u_0) \approx e^{j(\theta_T(u_0)+\theta_R(u_0))}\tilde{H}_1$ and $\hat{H}_2(u_0) \approx e^{j(\theta_T(u_0)+\theta_R(u_0))}\tilde{H}_2$ hold true.

The receiving device determines a channel parameter of a subcarrier 0 corresponding to $u_1$, uses the channel parameter of the subcarrier 0 corresponding to $u_1$, as a channel parameter $\hat{H}_1(u_1)$ of the subcarrier set 1 corresponding to $u_1$. In consideration of impact of a noise, $\hat{H}_1(u_1) \approx e^{j(\theta_T(u_1)+\theta_R(u_1))}\tilde{H}_1$ holds true. A channel parameter of the subcarrier set 2 corresponding to $u_1$ may be represented as $\hat{H}_2(u_1) \approx e^{j(\theta_T(u_1)+\theta_R(u_0))}\tilde{H}_2$.

No reference signal is transmitted on a subcarrier in the subcarrier set 2 corresponding to $u_1$, and in this case, $\tilde{H}_2(u_1)$ needs to be determined by using Formula 11:

$$\hat{H}_2(u_1) \approx e^{j(\theta_T(u_1)+\theta_R(u_1))}\tilde{H}_2 = \frac{\hat{H}_2(u_0)}{\hat{H}_1(u_0)}\hat{H}_1(u_1) \quad \text{Formula 11}$$

Likewise, the receiving device determines a channel parameter of a subcarrier 7 corresponding to $u_2$, uses the channel parameter of the subcarrier 7 corresponding to $u_2$, as a channel parameter $\hat{H}_2(u_2)$ of the subcarrier set 2 corresponding to $u_2$. In consideration of impact of a noise, $\hat{H}_2(u_2) \approx e^{j(\theta_T(u_2)+\theta_R(u_2))}\tilde{H}_1$ holds true. A channel parameter of the subcarrier set 1 corresponding to $u_2$ may be represented as $\hat{H}_1(u_2) \approx e^{j(\theta_T(u_2)+\theta_R(u_2))}\tilde{H}_1$, where $\hat{H}_1(u_2)$ may be determined by using Formula 12:

$$\hat{H}_1(u_2) \approx e^{j(\theta_T(u_2)+\theta_R(u_2))}\tilde{H}_1 = \frac{\hat{H}_1(u_0)}{\hat{H}_2(u_0)}\hat{H}_2(u_2) \quad \text{Formula 12}$$

According to the foregoing method, the receiving device may determine a channel parameter of each subcarrier set corresponding to each time symbol within $u_0 \sim u_6$, and determine the channel parameter of the first port.

In the reference signal transmission method provided in this embodiment of the present disclosure, the transmitting device sends, on the resource indicated by the configuration information of the reference signal for the first port, the reference signal corresponding to the first port; and the receiving device receives, on the resource, the reference signal corresponding to the first port that is sent by the transmitting device, and determines the channel parameter of the first port based on the received reference signal. The configuration information includes: in time domain, the location of the first time symbol; and in frequency domain, the location of each subcarrier that is in the subcarrier group within the specified bandwidth range and that is corresponding to the first time symbol, and the location of the subcarrier that is within the bandwidth range and that is corresponding to each of time symbols, in the time period occupied by the resource, except the first time symbol. It can be learnt from the configuration information that one reference signal group is configured in the first time symbol and one reference signal is configured in each of time symbols except the first time symbol. Compared with the prior art in which at least one reference signal is configured in each OFDM symbol corresponding to each subband, in the method according to this embodiment of the present disclosure, on the premise that the receiving device can obtain the channel parameter of the first port, overheads of resources occupied by transmitted reference signals in the communications system can be reduced, so that service data transmission efficiency is improved.

It can be learnt from the foregoing descriptions that in the reference signal transmission method shown in FIG. 3 or FIG. 7, regardless of configuring, by the communications system, a reference signal specific to each port of the transmitting device in a time division manner or a frequency division manner, during actual transmission, to avoid interference on channel measurement performed on different ports, when the transmitting device sends a reference signal corresponding to one of the plurality of ports, a resource occupied by a reference signal corresponding to another port is idle, and is not used to send a reference signal or service data, for example, as shown in FIG. 5 or FIG. 6. Because the transmitting device can send only a reference signal corresponding to one port each time, the receiving device can determine only a channel parameter of one port each time. In this case, it is required that the transmitting device should send a reference signal for a plurality of times and the receiving device should determine a channel parameter for a plurality of times, so that the receiving device determines channel parameters of a plurality of ports. This reduces working efficiency of the transmitting device and the receiving device, and increases a time for determining, by the receiving device, the channel parameters of the plurality of ports. To improve working efficiency of the transmitting device and the receiving device in the communications system, and reduce a time for determining, by the receiving device, the channel parameters of the plurality of ports of the transmitting device, and an embodiment of the present disclosure further provides a reference signal transmission method, which is applied to the transmitting device in the communications system. Referring to FIG. 8, a procedure for the reference signal transmission method includes the following steps.

Step 801: The transmitting device obtains configuration information for a plurality of ports of the transmitting device, where the configuration information is used to indicate locations of resources occupied by reference signals corresponding to the plurality of ports; the configuration information includes: in time domain, a location of a first time symbol; and in frequency domain, a location of each subcarrier that is in a subcarrier group within a specified bandwidth range and that is corresponding to the first time symbol corresponding to each port, and a location of a subcarrier that is within the bandwidth range and that is corresponding to each of time symbols, corresponding to each port and in a time period occupied by the resources, except the first time symbol; the subcarrier group includes a plurality of subcarriers; the bandwidth range is configured by the transmitting device; and the bandwidth range includes a plurality of subcarriers.

Optionally, the plurality of ports may be all ports of the transmitting device, or may be some ports of the transmitting device. This is not limited in the present disclosure.

Optionally, the transmitting device may obtain the location of the first time symbol in the following two manners:

a first manner: obtaining, by the transmitting device, a port number of each of the plurality of ports; determining a first port group including the port number of each of the plurality of ports; and determining, based on a stored correspondence between a port group and a location of a time symbol, the location of the first time symbol corresponding to the first port group, where in the correspondence between a port group and a location of a time symbol, one or more port groups are corresponding to the location of the first time symbol; or a second manner: determining, by the transmitting device, the location of the first time symbol based on any one or a combination of the following: a timeslot number Slot_ID of the resource, a cell number Cell_ID of the transmitting device, and a receiving device number UE_ID.

In the first manner, the communications system divides all the ports of the transmitting device into different port groups, where the plurality of ports are some ports of the transmitting device; and the transmitting device each time sends reference signals corresponding to a plurality of ports included in one port group. This can improve working efficiency of the transmitting device and the receiving device. In the correspondence, stored in the transmitting device, between a port group and a location of a time symbol, one time symbol may be corresponding to a unique port group (that is, reference signals corresponding to different port groups are configured in a time division manner). Alternatively, one time symbol may be corresponding to a plurality of port groups; to avoid interference, in the time symbol, subcarrier groups corresponding to the time symbol corresponding to all ports in the plurality of port groups are different (that is, reference signals corresponding to different port groups are configured in a frequency division manner).

In the second manner, the transmitting device determines, by using a plurality of parameters, the location of the first time symbol corresponding to the plurality of ports. Because the plurality of ports are corresponding to a location of one first time symbol, the plurality of parameters cannot include variables, that is, port numbers that are different when there are different ports.

Optionally, the location of the first time symbol satisfies the following Formula 5:

$$u_{index} = \mathrm{mod}(Y, U_{Coh}) \quad \text{Formula 5}$$

where $u_{index}$ is the location of the first time symbol; $U_{Coh}$ is a quantity of time symbols included in the time period occupied by the resource; and Y is any one of Slot_ID, Cell_ID, and UE_ID, a sum of any two of the three items, or a sum of the three items.

Optionally, the obtaining, by the transmitting device, a location of each subcarrier that is in a subcarrier group and that is corresponding to the first time symbol corresponding to each port includes:

determining, by the transmitting device based on a port number l of a first port or based on l and any one or a combination of the following: Slot_ID, Cell_ID, and UE_ID, a location of each subcarrier that is in the subcarrier group and that is corresponding to the first time symbol corresponding to the first port, where the first port is any of the plurality of ports. Optionally, when the bandwidth range is averagely divided into a plurality of subcarrier sets, a quantity of the plurality of subcarrier sets is the same as a quantity of subcarriers that are included in the subcarrier group and that are corresponding to the first time symbol, and each subcarrier set includes one subcarrier that is in the subcarrier group and that is corresponding to the first time symbol corresponding to each port; and the location of each subcarrier that is in the subcarrier group and that is corresponding to the first time symbol corresponding to the first port satisfies the following Formula 8 or Formula 9:

when the transmitting device determines, based on l, the location of each subcarrier that is in the subcarrier group and that is corresponding to the first time symbol corresponding to the first port, the location of each subcarrier that is in the subcarrier group and that is corresponding to the first time symbol corresponding to the first port satisfies the following Formula 8:

$$k1_{index}(n)=\mod(l,K_{SB})+(n-1)\cdot K_{SB} \qquad \text{Formula 8}$$

when the transmitting device determines, based on l and any one or a combination of the following: Slot_ID, Cell_ID, and UE_ID, the location of each subcarrier that is in the subcarrier group and that is corresponding to the first time symbol corresponding to the first port, the location of each subcarrier that is in the subcarrier group and that is corresponding to the first time symbol corresponding to the first port satisfies the following Formula 9:

$$k1_{index}(n)=\mod(l+P,K_{SB})+(n-1)\cdot K_{SB} \qquad \text{Formula 9}$$

where n=1, 2, ... N; N is a quantity of subcarriers that are in the subcarrier group and that are corresponding to the first time symbol corresponding to the first port; $k1_{index}(n)$ is a location of an $n^{th}$ subcarrier that is in the subcarrier group and that is corresponding to the first time symbol corresponding to the first port; $K_{SB}$ is a quantity of subcarriers included in each subcarrier set when the bandwidth range is averagely divided into a plurality of subcarrier sets; and P in Formula 9 is any one of Slot_ID, Cell_ID, and UE_ID, a sum of any two of the three items, or a sum of the three items.

Because the plurality of ports are corresponding to a location of one first time symbol, different ports in the plurality of ports are corresponding to a same first time symbol. Therefore, to avoid interference between the different ports, that reference signals corresponding to the different ports occupy different resources needs to be ensured. Based on the foregoing conclusion, when calculating the location of the subcarrier that is in the subcarrier group and that is corresponding to the first time symbol corresponding to each port, the transmitting device needs to use a variable such as a port number, as shown in Formula 8; or use the plurality of parameters including port numbers, as shown in Formula 9.

Optionally, the obtaining, by the transmitting device, a location of a subcarrier that is within the bandwidth range and that is corresponding to each of time symbols, corresponding to each port, in a time period except the first time symbol includes:

determining, by the transmitting device based on the port number l of the first port and any one or a combination of the following: u, Slot_ID, Cell_ID, and UE_ID, a location of a subcarrier that is within the bandwidth range and that is corresponding to the second time symbol corresponding to the first port, where the first port is any of the plurality of ports, and the second time symbol is any time symbol in the time period other than the first time symbol. Specifically, when the bandwidth range is averagely divided into a plurality of subcarrier sets, a quantity of the plurality of subcarrier sets is the same as a quantity of subcarriers that are included in the subcarrier group and that are corresponding to the first time symbol, and each subcarrier set includes one subcarrier that is in the subcarrier group and that is corresponding to the first time symbol corresponding to each port; and the location of the subcarrier that is within the bandwidth range and that is corresponding to the second time symbol corresponding to the first port satisfies the following Formula 10:

$$k2_{index}=\mod(l+R,K) \qquad \text{Formula 10}$$

where $k2_{index}$ is the location of the subcarrier that is within the bandwidth range and that is corresponding to the second time symbol corresponding to the first port; R is any one of u, Slot_ID, Cell_ID, and UE_ID, a sum of any two or three of the four items, a sum of the four items, or $R=u \times K_{SB}T$; T is any one of u, Slot_ID, Cell_ID, and UE_ID, a sum of any two of the four items, a sum of three of the four items, or a sum of the four items; $K_{SB}$ is a quantity of subcarriers included in each subcarrier set when the bandwidth range is averagely divided into a plurality of subcarrier sets; and K is a total quantity of subcarriers included within the bandwidth range.

In the foregoing method, the transmitting device may determine the configuration information of the reference signals for the plurality of ports. It can be learnt from the configuration information that one reference signal group is configured in the first time symbol corresponding to each port and one reference signal is configured in each of time symbols, corresponding to each port, except the first time symbol. Compared with the prior art in which at least one reference signal is configured in each OFDM symbol corresponding to each subband corresponding to each port, in the method according to this embodiment of the present disclosure, on the premise that the receiving device can obtain channel parameters of the plurality of ports, overheads of resources occupied by transmitted reference signals in the communications system can be reduced, so that service data transmission efficiency is improved.

For example, when a bandwidth range allocated by a communications system to the receiving device is divided into two subcarrier sets and each time period (one coherence time) includes seven time symbols, a manner of configuring, by the communications system, reference signals specific to a port 1 and a port 2 of the transmitting device is shown in FIG. 9. A first time symbol is $u_0$, a subcarrier group that is used to configure a reference signal and that is corresponding to $u_0$ corresponding to the port 1 includes a subcarrier 2 in a subcarrier set 1 and a subcarrier 8 in a subcarrier set 2, a subcarrier group that is used to configure a reference signal and that is corresponding to $u_0$ corresponding to the port 2 includes a subcarrier 3 in the subcarrier set 1 and a subcarrier 9 in the subcarrier set 2, and each of the other six time symbols corresponding to the port 1 and the port 2 is corresponding to one subcarrier used to configure a reference signal. As shown in the figure, it can be learnt from a reference-signal resource mapping diagram, specific to one port, shown in the figure that, reference signals are configured on 16 REs included in 42 REs. Compared with the prior art shown in FIG. 1 in which reference signals corresponding to the port 1 and the port 2 are configured on at least 28

REs, the reference signal transmission method provided in this embodiment of the present disclosure can reduce overheads of resources occupied by reference signals.

Step 802: The transmitting device sends, on the resources that are indicated by the configuration information and that are occupied by the reference signals corresponding to the plurality of ports, the reference signals corresponding to the plurality of ports.

Optionally, to avoid mutual interference between the plurality of ports that is caused when the transmitting device simultaneously sends the reference signals corresponding to the plurality of ports and the receiving device performs channel measurement on the plurality of ports, when the transmitting device performs step 802, that the transmitting device configures the reference signals specific to the plurality of ports specifically includes:

multiplying, by the transmitting device, the reference signals corresponding to the plurality of ports by a preset orthogonal cover code, to obtain processed reference signals corresponding to the plurality of ports, where the orthogonal cover code is configured specific to the plurality of ports; and sending, by the transmitting device on the resources, the processed reference signals corresponding to the plurality of ports.

The orthogonal cover code is configured based on a quantity of the plurality of ports. Resource mapping, specific to the port 1 and the port 2, shown in FIG. 9 is still used as an example. In this case, a matrix of the orthogonal cover code is $$\begin{bmatrix} 1 & 1 \\ 1 & -1 \end{bmatrix}.$$

It is assumed that a reference signal corresponding to the port 1 is S1, a reference signal corresponding to the port 2 is S2, a channel parameter of the subcarrier set 1 corresponding to $u_0$ is $\hat{H}_1(1,u_0)$, and a channel parameter of the subcarrier set 1 corresponding to $u_0$ is $\hat{H}_2(2,u_0)$. After the transmitting device multiplies each of the reference signals corresponding to the port 1 and the port 2 by the orthogonal cover code, processed reference signals, corresponding to the two ports, on the subcarrier 2 in the subcarrier set 1 corresponding to $u_0$ are S1 and S2, processed reference signals, corresponding to the two ports, on the subcarrier 3 in the subcarrier set 1 corresponding to $u_0$ are S1 and −S2, processed reference signals, corresponding to the two ports, received by the receiving device on the subcarrier 2 in the subcarrier set 1 corresponding to $u_0$ are $S_1(u_0, f_2)=\hat{H}_1(1,u_0)S1+\hat{H}_1(2,u_0)S2$, and processed reference signals, corresponding to the two ports, received by the receiving device on the subcarrier 3 in the subcarrier set 1 corresponding to $u_0$ are $S_1(u_0, f_3)=\hat{H}_1(1,u_0)S1-\hat{H}_1(2,u_0)S2$. In this way, the receiving device can obtain $\hat{H}_1(1,u_0)$ and $\hat{H}_1(2,u_0)$ based on the received reference signals, S1, and S2. For example, $$\hat{H}_1(2, u_0) = \frac{S_1(u_0, f_2) + S_1(u_0, f_3)}{2 \times S1}, \text{ and}$$

$$\hat{H}_1(2, u_0) = \frac{S_1(u_0, f_2) - S_1(u_0, f_3)}{2 \times S2}.$$

Figure 10:
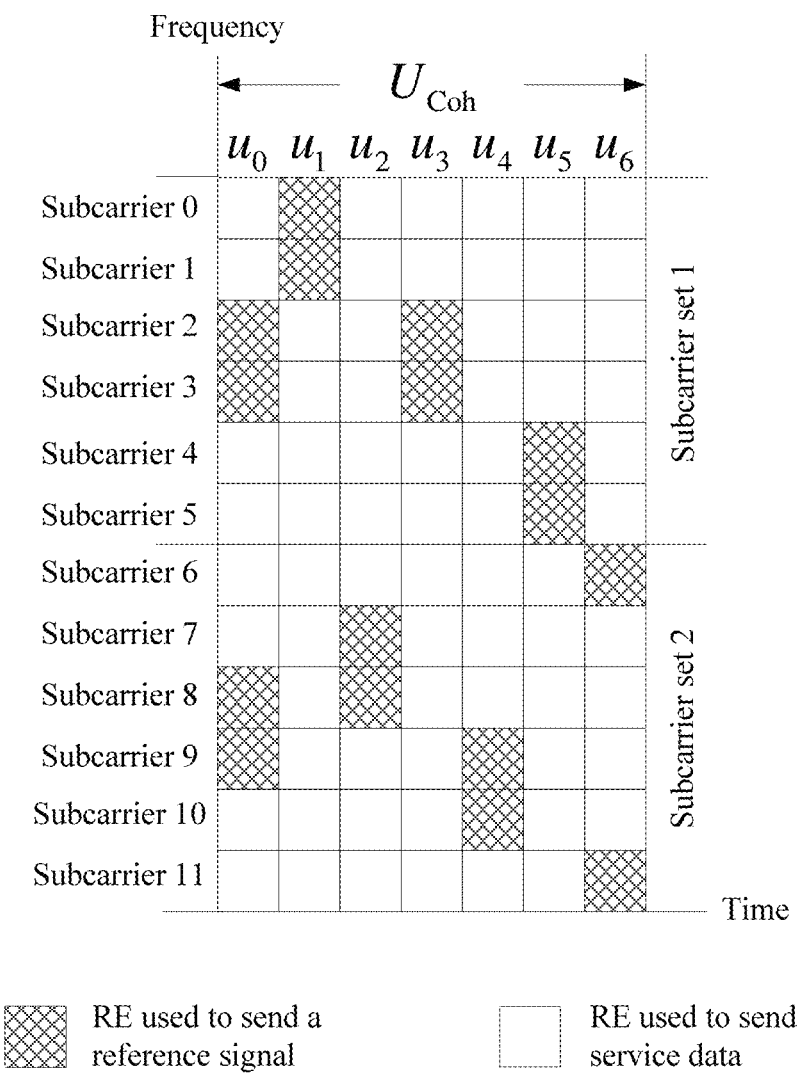
FIG. 10 is still another schematic resource mapping diagram specific to two ports according to an embodiment of the present disclosure.

Resource mapping, specific to the port 1 and the port 2, shown in FIG. 9 is still used as an example. When sending the reference signals corresponding to the port 1 and the port 2, as shown in FIG. 10, the transmitting device sends, on resources occupied by the reference signals corresponding to the port 1 and the port 2, the reference signals corresponding to the port 1 and the port 2.

Optionally, when there are a relatively small quantity of ports of the transmitting device, the transmitting device may determine, by using the method in step 301, configuration information of reference signals for all the ports, and send, on resources indicated by the configuration information, the reference signals corresponding to the plurality of ports; or when there are a relatively large quantity of ports of the transmitting device, the transmitting device may divide all the ports into a plurality of port groups, where each port group includes a plurality of ports. In this case, according to step 801, the transmitting device may configure reference signals specific to different port groups in a time division manner or a frequency division manner. To avoid interference on channel measurement performed on different ports, when the transmitting device sends a reference signal corresponding to one port group, a resource occupied by a reference signal corresponding to another port group is idle, and is not used to send a reference signal or service data.

For example, the transmitting device in a communications system includes four ports: a port 1, a port 2, a port 3, and a port 4, where the port 1 and the port 2 are a port group 1, and the port 3 and the port 4 are a port group 2; a bandwidth range allocated by the communications system to the receiving device is divided into two subcarrier sets; and each time period includes seven time symbols.

Figure 11:
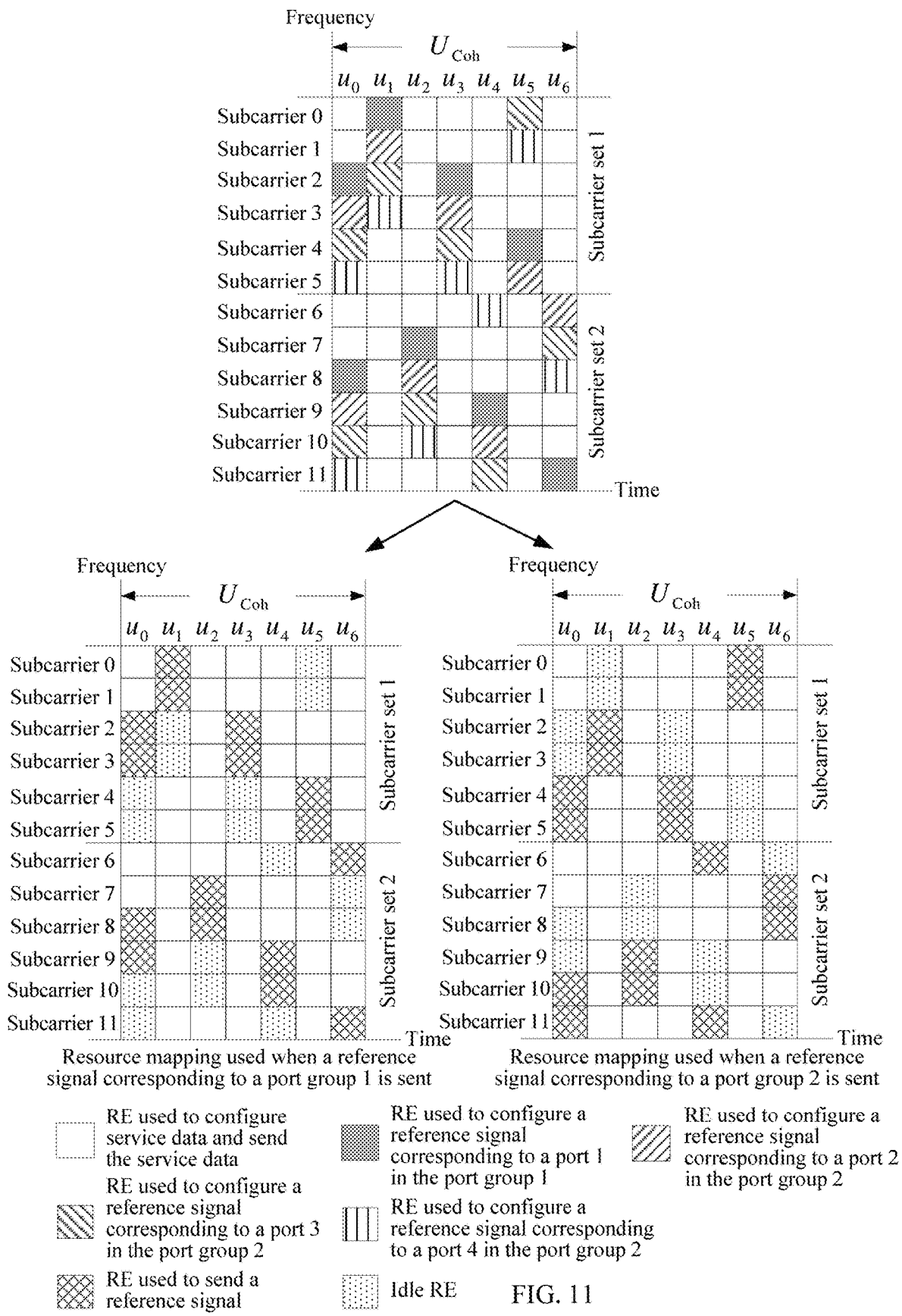
FIG. 11 is a schematic resource mapping diagram for two port groups according to an embodiment of the present disclosure.

When the transmitting device configures reference signals specific to the port group 1 and the port group 2 in a frequency division manner, referring to FIG. 11, a first time symbol corresponding to the port group 1 and a first time symbol corresponding to the port group 2 are the same, and both are a time symbol $u_0$. When sending a reference signal corresponding to the port group 1, the transmitting device sends, on a resource occupied by the reference signal corresponding to the port group 1, the reference signal corresponding to the port group 1, a resource occupied by a reference signal corresponding to the port group 2 is idle, and service data is sent on the other resources. Likewise, when sending the reference signal corresponding to the port group 2, the transmitting device sends, on the resource occupied by the reference signal corresponding to the port group 2, the reference signal corresponding to the port group 2, the resource occupied by the reference signal corresponding to the port group 1 is idle, and service data is sent on the other resources.

Figure 12:
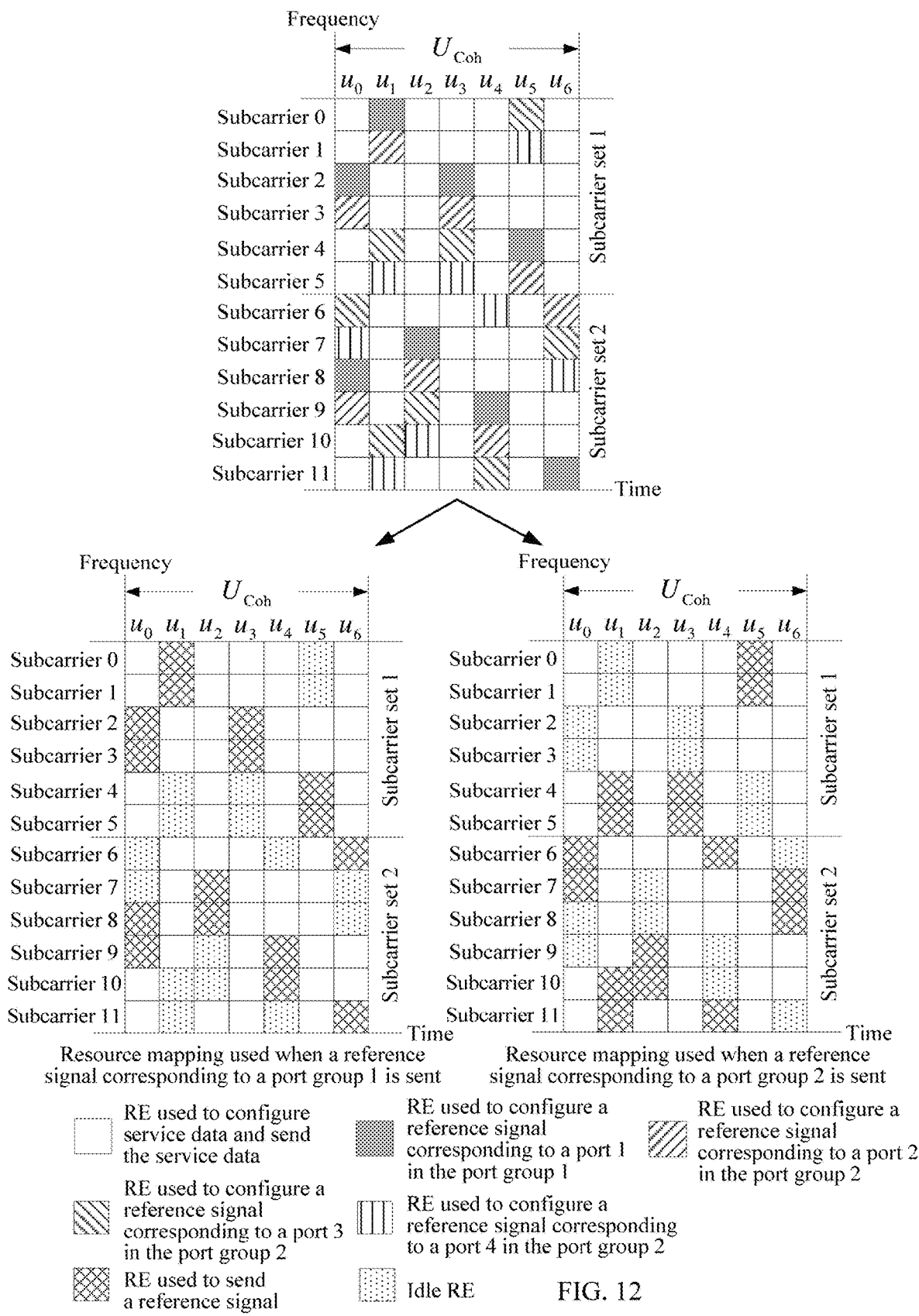
FIG. 12 is another schematic resource mapping diagram for two port groups according to an embodiment of the present disclosure.

When the transmitting device configures reference signals specific to the port group 1 and the port group 2 in a time division manner, referring to FIG. 12, a first time symbol corresponding to the port group 1 is $u_0$, and a first time symbol corresponding to the port group 2 is $u_1$. When sending a reference signal corresponding to the port group 1, the transmitting device sends, on a resource occupied by the reference signal corresponding to the port group 1, the reference signal corresponding to the port group 1, a resource occupied by a reference signal corresponding to the port group 2 is idle, and service data is sent on the other resources. Likewise, when sending the reference signal corresponding to the port group 2, the transmitting device sends, on the resource occupied by the reference signal corresponding to the port group 2, the reference signal corresponding to the port group 2, the resource occupied by the reference signal corresponding to the port group 1 is idle, and service data is sent on the other resources.

When sending a reference signal corresponding to any port group, the transmitting device configures, in a code division manner, reference signals corresponding to a plurality of ports included in the port group. To be specific, the transmitting device multiplies the reference signals corresponding to the plurality of ports by the preset orthogonal cover code, and sends processed reference signals corresponding to the plurality of ports.

In the reference signal transmission method provided in this embodiment of the present disclosure, the transmitting device sends, on the resources indicated by the configuration information of the reference signals for the plurality of ports, the reference signals corresponding to the plurality of ports; and the receiving device receives, on the resources, the reference signals corresponding to the plurality of ports that are sent by the transmitting device, and determines a channel parameter of each of the plurality of ports based on the received reference signals. The configuration information includes: in time domain, the location of the first time symbol; and in frequency domain, the location of each subcarrier that is in the subcarrier group within the specified bandwidth range and that is corresponding to the first time symbol corresponding to each port, and the location of the subcarrier that is within the bandwidth range and that is corresponding to each of time symbols, corresponding to each port and in the time period occupied by the resources, except the first time symbol. It can be learnt from the configuration information that one reference signal group is configured in the first time symbol corresponding to each port and one reference signal is configured in each of time symbols, corresponding to each port, except the first time symbol. Compared with the prior art in which at least one reference signal is configured in each OFDM symbol corresponding to each subband corresponding to each port, in the method according to this embodiment of the present disclosure, on the premise that the receiving device can obtain the channel parameter of each of the plurality of ports, overheads of resources occupied by transmitted reference signals in the communications system can be reduced, so that service data transmission efficiency is improved.

Figure 13:
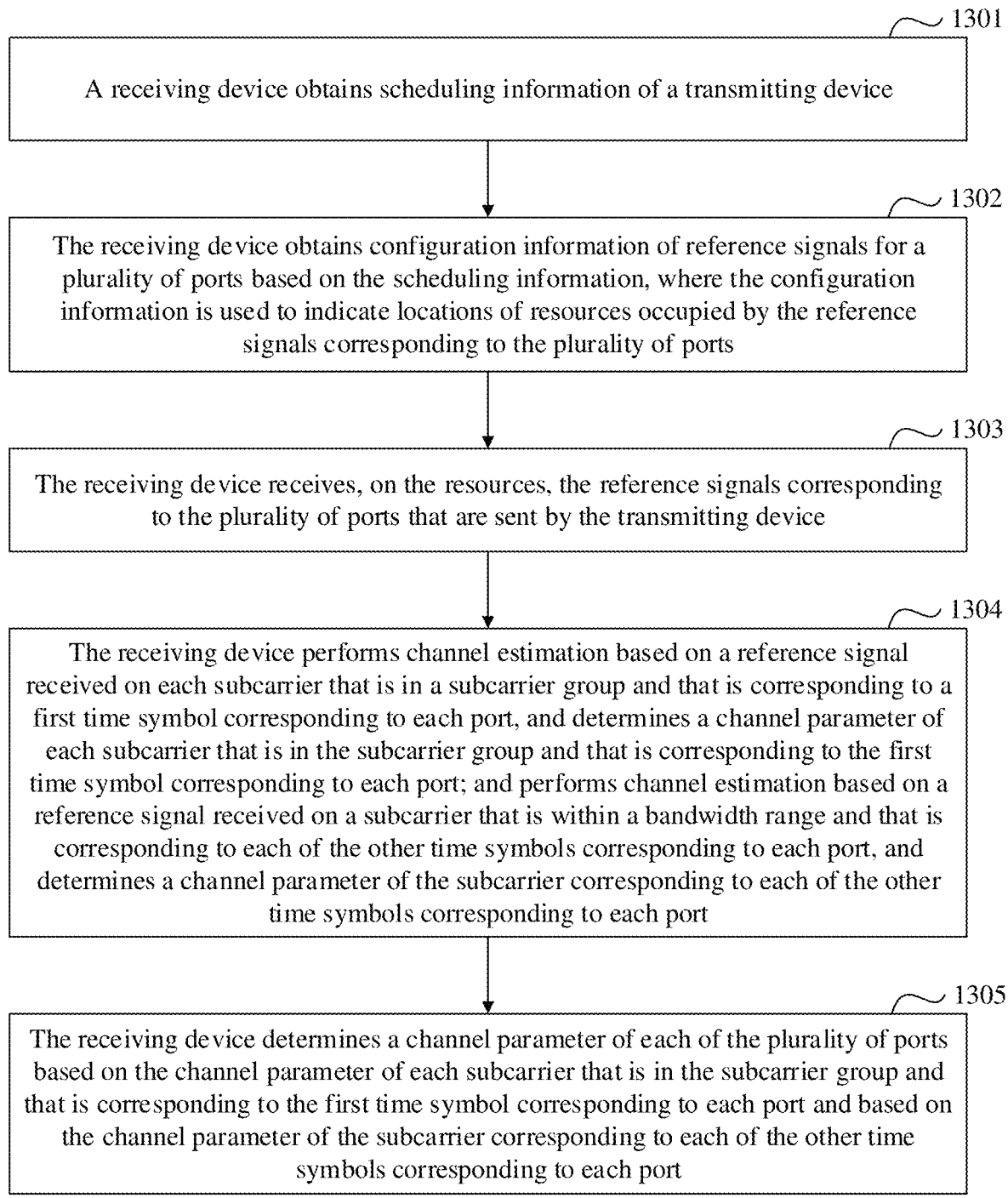
FIG. 13 is a flowchart of still another reference signal transmission method according to an embodiment of the present disclosure.

Based on the foregoing embodiment, an embodiment of the present disclosure further provides another reference signal transmission method, which is applied to a receiving device in a communications system. A transmitting device in the communications system can implement the reference signal transmission method shown in FIG. 8, and send a reference signal to the receiving device. Referring to FIG. 13, a specific procedure for the method includes the following steps.

Step 1301: The receiving device obtains scheduling information of the transmitting device, where the scheduling information includes a port number of each of a plurality of ports and a bandwidth range configured by the transmitting device, and the bandwidth range includes a plurality of subcarriers.

Before sending reference signals corresponding to the plurality of ports to the receiving device, the transmitting device in the communications system needs to send the scheduling information to the receiving device in advance, so that the receiving device obtains, based on the scheduling information, locations of resources occupied by the reference signals corresponding to the plurality of ports.

Optionally, the scheduling information includes the port number of each of the plurality of ports and the bandwidth range that is configured by the transmitting device for the receiving device, and may further include information such as a timeslot number Slot_ID of the resource and a cell number Cell_ID of the transmitting device. This is not limited in the present disclosure.

Step 1302: The receiving device obtains configuration information of reference signals for the plurality of ports based on the scheduling information, where the configuration information is used to indicate locations of resources occupied by the reference signals corresponding to the plurality of ports; the configuration information includes: in time domain, a location of a first time symbol; and in frequency domain, a location of each subcarrier that is in a subcarrier group within the bandwidth range and that is corresponding to the first time symbol corresponding to each port, and a location of a subcarrier that is within the bandwidth range and that is corresponding to each of time symbols, corresponding to each port and in a time period occupied by the resources, except the first time symbol; and the subcarrier group corresponding to the first time symbol corresponding to each port includes a plurality of subcarriers.

Because the transmitting device in the communications device uses the reference signal transmission method shown in FIG. 8 to send a reference signal to the receiving device, to ensure that the receiving device can accurately receive the reference signals corresponding to the plurality of ports that are sent by the transmitting device, the configuration information for the plurality of ports that is obtained by the receiving device in step 1302 is the same as the configuration information of the reference signals for the plurality of ports that is obtained by the transmitting device in step 801. The transmitting device and the receiving device jointly agree on, in advance, a method for determining the configuration information for the plurality of ports. Obviously, a method and a principle that are used by the receiving device to determine the configuration information of the reference signals for the plurality of ports are the same as those used by the transmitting device to determine the configuration information of the reference signals for the plurality of ports. In this embodiment of the present disclosure, for the principle used by the receiving device to determine the configuration information of the reference signals for the plurality of ports, refer to the principle used by the receiving device to determine the configuration information of the reference signals for the plurality of ports in step 801 in the foregoing embodiment. Repeated content is not described herein again.

Optionally, the receiving device may obtain the location of the first time symbol in the following two manners:

a first manner: determining, by the receiving device, a first port group including the port number of each of the plurality of ports; and determining, based on a stored correspondence between a port group and a location of a time symbol, the location of the first time symbol corresponding to the first port group, where in the correspondence between a port group and a location of a time symbol, one or more port groups are corresponding to the location of the first time symbol; or a second manner: the scheduling information further includes a timeslot number Slot_ID of the resource and a cell number Cell_ID of the transmitting device; and the obtaining, by the receiving device, a location of a first time symbol includes: determining, by the receiving device, the location of the first time symbol based on any one or a combination of the following: Slot_ID Cell_ID, and a receiving device number UE_ID.

In the second manner, the location of the first time symbol satisfies the following Formula 5:

$$u_{index}=\mod(Y,U_{Coh})$$

where $u_{index}$ is the location of the first time symbol; $U_{Coh}$ is a quantity of time symbols included in the time period occupied by the resource; and Y is any one of Slot_ID, Cell_ID, and UE_ID, a sum of any two of the three items, or a sum of the three items. When the transmitting device and the receiving device agree on using Formula 5, Y in Formula 5 used by the transmitting device and the receiving device is a same parameter or a sum of same parameters.

Optionally, the obtaining, by the receiving device, a location of each subcarrier that is in a subcarrier group and that is corresponding to the first time symbol corresponding to each port includes:

determining, by the receiving device based on a port number l of a first port or based on l and any one or a combination of the following: Slot_ID, Cell_ID, and UE_ID, a location of each subcarrier that is in the subcarrier group and that is corresponding to the first time symbol corresponding to the first port, where the first port is any of the plurality of ports. Optionally, when the bandwidth range is averagely divided into a plurality of subcarrier sets, a quantity of the plurality of subcarrier sets is the same as a quantity of subcarriers that are included in the subcarrier group and that are corresponding to the first time symbol, and each subcarrier set includes one subcarrier that is in the subcarrier group and that is corresponding to the first time symbol corresponding to each port; and the location of each subcarrier that is in the subcarrier group and that is corresponding to the first time symbol corresponding to the first port satisfies the following Formula 8 or Formula 9:

when the receiving device determines, based on l, the location of each subcarrier that is in the subcarrier group and that is corresponding to the first time symbol corresponding to the first port, the location of each subcarrier that is in the subcarrier group and that is corresponding to the first time symbol corresponding to the first port satisfies the following Formula 8:

$$k1_{index}(n)=\mod(l,K_{SB})+(n-1)\cdot K_{SB} \quad \text{Formula 8}$$

when the receiving device determines, based on l and any one or a combination of the following: Slot_ID, Cell_ID, and UE_ID, the location of each subcarrier that is in the subcarrier group and that is corresponding to the first time symbol corresponding to the first port, the location of each subcarrier that is in the subcarrier group and that is corresponding to the first time symbol corresponding to the first port satisfies the following Formula 9:

$$k1_{index}(n)=\mod(l+P,K_{SB})+(n-1)\cdot K_{SB} \quad \text{Formula 9}$$

where n=1, 2, . . . N; N is a quantity of subcarriers that are in the subcarrier group and that are corresponding to the first time symbol corresponding to the first port; $k1_{index}(n)$ is a location of an $n^{th}$ subcarrier that is in the subcarrier group and that is corresponding to the first time symbol corresponding to the first port; $K_{SB}$ is a quantity of subcarriers included in each subcarrier set when the bandwidth range is averagely divided into a plurality of subcarrier sets; and P in Formula 9 is any one of Slot_ID, Cell_ID, and UE_ID, a sum of any two of the three items, or a sum of the three items. When the transmitting device and the receiving device agree on using Formula 9, P in Formula 9 used by the transmitting device and the receiving device is a same parameter or a sum of same parameters.

Optionally, the obtaining, by the receiving device, a location of a subcarrier that is within the bandwidth range and that is corresponding to each of time symbols, corresponding to each port, in a time period except the first time symbol includes:

determining, by the receiving device based on the port number l of the first port and any one or a combination of the following: u, Slot_ID, Cell_ID, and UE_ID, a location of a subcarrier that is within the bandwidth range and that is corresponding to the second time symbol corresponding to the first port, where the first port is any of the plurality of ports, and the second time symbol is any time symbol in the time period other than the first time symbol. Specifically, when the bandwidth range is averagely divided into a plurality of subcarrier sets, a quantity of the plurality of subcarrier sets is the same as a quantity of subcarriers that are included in the subcarrier group and that are corresponding to the first time symbol, and each subcarrier set includes one subcarrier that is in the subcarrier group and that is corresponding to the first time symbol corresponding to each port; and the location of the subcarrier that is within the bandwidth range and that is corresponding to the second time symbol corresponding to the first port satisfies the following Formula 10:

$$k2_{index}=\mod(l+R,K) \quad \text{Formula 10}$$

where $k2_{index}$ is the location of the subcarrier that is within the bandwidth range and that is corresponding to the second time symbol corresponding to the first port; R is any one of u, Slot_ID, Cell_ID, and UE_ID, a sum of any two or three of the four items, a sum of the four items, or $R=u\times K_{SB}+T$; T is any one of u, Slot_ID, Cell_ID, and UE_ID, a sum of any two of the four items, a sum of three of the four items, or a sum of the four items; $K_{SB}$ is a quantity of subcarriers included in each subcarrier set when the bandwidth range is averagely divided into a plurality of subcarrier sets; and K is a total quantity of subcarriers included within the bandwidth range. When the transmitting device and the receiving device agree on using Formula 10, R in Formula 10 used by the transmitting device and the receiving device is a same parameter or a sum of same parameters; and when $R=u\times K_{SB}+T$ holds true, T is also a same parameter or a sum of same parameters.

In the foregoing method, the transmitting device may determine the configuration information of the reference signals for the plurality of ports. It can be learnt from the configuration information that one reference signal group is configured in the first time symbol corresponding to each port and one reference signal is configured in each of time symbols, corresponding to each port, except the first time symbol. Compared with the prior art in which at least one reference signal is configured in each OFDM symbol corresponding to each subband corresponding to each port, in the method according to this embodiment of the present disclosure, on the premise that the receiving device can obtain channel parameters of the plurality of ports, overheads of resources occupied by transmitted reference signals in the communications system can be reduced, so that service data transmission efficiency is improved.

Step 1303: The receiving device receives, on the resources, the reference signals corresponding to the plurality of ports that are sent by the transmitting device.

Step 1304: The receiving device performs channel estimation based on a reference signal received on each subcarrier that is in the subcarrier group and that is corresponding to the first time symbol corresponding to each port, and determines a channel parameter of each subcarrier that is in the subcarrier group and that is corresponding to the first time symbol corresponding to each port; and performs channel estimation based on a reference signal received on the subcarrier that is within the bandwidth range and that is corresponding to each of the other time symbols corresponding to each port, and determines a channel parameter of the subcarrier corresponding to each of the other time symbols corresponding to each port.

In step 1304, the receiving device may obtain, through a conventional technology by using reference signals received on any two subcarriers in one subcarrier set corresponding to any time symbol and a reference signal agreed on between the receiving device and the transmitting device (that is, a reference signal sent by the transmitting device), channel parameters of the subcarriers corresponding to the time symbol. A specific method is described, for example, in step 802 in the foregoing embodiment, and is not described in this embodiment of the present disclosure again.

It should be noted that all the channel parameters determined in this step are channel parameters including phase noises.

Step 1305: The receiving device determines a channel parameter of each of the plurality of ports based on the channel parameter of each subcarrier that is in the subcarrier group and that is corresponding to the first time symbol corresponding to each port and based on the channel parameter of the subcarrier corresponding to each of the other time symbols corresponding to each port.

Optionally, when the bandwidth range is averagely divided into a plurality of subcarrier sets, a quantity of the plurality of subcarrier sets is the same as a quantity of subcarriers that are included in the subcarrier group and that are corresponding to the first time symbol corresponding to each port, and each subcarrier set includes one subcarrier that is in the subcarrier group and that is corresponding to the first time symbol corresponding to each port; and the determining, by the receiving device, a channel parameter of each of the plurality of ports based on the channel parameter of each subcarrier that is in the subcarrier group and that is corresponding to the first time symbol corresponding to each port and based on the channel parameter of the subcarrier corresponding to each of the other time symbols corresponding to each port includes:

using, by the receiving device, a channel parameter of each subcarrier that is in the subcarrier group and that is corresponding to the first time symbol corresponding to the first port, as a channel parameter of a subcarrier set to which each subcarrier that is in the subcarrier group and that is corresponding to the first time symbol corresponding to the first port belongs, and using a channel parameter of the subcarrier corresponding to each of the other time symbols corresponding to the first port, as a channel parameter of a first subcarrier set to which the subcarrier corresponding to each of the other time symbols corresponding to the first port belongs, where the first port is any of the plurality of ports, the subcarrier set is obtained by grouping the plurality of subcarriers within the bandwidth range, and each subcarrier set includes one subcarrier that is in the subcarrier group and that is corresponding to the first time symbol corresponding to the first port;

determining, by the receiving device, a channel parameter of each of subcarrier sets, corresponding to a time symbol corresponding to the first port, except the first subcarrier set based on the channel parameter of the subcarrier set to which each subcarrier that is in the subcarrier group and that is corresponding to the first time symbol corresponding to the first port belongs and based on the channel parameter of the first subcarrier set to which the subcarrier corresponding to each of the other time symbols corresponding to the first port belongs; and determining, by the receiving device, a channel parameter of the first port based on a channel parameter of each subcarrier set corresponding to each time symbol, in the time period, corresponding to the first port.

Optionally, the determining, by the receiving device, a channel parameter of each of subcarrier sets, corresponding to a time symbol corresponding to the first port, except the first subcarrier set includes:

determining, by the receiving device based on the channel parameter of the subcarrier set to which each subcarrier that is in the subcarrier group and that is corresponding to the first time symbol corresponding to the first port belongs and based on a channel parameter of the first subcarrier set to which a subcarrier corresponding to a third time symbol corresponding to the first port belongs, a channel parameter of a second subcarrier set corresponding to the third time symbol corresponding to the first port, where the third time symbol is any time symbol in the time period other than the first time symbol, and the second subcarrier set is any subcarrier set that is other than the first subcarrier set and that is corresponding to the third time symbol; and the determining, by the receiving device, a channel parameter of a second subcarrier set corresponding to the third time symbol corresponding to the first port includes:

multiplying, by the receiving device, a channel parameter of the second subcarrier set corresponding to the first time symbol corresponding to the first port by the channel parameter of the first subcarrier set corresponding to the third time symbol corresponding to the first port, and dividing an obtained multiplication result by a channel parameter of the first subcarrier set corresponding to the first time symbol corresponding to the first port, to obtain the channel parameter of the second subcarrier set corresponding to the third time symbol corresponding to the first port.

A principle and a formula that are used during a process of determining, by the receiving device, a channel parameter for each port, refer to the description in step 705 in the embodiment shown in FIG. 7. Details are not described in this embodiment of the present disclosure again.

In the reference signal transmission method provided in this embodiment of the present disclosure, the transmitting device sends, on the resources indicated by the configuration information of the reference signals for the plurality of ports, the reference signals corresponding to the plurality of ports; and the receiving device receives, on the resources, the reference signals corresponding to the plurality of ports that are sent by the transmitting device, and determines the channel parameter of each of the plurality of ports based on the received reference signals. The configuration information includes: in time domain, the location of the first time symbol; and in frequency domain, the location of each subcarrier that is in the subcarrier group within the specified bandwidth range and that is corresponding to the first time symbol corresponding to each port, and the location of the subcarrier that is within the bandwidth range and that is corresponding to each of time symbols, corresponding to each port and in the time period occupied by the resources, except the first time symbol. It can be learnt from the configuration information that one reference signal group is configured in the first time symbol corresponding to each port and one reference signal is configured in each of time symbols, corresponding to each port, except the first time symbol. Compared with the prior art in which at least one reference signal is configured in each OFDM symbol corresponding to each subband corresponding to each port, in the method according to this embodiment of the present disclosure, on the premise that the receiving device can obtain the channel parameter of each of the plurality of ports, overheads of resources occupied by transmitted reference signals in the communications system can be reduced, so that service data transmission efficiency is improved.

Figure 14:
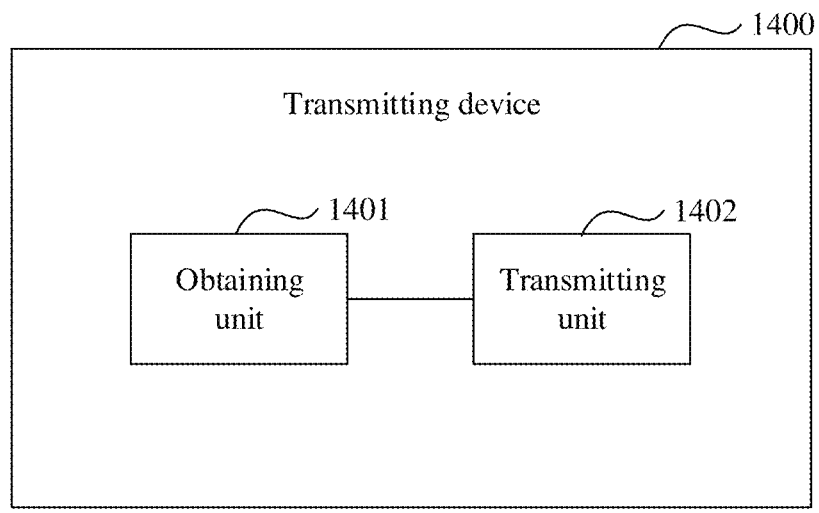
FIG. 14 is a schematic structural diagram of a transmitting device according to an embodiment of the present disclosure.

Based on the foregoing embodiment, an embodiment of the present disclosure further provides a transmitting device, where the transmitting device is applied to a communications system and has functions of implementing the reference signal transmission method shown in FIG. 3. Referring to FIG. 14, the transmitting device 1400 includes an obtaining unit 1401 and a transmitting unit 1402, where the obtaining unit 1401 is configured to obtain configuration information of a reference signal for a first port of the transmitting device, where the configuration information is used to indicate a location of a resource occupied by the reference signal corresponding to the first port; the configuration information includes: in time domain, a location of a first time symbol; and in frequency domain, a location of each subcarrier that is in a subcarrier group within a specified bandwidth range and that is corresponding to the first time symbol, and a location of a subcarrier that is within the bandwidth range and that is corresponding to each of time symbols, in a time period occupied by the resource, except the first time symbol; the subcarrier group includes a plurality of subcarriers; the bandwidth range is configured by the transmitting device; and the bandwidth range includes a plurality of subcarriers; and the transmitting unit 1402 is configured to send, on the resource indicated by the configuration information, the reference signal corresponding to the first port.

Optionally, when obtaining the location of the first time symbol, the obtaining unit 1401 is specifically configured to:

obtain a port number of the first port, and determine, based on a stored correspondence between a port number and a location of a time symbol, the location of the first time symbol corresponding to the port number of the first port; or determine the location of the first time symbol based on any one or a combination of the following: the port number l of the first port, a timeslot number Slot_ID of the resource, a cell number Cell_ID of the transmitting device, and a receiving device number UE_ID.

Optionally, the location of the first time symbol satisfies the following formula:

$$u_{index}=\mod(X,U_{Coh})$$

where $u_{index}$ is the location of the first time symbol; $U_{Coh}$ is a quantity of time symbols included in the time period occupied by the resource; and X is l, or a sum of l and any one or a combination of Slot_ID, Cell_ID, and UE_ID.

Optionally, the location of the first time symbol satisfies the following formula:

$$u_{index}=\mod(Y,U_{Coh})$$

where $u_{index}$ is the location of the first time symbol; $U_{Coh}$ is a quantity of time symbols included in the time period occupied by the resource; and Y is any one of Slot_ID, Cell_ID, and UE_ID, a sum of any two of the three items, or a sum of the three items.

Optionally, when obtaining the location of each subcarrier that is in the subcarrier group and that is corresponding to the first time symbol, the obtaining unit 1401 is specifically configured to:

determine, based on any one or a combination of the following: l, Slot_ID, Cell_ID, and UE_ID, the location of each subcarrier that is in the subcarrier group and that is corresponding to the first time symbol.

Optionally, the location of each subcarrier that is in the subcarrier group and that is corresponding to the first time symbol satisfies the following formula:

$$k1_{index}(n)=\mod(P,K_{SB})+(n-1)\cdot K_{SB}$$

where n=1, 2 ... N; N is a quantity of subcarriers that are in the subcarrier group and that are corresponding to the first time symbol; $k1_{index}(n)$ is a location of an n subcarrier that is in the subcarrier group and that is corresponding to the first time symbol; $K_{SB}$ is a quantity of subcarriers included in each subcarrier set when the bandwidth range is averagely divided into a plurality of subcarrier sets; and P is any one of Slot_ID, Cell_ID, and UE_ID, a sum of any two of the three items, or a sum of the three items.

Optionally, the location of each subcarrier that is in the subcarrier group and that is corresponding to the first time symbol satisfies the following formula:

$$k1_{index}(n)=\mod(Q,K_{SB})+(n-1)\cdot K_{SB}$$

where n=1, 2 ... N; N is a quantity of subcarriers that are in the subcarrier group and that are corresponding to the first time symbol; $k1_{index}(n)$ is a location of an $n^{th}$ subcarrier that is in the subcarrier group and that is corresponding to the first time symbol; $K_{SB}$ is a quantity of subcarriers included in each subcarrier set when the bandwidth range is averagely divided into a plurality of subcarrier sets; and Q is l, or a sum of l and any one or a combination of Slot_ID, Cell_ID, and UE_ID.

Optionally, when obtaining the location of each subcarrier that is in the subcarrier group and that is corresponding to the first time symbol, the obtaining unit 1401 is specifically configured to:

determine, based on l or based on l and any one or a combination of the following: Slot_ID, Cell_ID, and UE_ID, the location of each subcarrier that is in the subcarrier group and that is corresponding to the first time symbol.

Optionally, when the obtaining unit 1401 determines, based on l, the location of each subcarrier that is in the subcarrier group and that is corresponding to the first time symbol, the location of each subcarrier that is in the subcarrier group and that is corresponding to the first time symbol satisfies the following formula:

$$k1_{index}(n)=\mod(l,K_{SB})+(n-1)\cdot K_{SB}$$

where n=1, 2, ... N; N is a quantity of subcarriers that are in the subcarrier group and that are corresponding to the first time symbol; $k1_{index}(n)$ is a location of an $n^{th}$ subcarrier that is in the subcarrier group and that is corresponding to the first time symbol; and $K_{SB}$ is a quantity of subcarriers included in each subcarrier set when the bandwidth range is averagely divided into a plurality of subcarrier sets.

Optionally, when the obtaining unit 1401 determines, based on l and any one or a combination of the following: Slot_ID, Cell_ID, and UE_ID, the location of each subcarrier that is in the subcarrier group and that is corresponding to the first time symbol, the location of each subcarrier that is in the subcarrier group and that is corresponding to the first time symbol satisfies the following formula:

$$k1_{index}(n)=\mod(l+P,K_{SB})+(n-1)\cdot K_{SB}$$

where n=1, 2, ... N; N is a quantity of subcarriers that are in the subcarrier group and that are corresponding to the first time symbol; $k1_{index}(n)$ is a location of an $n^{th}$ subcarrier that is in the subcarrier group and that is corresponding to the first time symbol; $K_{SB}$ is a quantity of subcarriers included in each subcarrier set when the bandwidth range is averagely divided into a plurality of subcarrier sets; and P is any one of Slot_ID, Cell_ID, and UE_ID, a sum of any two of the three items, or a sum of the three items.

Optionally, when obtaining the location of the subcarrier that is within the bandwidth range and that is corresponding to each of the time symbols in the time period except the first time symbol, the obtaining unit 1401 is specifically configured to:

determine, based on l and any one or a combination of the following: a location u of a second time symbol in the time period, Slot_ID, Cell_ID, and UE_ID, a location of a subcarrier that is within the bandwidth range and that is corresponding to the second time symbol, where the second time symbol is any time symbol in the time period other than the first time symbol.

Optionally, the location of the subcarrier that is within the bandwidth range and that is corresponding to the second time symbol satisfies the following formula:

$$k2_{index} = \mathrm{mod}(l+R, K)$$

where $k2_{index}$ is the location of the subcarrier that is within the bandwidth range and that is corresponding to the second time symbol; R is any one of u, Slot_ID, Cell_ID, and UE_ID, a sum of any two or three of the four items, a sum of the four items, or $R = u \times K_{SB} +$; T is any one of u, Slot_ID, Cell_ID, and UE_ID, a sum of any two of the four items, a sum of three of the four items, or a sum of the four items; $K_{SB}$ is a quantity of subcarriers included in each subcarrier set when the bandwidth range is averagely divided into a plurality of subcarrier sets; and K is a total quantity of subcarriers included within the bandwidth range.

According to the transmitting device provided in this embodiment of the present disclosure, the transmitting device sends, on the resource indicated by the configuration information of the reference signal for the first port, the reference signal corresponding to the first port; and the receiving device receives, on the resource, the reference signal corresponding to the first port that is sent by the transmitting device, and determines a channel parameter of the first port based on the received reference signal. The configuration information includes: in time domain, the location of the first time symbol; and in frequency domain, the location of each subcarrier that is in the subcarrier group within the specified bandwidth range and that is corresponding to the first time symbol, and the location of the subcarrier that is within the bandwidth range and that is corresponding to each of time symbols, in the time period occupied by the resource, except the first time symbol. It can be learnt from the configuration information that one reference signal group is configured in the first time symbol and one reference signal is configured in each of time symbols except the first time symbol. Compared with the prior art in which at least one reference signal is configured in each OFDM symbol corresponding to each subband, in the method according to this embodiment of the present disclosure, on the premise that the receiving device can obtain the channel parameter of the first port, overheads of resources occupied by transmitted reference signals in the communications system can be reduced, so that service data transmission efficiency is improved.

Figure 15:
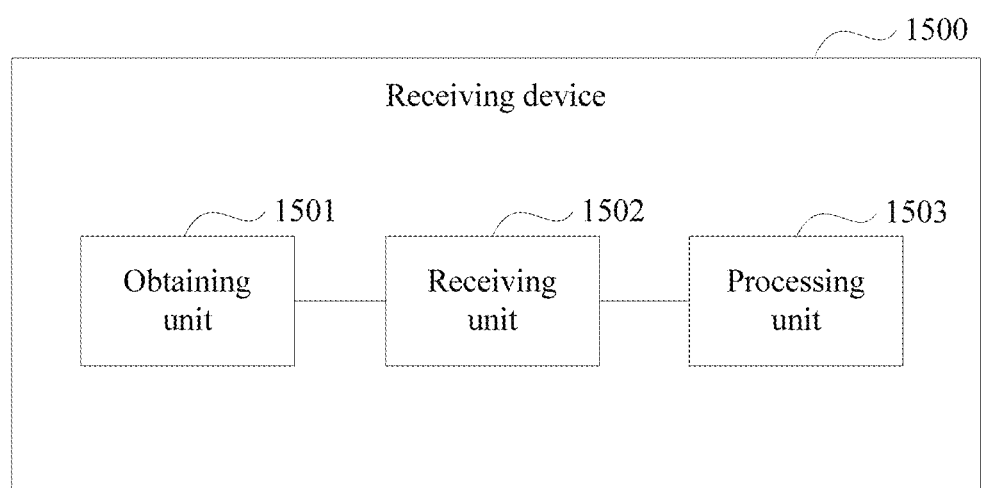
FIG. 15 is a schematic structural diagram of a receiving device according to an embodiment of the present disclosure.

Based on the foregoing embodiment, an embodiment of the present disclosure further provides a receiving device, where the receiving device is applied to a communications system and has functions of implementing the reference signal transmission method shown in FIG. 7. The communications system further includes the transmitting device shown in FIG. 14. Referring to FIG. 15, the receiving device 1500 includes an obtaining unit 1501, a receiving unit 1502, and a processing unit 1503, where the obtaining unit 1501 is configured to: obtain scheduling information of the transmitting device, where the scheduling information includes a port number l of a first port and a bandwidth range configured by the transmitting device, and the bandwidth range includes a plurality of subcarriers; and obtain configuration information of a reference signal for the first port based on the scheduling information, where the configuration information is used to indicate a location of a resource occupied by the reference signal corresponding to the first port; the configuration information includes: in time domain, a location of a first time symbol; and in frequency domain, a location of each subcarrier that is in a subcarrier group within the bandwidth range and that is corresponding to the first time symbol, and a location of a subcarrier that is within the bandwidth range and that is corresponding to each of time symbols, in a time period occupied by the resource, except the first time symbol; and a subcarrier group corresponding to the first time symbol corresponding to each port includes a plurality of subcarriers;

the receiving unit 1502 is configured to receive, on the resource, the reference signal corresponding to the first port that is sent by the transmitting device; and the processing unit 1503 is configured to: perform channel estimation based on a reference signal received on each subcarrier that is in the subcarrier group and that is corresponding to the first time symbol, and determine a channel parameter of each subcarrier that is in the subcarrier group and that is corresponding to the first time symbol; and perform channel estimation based on a reference signal received on the subcarrier that is within the bandwidth range and that is corresponding to each of the other time symbols, and determine a channel parameter of the subcarrier corresponding to each of the other time symbols; and determine a channel parameter of the first port based on the channel parameter of each subcarrier that is in the subcarrier group and that is corresponding to the first time symbol and based on the channel parameter of the subcarrier corresponding to each of the other time symbols.

Optionally, when obtaining the location of the first time symbol, the obtaining unit 1501 is specifically configured to:

determine, based on a stored correspondence between a port number and a location of a time symbol, the location of the first time symbol corresponding to the port number of the first port; or the scheduling information further includes a timeslot number Slot_ID of the resource and a cell number Cell_ID of the transmitting device; and when obtaining the location of the first time symbol, the obtaining unit 1501 is specifically configured to: determine the location of the first time symbol based on any one or a combination of the following: l, Slot_ID Cell_ID, and a receiving device number UE_ID.

Optionally, the location of the first time symbol satisfies the following formula:

$$u_{index} = \mathrm{mod}(X, U_{Coh})$$

where $u_{index}$ is the location of the first time symbol; $U_{Coh}$ is a quantity of time symbols included in the time period occupied by the resource; and X is l, or a sum of l and any one or a combination of Slot_ID, Cell_ID, and UE_ID.

Optionally, the location of the first time symbol satisfies the following formula:

$$u_{index} = \mod(Y, U_{Coh})$$

where $u_{index}$ is the location of the first time symbol; $U_{Coh}$ is a quantity of time symbols included in the time period occupied by the resource; and Y is any one of Slot_ID, Cell_ID, and UE_ID, a sum of any two of the three items, or a sum of the three items.

Optionally, when obtaining the location of each subcarrier that is in the subcarrier group and that is corresponding to the first time symbol, the obtaining unit 1501 is specifically configured to:

determine, based on any one or a combination of the following: 1, Slot_ID, Cell_ID, and UE_ID, the location of each subcarrier that is in the subcarrier group and that is corresponding to the first time symbol.

Optionally, the location of each subcarrier that is in the subcarrier group and that is corresponding to the first time symbol satisfies the following formula:

$$k1_{index}(n) = \mod(P, K_{SB}) + (n-1) \cdot K_{SB}$$

where n=1, 2, ... N; N is a quantity of subcarriers that are in the subcarrier group and that are corresponding to the first time symbol; $k1_{index}(n)$ is a location of an $n^{th}$ subcarrier that is in the subcarrier group and that is corresponding to the first time symbol; $K_{SB}$ is a quantity of subcarriers included in each subcarrier set when the bandwidth range is averagely divided into a plurality of subcarrier sets; and P is any one of Slot_ID, Cell_ID, and UE_ID, a sum of any two of the three items, or a sum of the three items.

Optionally, the location of each subcarrier that is in the subcarrier group and that is corresponding to the first time symbol satisfies the following formula:

$$k1_{index}(n) = \mod(Q, K_{SB}) + (n-1) \cdot K_{SB}$$

where n=1, 2, ... N; N is a quantity of subcarriers that are in the subcarrier group and that are corresponding to the first time symbol; $k1_{index}(n)$ is a location of an $n^{th}$ subcarrier that is in the subcarrier group and that is corresponding to the first time symbol; $K_{SB}$ is a quantity of subcarriers included in each subcarrier set when the bandwidth range is averagely divided into a plurality of subcarrier sets; and Q is 1, or a sum of 1 and any one or a combination of Slot_ID, Cell_ID, and UE_ID.

Optionally, when obtaining the location of each subcarrier that is in the subcarrier group and that is corresponding to the first time symbol, the obtaining unit 1501 is specifically configured to:

determine, based on 1 or based on 1 and any one or a combination of the following: Slot_ID Cell_ID, and UE_ID, the location of each subcarrier that is in the subcarrier group and that is corresponding to the first time symbol.

Optionally, when the obtaining unit 1501 determines, based on 1, the location of each subcarrier that is in the subcarrier group and that is corresponding to the first time symbol, the location of each subcarrier that is in the subcarrier group and that is corresponding to the first time symbol satisfies the following formula:

$$k1_{index}(n) = \mod(l, K_{SB}) + (n-1) \cdot K_{SB}$$

where n=1, 2, ..., N is a quantity of subcarriers that are in the subcarrier group and that are corresponding to the first time symbol; $k1_{index}(n)$ is a location of an $n^{th}$ subcarrier that is in the subcarrier group and that is corresponding to the first time symbol; and $K_{SB}$ is a quantity of subcarriers included in each subcarrier set when the bandwidth range is averagely divided into a plurality of subcarrier sets.

Optionally, when the obtaining unit 1501 determines, based on 1 and any one or a combination of the following: Slot_ID, Cell_ID, and UE_ID, the location of each subcarrier that is in the subcarrier group and that is corresponding to the first time symbol, the location of each subcarrier that is in the subcarrier group and that is corresponding to the first time symbol satisfies the following formula:

$$k1_{index}(n) = \mod(l + P, K_{SB}) + (n-1) \cdot K_{SB}$$

where n=1, 2, ..., N is a quantity of subcarriers that are in the subcarrier group and that are corresponding to the first time symbol; $k1_{index}(n)$ is a location of an $n^{th}$ subcarrier that is in the subcarrier group and that is corresponding to the first time symbol; $K_{SB}$ is a quantity of subcarriers included in each subcarrier set when the bandwidth range is averagely divided into a plurality of subcarrier sets; and P is any one of Slot_ID, Cell_ID, and UE_ID, a sum of any two of the three items, or a sum of the three items.

Optionally, when obtaining the location of the subcarrier that is within the bandwidth range and that is corresponding to each of the time symbols in the time period except the first time symbol, the obtaining unit 1501 is specifically configured to:

determine, based on 1 and any one or a combination of the following: a location u of a second time symbol in the time period, Slot_ID, Cell_ID, and UE_ID, a location of a subcarrier that is within the bandwidth range and that is corresponding to the second time symbol, where the second time symbol is any time symbol in the time period other than the first time symbol.

Optionally, the location of the subcarrier that is within the bandwidth range and that is corresponding to the second time symbol satisfies the following formula:

$$k2_{index} = \mod(l + R, K)$$

where $k2_{index}$ is the location of the subcarrier that is within the bandwidth range and that is corresponding to the second time symbol; R is any one of u, Slot_ID, Cell_ID, and UE_ID, a sum of any two or three of the four items, a sum of the four items, or $R = u \times K_{SB} + T$; T is any one of u, Slot_ID, Cell_ID, and UE_ID, a sum of any two of the four items, a sum of three of the four items, or a sum of the four items; $K_{SB}$ is a quantity of subcarriers included in each subcarrier set when the bandwidth range is averagely divided into a plurality of subcarrier sets; and K is a total quantity of subcarriers included within the bandwidth range.

Optionally, a quantity of the plurality of subcarrier sets that are obtained by dividing the bandwidth range is the same as a quantity of subcarriers that are included in the subcarrier group and that are corresponding to the first time symbol, and each subcarrier set includes one subcarrier that is in the subcarrier group and that is corresponding to the first time symbol; and when determining the channel parameter of the first port based on the channel parameter of each subcarrier that is in the subcarrier group and that is corresponding to the first time symbol and based on the channel parameter of the subcarrier corresponding to each of the other time symbols, the processing unit 1503 is specifically configured to:

use the channel parameter of each subcarrier that is in the subcarrier group and that is corresponding to the first time symbol, as a channel parameter of a subcarrier set to which each subcarrier that is in the subcarrier group and that is corresponding to the first time symbol belongs, and use the channel parameter of the subcarrier corresponding to each of the other time symbols, as a channel parameter of a first subcarrier set to which the subcarrier corresponding to each of the other time symbols belongs, where the subcarrier set is obtained by grouping the plurality of subcarriers within the bandwidth range, and each subcarrier set includes one subcarrier that is in the subcarrier group and that is corresponding to the first time symbol;

determine a channel parameter of each of subcarrier sets, corresponding to a time symbol, except the first subcarrier set based on the channel parameter of the subcarrier set to which each subcarrier that is in the subcarrier group and that is corresponding to the first time symbol belongs and based on the channel parameter of the first subcarrier set to which the subcarrier corresponding to each of the other time symbols belongs; and determine the channel parameter of the first port based on a channel parameter of each subcarrier set corresponding to each time symbol in the time period.

Optionally, when determining the channel parameter of each of the subcarrier sets, corresponding to the time symbol, except the first subcarrier set, the processing unit 1503 is specifically configured to:

determine, based on the channel parameter of the subcarrier set to which each subcarrier that is in the subcarrier group and that is corresponding to the first time symbol belongs and based on a channel parameter of the first subcarrier set to which a subcarrier corresponding to a third time symbol belongs, a channel parameter of a second subcarrier set corresponding to the third time symbol, where the third time symbol is any time symbol in the time period other than the first time symbol, and the second subcarrier set is any subcarrier set that is other than the first subcarrier set and that is corresponding to the third time symbol; and when determining the channel parameter of the second subcarrier set corresponding to the third time symbol, the processing unit 1503 is specifically configured to:

multiply a channel parameter of the second subcarrier set corresponding to the first time symbol by the channel parameter of the first subcarrier set corresponding to the third time symbol, and divide an obtained multiplication result by a channel parameter of the first subcarrier set corresponding to the first time symbol, to obtain the channel parameter of the second subcarrier set corresponding to the third time symbol.

According to the receiving device provided in this embodiment of the present disclosure, the transmitting device sends, on the resource indicated by the configuration information of the reference signal for the first port, the reference signal corresponding to the first port; and the receiving device receives, on the resource, the reference signal corresponding to the first port that is sent by the transmitting device, and determines the channel parameter of the first port based on the received reference signal. The configuration information includes: in time domain, the location of the first time symbol; and in frequency domain, the location of each subcarrier that is in the subcarrier group within the specified bandwidth range and that is corresponding to the first time symbol, and the location of the subcarrier that is within the bandwidth range and that is corresponding to each of time symbols, in the time period occupied by the resource, except the first time symbol. It can be learnt from the configuration information that one reference signal group is configured in the first time symbol and one reference signal is configured in each of time symbols except the first time symbol. Compared with the prior art in which at least one reference signal is configured in each OFDM symbol corresponding to each subband, in the method according to this embodiment of the present disclosure, on the premise that the receiving device can obtain the channel parameter of the first port, overheads of resources occupied by transmitted reference signals in the communications system can be reduced, so that service data transmission efficiency is improved.

Figure 16:
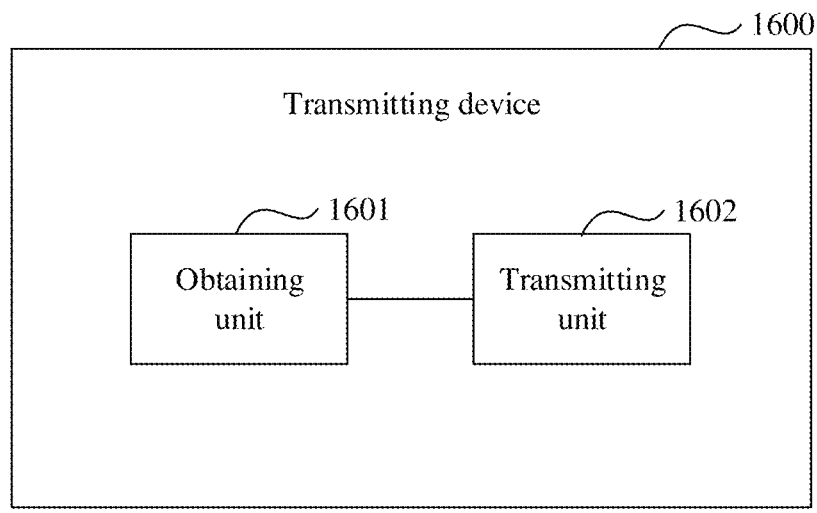
FIG. 16 is a schematic structural diagram of another transmitting device according to an embodiment of the present disclosure.

Based on the foregoing embodiment, an embodiment of the present disclosure further provides another transmitting device, where the transmitting device is applied to a communications system and has functions of implementing the reference signal transmission method shown in FIG. 8. Referring to FIG. 16, the transmitting device 1600 includes an obtaining unit 1601 and a transmitting unit 1602, where the obtaining unit 1601 is configured to obtain configuration information for a plurality of ports of the transmitting device, where the configuration information is used to indicate locations of resources occupied by reference signals corresponding to the plurality of ports; the configuration information includes: in time domain, a location of a first time symbol; and in frequency domain, a location of each subcarrier that is in a subcarrier group within a specified bandwidth range and that is corresponding to the first time symbol corresponding to each port, and a location of a subcarrier that is within the bandwidth range and that is corresponding to each of time symbols, corresponding to each port and in a time period occupied by the resources, except the first time symbol; the subcarrier group includes a plurality of subcarriers; the bandwidth range is configured by the transmitting device; and the bandwidth range includes a plurality of subcarriers; and the transmitting unit 1602 is configured to send, on the resources that are indicated by the configuration information and that are occupied by the reference signals corresponding to the plurality of ports, the reference signals corresponding to the plurality of ports.

Optionally, when obtaining the location of the first time symbol, the obtaining unit 1601 is specifically configured to:

obtain a port number of each of the plurality of ports; determine a first port group including the port number of each of the plurality of ports; and determine, based on a stored correspondence between a port group and a location of a time symbol, the location of the first time symbol corresponding to the first port group, where in the correspondence between a port group and a location of a time symbol, one or more port groups are corresponding to the location of the first time symbol; or determine the location of the first time symbol based on any one or a combination of the following: a timeslot number Slot_ID of the resource, a cell number Cell_ID of the transmitting device, and a receiving device number UE_ID.

Optionally, the location of the first time symbol satisfies the following formula:

$$u_{index} = \mathrm{mod}(Y, U_{Coh})$$

where $u_{index}$ is the location of the first time symbol; $U_{Coh}$ is a quantity of time symbols included in the time period occupied by the resource; and Y is any one of Slot_ID, Cell_ID, and UE_ID, a sum of any two of the three items, or a sum of the three items.

Optionally, when obtaining the location of each subcarrier that is in the subcarrier group and that is corresponding to the first time symbol corresponding to each port, the obtaining unit 1601 is specifically configured to:

determine, based on a port number l of a first port or based on l and any one or a combination of the following: Slot_ID, Cell_ID, and UE_ID, a location of each subcarrier that is in the subcarrier group and that is corresponding to the first time symbol corresponding to the first port, where the first port is any of the plurality of ports.

Optionally, when the obtaining unit 1601 determines, based on l, the location of each subcarrier that is in the subcarrier group and that is corresponding to the first time symbol corresponding to the first port, the location of each subcarrier that is in the subcarrier group and that is corresponding to the first time symbol corresponding to the first port satisfies the following formula:

$$k1_{index}(n)=\mathrm{mod}(l,K_{SB})+(n-1)\cdot K_{SB}$$

where n=1, 2, . . . , N is a quantity of subcarriers that are in the subcarrier group and that are corresponding to the first time symbol corresponding to the first port; $k1_{index}(n)$ is a location of an $n^{th}$ subcarrier that is in the subcarrier group and that is corresponding to the first time symbol corresponding to the first port; and $K_{SB}$ is a quantity of subcarriers included in each subcarrier set when the bandwidth range is averagely divided into a plurality of subcarrier sets.

Optionally, when the obtaining unit 1601 determines, based on l and any one or a combination of the following: Slot_ID, Cell_ID, and UE_ID, the location of each subcarrier that is in the subcarrier group and that is corresponding to the first time symbol corresponding to the first port, the location of each subcarrier that is in the subcarrier group and that is corresponding to the first time symbol corresponding to the first port satisfies the following formula:

$$k1_{index}(n)=\mathrm{mod}(l+P,K_{SB})+(n-1)\cdot K_{SB}$$

where n=1, 2, . . . , N is a quantity of subcarriers that are in the subcarrier group and that are corresponding to the first time symbol corresponding to the first port; $k1_{index}(n)$ is a location of an $n^{th}$ subcarrier that is in the subcarrier group and that is corresponding to the first time symbol corresponding to the first port; $K_{SB}$ is a quantity of subcarriers included in each subcarrier set when the bandwidth range is averagely divided into a plurality of subcarrier sets; and P is any one of Slot_ID, Cell_ID, and UE_ID, a sum of any two of the three items, or a sum of the three items.

Optionally, when obtaining the location of the subcarrier that is within the bandwidth range and that is corresponding to each of the time symbols, corresponding to each port, in the time period except the first time symbol, the obtaining unit 1601 is specifically configured to:

determine, based on the port number l of the first port and any one or a combination of the following: u, Slot_ID, Cell_ID, and UE_ID, a location of a subcarrier that is within the bandwidth range and that is corresponding to the second time symbol corresponding to the first port, where the first port is any of the plurality of ports, and the second time symbol is any time symbol in the time period other than the first time symbol.

Optionally, the location of the subcarrier that is within the bandwidth range and that is corresponding to the second time symbol corresponding to the first port satisfies the following formula:

$$k2_{index}=\mathrm{mod}(l+R,K)$$

where $k2_{index}$ is the location of the subcarrier that is within the bandwidth range and that is corresponding to the second time symbol corresponding to the first port; R is any one of u, Slot_ID, Cell_ID, and UE_ID, a sum of any two or three of the four items, a sum of the four items, or R=u×$K_{SB}$+T; T is any one of u, Slot_ID, Cell_ID, and UE_ID, a sum of any two of the four items, a sum of three of the four items, or a sum of the four items; $K_{SB}$ is a quantity of subcarriers included in each subcarrier set when the bandwidth range is averagely divided into a plurality of subcarrier sets; and K is a total quantity of subcarriers included within the bandwidth range.

Optionally, the transmitting unit 1602 is specifically configured to:

multiply the reference signals corresponding to the plurality of ports by a preset orthogonal cover code, to obtain processed reference signals corresponding to the plurality of ports, where the orthogonal cover code is configured specific to the plurality of ports; and send, on the resources, the processed reference signals corresponding to the plurality of ports.

According to the transmitting device provided in this embodiment of the present disclosure, the transmitting device sends, on the resources indicated by the configuration information of the reference signals for the plurality of ports, the reference signals corresponding to the plurality of ports; and the receiving device receives, on the resources, the reference signals corresponding to the plurality of ports that are sent by the transmitting device, and determines a channel parameter of each of the plurality of ports based on the received reference signals. The configuration information includes: in time domain, the location of the first time symbol; and in frequency domain, the location of each subcarrier that is in the subcarrier group within the specified bandwidth range and that is corresponding to the first time symbol corresponding to each port, and the location of the subcarrier that is within the bandwidth range and that is corresponding to each of time symbols, corresponding to each port and in the time period occupied by the resources, except the first time symbol. It can be learnt from the configuration information that one reference signal group is configured in the first time symbol corresponding to each port and one reference signal is configured in each of time symbols, corresponding to each port, except the first time symbol. Compared with the prior art in which at least one reference signal is configured in each OFDM symbol corresponding to each subband corresponding to each port, in the method according to this embodiment of the present disclosure, on the premise that the receiving device can obtain the channel parameter of each of the plurality of ports, overheads of resources occupied by transmitted reference signals in the communications system can be reduced, so that service data transmission efficiency is improved.

Figure 17:
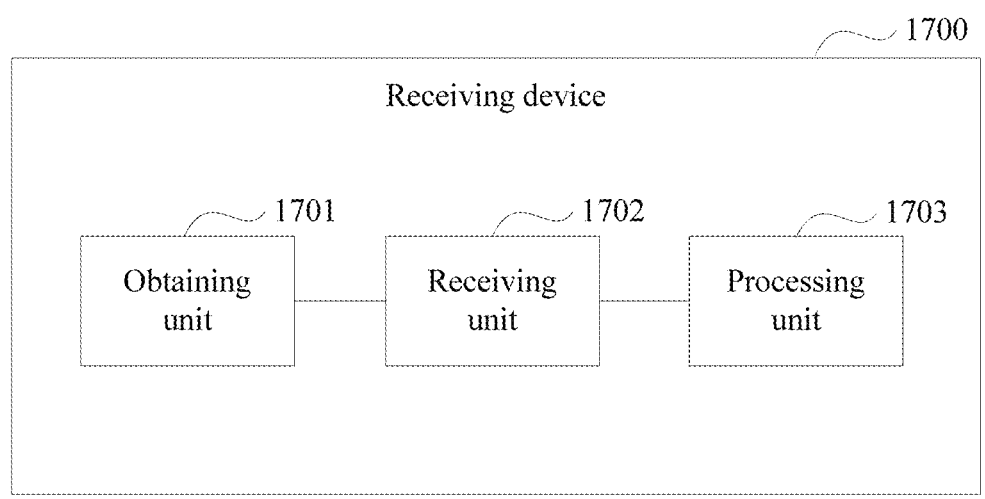
FIG. 17 is a schematic structural diagram of another receiving device according to an embodiment of the present disclosure.

Based on the foregoing embodiment, an embodiment of the present disclosure further provides a receiving device, where the receiving device is applied to a communications system and has functions of implementing the reference signal transmission method shown in FIG. 13. The communications system further includes the transmitting device shown in FIG. 16. Referring to FIG. 17, the receiving device 1700 includes an obtaining unit 1701, a receiving unit 1702, and a processing unit 1703, where the obtaining unit 1701 is configured to: obtain scheduling information of the transmitting device, where the scheduling information includes a port number of each of a plurality of ports and a bandwidth range configured by the transmitting device, and the bandwidth range includes a plurality of subcarriers; and obtain configuration information of reference signals for the plurality of ports based on the scheduling information, where the configuration information is used to indicate locations of resources occupied by the reference signals corresponding to the plurality of ports; the configuration information includes: in time domain, a location of a first time symbol; and in frequency domain, a location of each subcarrier that is in a subcarrier group within the bandwidth range and that is corresponding to the first time symbol corresponding to each port, and a location of a subcarrier that is within the bandwidth range and that is corresponding to each of time symbols, corresponding to each port and in a time period occupied by the resources, except the first time symbol; and the subcarrier group corresponding to the first time symbol corresponding to each port includes a plurality of subcarriers;

the receiving unit 1702 is configured to receive, on the resources, the reference signals corresponding to the plurality of ports that are sent by the transmitting device; and the processing unit 1703 is configured to: perform channel estimation based on a reference signal received on each subcarrier that is in the subcarrier group and that is corresponding to the first time symbol corresponding to each port, and determine a channel parameter of each subcarrier that is in the subcarrier group and that is corresponding to the first time symbol corresponding to each port; and perform channel estimation based on a reference signal received on the subcarrier that is within the bandwidth range and that is corresponding to each of the other time symbols corresponding to each port, and determine a channel parameter of the subcarrier corresponding to each of the other time symbols corresponding to each port; and determine a channel parameter of each of the plurality of ports based on the channel parameter of each subcarrier that is in the subcarrier group and that is corresponding to the first time symbol corresponding to each port and based on the channel parameter of the subcarrier corresponding to each of the other time symbols corresponding to each port.

Optionally, when obtaining the location of the first time symbol, the obtaining unit 1701 is specifically configured to:

determine a first port group including the port number of each of the plurality of ports; and determine, based on a stored correspondence between a port group and a location of a time symbol, the location of the first time symbol corresponding to the first port group, where in the correspondence between a port group and a location of a time symbol, one or more port groups are corresponding to the location of the first time symbol; or the scheduling information further includes a timeslot number Slot_ID of the resource and a cell number Cell_ID of the transmitting device; and when obtaining the location of the first time symbol, the obtaining unit 1701 is specifically configured to: determine the location of the first time symbol based on any one or a combination of the following: Slot_ID, Cell_ID, and a receiving device number UE_ID.

Optionally, the location of the first time symbol satisfies the following formula:

$$u_{index} = \mathrm{mod}(Y, U_{Coh})$$

where $u_{index}$ is the location of the first time symbol; $U_{Coh}$ is a quantity of time symbols included in the time period occupied by the resource; and Y is any one of Slot_ID, Cell_ID, and UE_ID, a sum of any two of the three items, or a sum of the three items.

Optionally, when obtaining the location of each subcarrier that is in the subcarrier group and that is corresponding to the first time symbol corresponding to each port, the obtaining unit 1701 is specifically configured to:

determine, based on a port number l of a first port or based on l and any one or a combination of the following: Slot_ID, Cell_ID, and UE_ID, a location of each subcarrier that is in the subcarrier group and that is corresponding to the first time symbol corresponding to the first port, where the first port is any of the plurality of ports.

Optionally, when the obtaining unit 1701 determines, based on l, the location of each subcarrier that is in the subcarrier group and that is corresponding to the first time symbol corresponding to the first port, the location of each subcarrier that is in the subcarrier group and that is corresponding to the first time symbol corresponding to the first port satisfies the following formula:

$$k1_{index}(n) = \mathrm{mod}(l, K_{SB}) + (n-1) \cdot K_{SB}$$

where n=1, 2, ..., N is a quantity of subcarriers that are in the subcarrier group and that are corresponding to the first time symbol corresponding to the first port; $k1_{index}(n)$ is a location of an $n^{th}$ subcarrier that is in the subcarrier group and that is corresponding to the first time symbol corresponding to the first port; and $K_{SB}$ is a quantity of subcarriers included in each subcarrier set when the bandwidth range is averagely divided into a plurality of subcarrier sets.

Optionally, when the obtaining unit 1701 determines, based on l and any one or a combination of the following: Slot_ID, Cell_ID, and UE_ID, the location of each subcarrier that is in the subcarrier group and that is corresponding to the first time symbol corresponding to the first port, the location of each subcarrier that is in the subcarrier group and that is corresponding to the first time symbol corresponding to the first port satisfies the following formula:

$$k1_{index}(n) = \mathrm{mod}(l+P, K_{SB}) + (n-1) \cdot K_{SB}$$

where n=1, 2, ... N; N is a quantity of subcarriers that are in the subcarrier group and that are corresponding to the first time symbol corresponding to the first port; $k1_{index}(n)$ is a location of an $n^{th}$ subcarrier that is in the subcarrier group and that is corresponding to the first time symbol corresponding to the first port; $K_{SB}$ is a quantity of subcarriers included in each subcarrier set when the bandwidth range is averagely divided into a plurality of subcarrier sets; and P is any one of Slot_ID, Cell_ID, and UE_ID, a sum of any two of the three items, or a sum of the three items.

Optionally, when obtaining the location of the subcarrier that is within the bandwidth range and that is corresponding to each of the time symbols, corresponding to each port, in the time period except the first time symbol, the obtaining unit 1701 is specifically configured to:

determine, based on the port number l of the first port and any one or a combination of the following: u, Slot_ID, Cell_ID, and UE_ID, a location of a subcarrier that is within the bandwidth range and that is corresponding to the second time symbol corresponding to the first port, where the first port is any of the plurality of ports, and the second time symbol is any time symbol in the time period other than the first time symbol.

Optionally, the location of the subcarrier that is within the bandwidth range and that is corresponding to the second time symbol corresponding to the first port satisfies the following formula:

$$k2_{index} = \mathrm{mod}(l+R, K)$$

where $k2_{index}$ is the location of the subcarrier that is within the bandwidth range and that is corresponding to the second time symbol corresponding to the first port; R is any one of u, Slot_ID, Cell_ID, and UE_ID, a sum of any two or three of the four items, a sum of the four items, or $R = u \times K_{SB} + T$; T is any one of u, Slot_ID, Cell_ID, and UE_ID, a sum of any two of the four items, a sum of three of the four items, or a sum of the four items; $K_{SB}$ is a quantity of subcarriers included in each subcarrier set when the bandwidth range is averagely divided into a plurality of subcarrier sets; and K is a total quantity of subcarriers included within the bandwidth range.

Optionally, a quantity of the plurality of subcarrier sets that are obtained by dividing the bandwidth range is the same as a quantity of subcarriers that are included in the subcarrier group and that are corresponding to the first time symbol corresponding to each port, and each subcarrier set includes one subcarrier that is in the subcarrier group and that is corresponding to the first time symbol corresponding to each port; and when determining the channel parameter of each of the plurality of ports based on the channel parameter of each subcarrier that is in the subcarrier group and that is corresponding to the first time symbol corresponding to each port and based on the channel parameter of the subcarrier corresponding to each of the other time symbols corresponding to each port, the processing unit 1703 is specifically configured to:

use a channel parameter of each subcarrier that is in the subcarrier group and that is corresponding to the first time symbol corresponding to the first port, as a channel parameter of a subcarrier set to which each subcarrier that is in the subcarrier group and that is corresponding to the first time symbol corresponding to the first port belongs, and use a channel parameter of the subcarrier corresponding to each of the other time symbols corresponding to the first port, as a channel parameter of a first subcarrier set to which the subcarrier corresponding to each of the other time symbols corresponding to the first port belongs, where the first port is any of the plurality of ports, the subcarrier set is obtained by grouping the plurality of subcarriers within the bandwidth range, and each subcarrier set includes one subcarrier that is in the subcarrier group and that is corresponding to the first time symbol corresponding to the first port;

determine a channel parameter of each of subcarrier sets, corresponding to a time symbol corresponding to the first port, except the first subcarrier set based on the channel parameter of the subcarrier set to which each subcarrier that is in the subcarrier group and that is corresponding to the first time symbol corresponding to the first port belongs and based on the channel parameter of the first subcarrier set to which the subcarrier corresponding to each of the other time symbols corresponding to the first port belongs; and determine a channel parameter of the first port based on a channel parameter of each subcarrier set corresponding to each time symbol, in the time period, corresponding to the first port.

Optionally, when determining the channel parameter of each of the subcarrier sets, corresponding to the time symbol corresponding to the first port, except the first subcarrier set, the processing unit 1703 is specifically configured to:

determine, based on the channel parameter of the subcarrier set to which each subcarrier that is in the subcarrier group and that is corresponding to the first time symbol corresponding to the first port belongs and based on a channel parameter of the first subcarrier set to which a subcarrier corresponding to a third time symbol corresponding to the first port belongs, a channel parameter of a second subcarrier set corresponding to the third time symbol corresponding to the first port, where the third time symbol is any time symbol in the time period other than the first time symbol, and the second subcarrier set is any subcarrier set that is other than the first subcarrier set and that is corresponding to the third time symbol; and when determining the channel parameter of the second subcarrier set corresponding to the third time symbol corresponding to the first port, the processing unit 1703 is specifically configured to:

multiply a channel parameter of the second subcarrier set corresponding to the first time symbol corresponding to the first port by the channel parameter of the first subcarrier set corresponding to the third time symbol corresponding to the first port, and divide an obtained multiplication result by a channel parameter of the first subcarrier set corresponding to the first time symbol corresponding to the first port, to obtain the channel parameter of the second subcarrier set corresponding to the third time symbol corresponding to the first port.

According to the receiving device provided in this embodiment of the present disclosure, the transmitting device sends, on the resources indicated by the configuration information of the reference signals for the plurality of ports, the reference signals corresponding to the plurality of ports; and the receiving device receives, on the resources, the reference signals corresponding to the plurality of ports that are sent by the transmitting device, and determines the channel parameter of each of the plurality of ports based on the received reference signals. The configuration information includes: in time domain, the location of the first time symbol; and in frequency domain, the location of each subcarrier that is in the subcarrier group within the specified bandwidth range and that is corresponding to the first time symbol corresponding to each port, and the location of the subcarrier that is within the bandwidth range and that is corresponding to each of time symbols, corresponding to each port and in the time period occupied by the resources, except the first time symbol. It can be learnt from the configuration information that one reference signal group is configured in the first time symbol corresponding to each port and one reference signal is configured in each of time symbols, corresponding to each port, except the first time symbol. Compared with the prior art in which at least one reference signal is configured in each OFDM symbol corresponding to each subband corresponding to each port, in the method according to this embodiment of the present disclosure, on the premise that the receiving device can obtain the channel parameter of each of the plurality of ports, overheads of resources occupied by transmitted reference signals in the communications system can be reduced, so that service data transmission efficiency is improved.

It should be noted that the unit division in the embodiments of the present disclosure is an example, and is merely logical function division and may be other division in actual implementation. Functional units in the embodiments of this application may be integrated into one processing unit, each of the units may exist alone physically, or at least two units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer readable storage medium. Based on such an understanding, the technical solutions of this application essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 18:
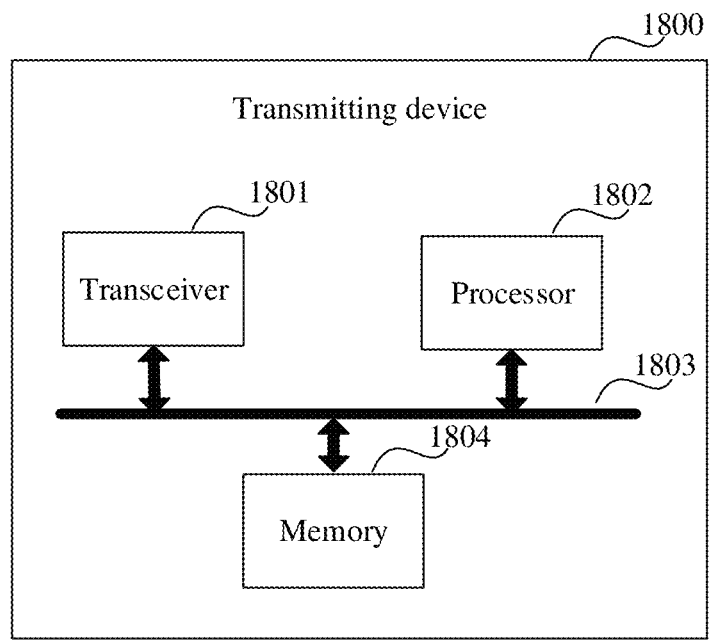
FIG. 18 is a structural diagram of a transmitting device according to an embodiment of the present disclosure.

Based on the foregoing embodiment, an embodiment of the present disclosure further provides a transmitting device, where the transmitting device is applied to a communications system, and the transmitting device can implement the reference signal transmission method shown in FIG. 3 and has functions of the transmitting device 1400 shown in FIG. 14. Referring to FIG. 18, the transmitting device 1800 includes a transceiver 1801, a processor 1802, a bus 1803, and a memory 1804, where the transceiver 1801, the processor 1802, and the memory 1804 are connected to each other by using the bus 1803. The bus 1803 may be a Peripheral Component Interconnect (PCI) bus, an Extended Industry Standard Architecture (EISA) bus, or the like. The bus may be divided into an address bus, a data bus, a control bus, and the like. For ease of representation, the bus is represented by using only one bold line in FIG. 18, which, however, does not mean that there is only one bus or one type of bus.

The transceiver 1801 is configured to perform communication interaction with another device in the communications system.

The processor 1802 is configured to implement the reference signal transmission method shown in FIG. 3, including:

obtaining configuration information of a reference signal for a first port of the transmitting device, where the configuration information is used to indicate a location of a resource occupied by the reference signal corresponding to the first port; the configuration information includes: in time domain, a location of a first time symbol; and in frequency domain, a location of each subcarrier that is in a subcarrier group within a specified bandwidth range and that is corresponding to the first time symbol, and a location of a subcarrier that is within the bandwidth range and that is corresponding to each of time symbols, in a time period occupied by the resource, except the first time symbol; the subcarrier group includes a plurality of subcarriers; the bandwidth range is configured by the transmitting device; and the bandwidth range includes a plurality of subcarriers; and sending, on the resource indicated by the configuration information, the reference signal corresponding to the first port.

The memory 1804 is configured to store a program and the like. Specifically, the program may include program code, where the program code includes a computer operation instruction. The memory 1804 may include a random access memory (RAM), and may further include a non-volatile memory, for example, at least one magnetic disk memory. The processor 1802 performs an application program stored in the memory 1804, to implement the foregoing functions, thereby implementing the reference signal transmission method shown in FIG. 3.

According to the transmitting device provided in this embodiment of the present disclosure, the transmitting device sends, on the resource indicated by the configuration information of the reference signal for the first port, the reference signal corresponding to the first port; and a receiving device receives, on the resource, the reference signal corresponding to the first port that is sent by the transmitting device, and determines a channel parameter of the first port based on the received reference signal. The configuration information includes: in time domain, the location of the first time symbol; and in frequency domain, the location of each subcarrier that is in the subcarrier group within the specified bandwidth range and that is corresponding to the first time symbol, and the location of the subcarrier that is within the bandwidth range and that is corresponding to each of time symbols, in the time period occupied by the resource, except the first time symbol. It can be learnt from the configuration information that one reference signal group is configured in the first time symbol and one reference signal is configured in each of time symbols except the first time symbol. Compared with the prior art in which at least one reference signal is configured in each OFDM symbol corresponding to each subband, in the method according to this embodiment of the present disclosure, on the premise that the receiving device can obtain the channel parameter of the first port, overheads of resources occupied by transmitted reference signals in the communications system can be reduced, so that service data transmission efficiency is improved.

Figure 19:
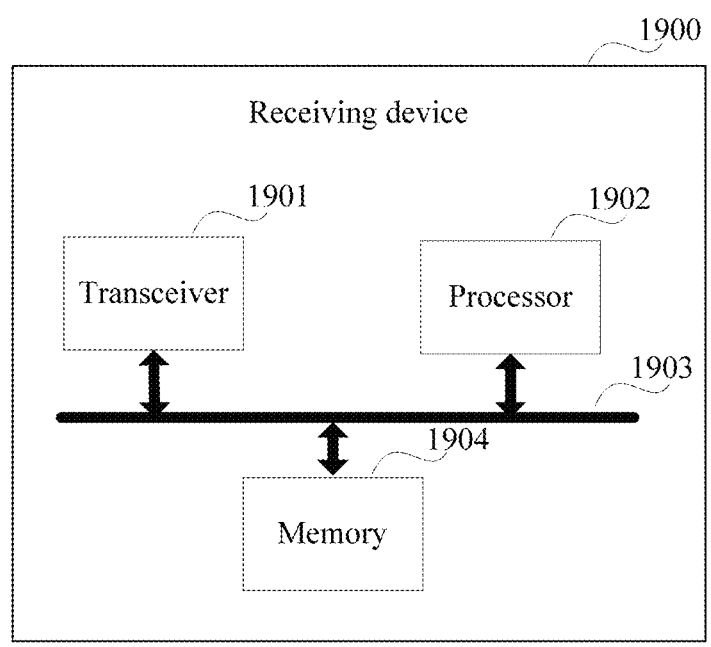
FIG. 19 is a structural diagram of a receiving device according to an embodiment of the present disclosure.

Based on the foregoing embodiment, an embodiment of the present disclosure further provides a receiving device, where the receiving device is applied to a communications system, and the communications system further includes the transmitting device shown in FIG. 18. The receiving device can implement the reference signal transmission method shown in FIG. 7 and has functions of the receiving device 1500 shown in FIG. 15. Referring to FIG. 19, the receiving device 1900 includes a transceiver 1901, a processor 1902, a bus 1903, and a memory 1904, where the transceiver 1901, the processor 1902, and the memory 1904 are connected to each other by using the bus 1903. The bus 1903 may be a Peripheral Component Interconnect (PCI) bus, an Extended Industry Standard Architecture (EISA) bus, or the like. The bus may be divided into an address bus, a data bus, a control bus, and the like. For ease of representation, the bus is represented by using only one bold line in FIG. 19, which, however, does not mean that there is only one bus or one type of bus.

The transceiver 1901 is configured to perform communication interaction with another device in the communications system.

The processor 1902 is configured to implement the reference signal transmission method shown in FIG. 7, including:

obtaining scheduling information of the transmitting device, where the scheduling information includes a port number l of a first port and a bandwidth range configured by the transmitting device, and the bandwidth range includes a plurality of subcarriers;

obtaining configuration information of a reference signal for the first port based on the scheduling information, where the configuration information is used to indicate a location of a resource occupied by the reference signal corresponding to the first port; the configuration information includes: in time domain, a location of a first time symbol; and in frequency domain, a location of each subcarrier that is in a subcarrier group within the bandwidth range and that is corresponding to the first time symbol, and a location of a subcarrier that is within the bandwidth range and that is corresponding to each of time symbols, in a time period occupied by the resource, except the first time symbol; and a subcarrier group corresponding to the first time symbol corresponding to each port includes a plurality of subcarriers;

receiving, on the resource, the reference signal corresponding to the first port that is sent by the transmitting device;

performing channel estimation based on a reference signal received on each subcarrier that is in the subcarrier group and that is corresponding to the first time symbol, and determining a channel parameter of each subcarrier that is in the subcarrier group and that is corresponding to the first time symbol; and performing channel estimation based on a reference signal received on the subcarrier that is within the bandwidth range and that is corresponding to each of the other time symbols, and determining a channel parameter of the subcarrier corresponding to each of the other time symbols; and determining a channel parameter of the first port based on the channel parameter of each subcarrier that is in the subcarrier group and that is corresponding to the first time symbol and based on the channel parameter of the subcarrier corresponding to each of the other time symbols.

The memory 1904 is configured to store a program and the like. Specifically, the program may include program code, where the program code includes a computer operation instruction. The memory 1904 may include a random access memory (RAM), and may further include a non-volatile memory, for example, at least one magnetic disk memory. The processor 1902 performs an application program stored in the memory 1904, to implement the foregoing functions, thereby implementing the reference signal transmission method shown in FIG. 7.

According to the receiving device provided in this embodiment of the present disclosure, the transmitting device sends, on the resource indicated by the configuration information of the reference signal for the first port, the reference signal corresponding to the first port; and the receiving device receives, on the resource, the reference signal corresponding to the first port that is sent by the transmitting device, and determines the channel parameter of the first port based on the received reference signal. The configuration information includes: in time domain, the location of the first time symbol; and in frequency domain, the location of each subcarrier that is in the subcarrier group within the specified bandwidth range and that is corresponding to the first time symbol, and the location of the subcarrier that is within the bandwidth range and that is corresponding to each of time symbols, in the time period occupied by the resource, except the first time symbol. It can be learnt from the configuration information that one reference signal group is configured in the first time symbol and one reference signal is configured in each of time symbols except the first time symbol. Compared with the prior art in which at least one reference signal is configured in each OFDM symbol corresponding to each subband, in the method according to this embodiment of the present disclosure, on the premise that the receiving device can obtain the channel parameter of the first port, overheads of resources occupied by transmitted reference signals in the communications system can be reduced, so that service data transmission efficiency is improved.

Figure 20:
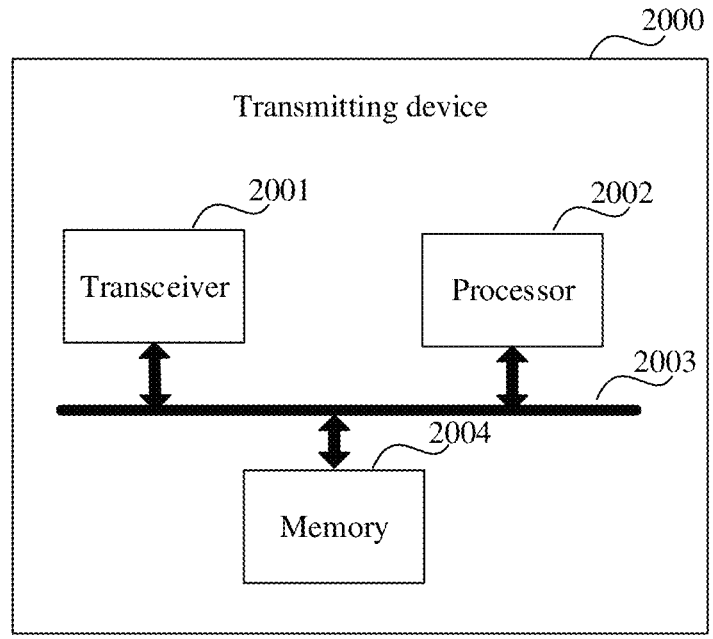
FIG. 20 is a structural diagram of another transmitting device according to an embodiment of the present disclosure.

Based on the foregoing embodiment, an embodiment of the present disclosure further provides a transmitting device, where the transmitting device is applied to a communications system, and the transmitting device can implement the reference signal transmission method shown in FIG. 8 and has functions of the transmitting device 1600 shown in FIG. 16. Referring to FIG. 20, the transmitting device 2000 includes a transceiver 2001, a processor 2002, a bus 2003, and a memory 2004, where the transceiver 2001, the processor 2002, and the memory 2004 are connected to each other by using the bus 2003. The bus 2003 may be a Peripheral Component Interconnect (PCI) bus, an Extended Industry Standard Architecture (EISA) bus, or the like. The bus may be divided into an address bus, a data bus, a control bus, and the like. For ease of representation, the bus is represented by using only one bold line in FIG. 20, which, however, does not mean that there is only one bus or one type of bus.

The transceiver 2001 is configured to perform communication interaction with another device in the communications system.

The processor 2002 is configured to implement the reference signal transmission method shown in FIG. 8, including:

obtaining configuration information for a plurality of ports of the transmitting device, where the configuration information is used to indicate locations of resources occupied by reference signals corresponding to the plurality of ports; the configuration information includes: in time domain, a location of a first time symbol; and in frequency domain, a location of each subcarrier that is in a subcarrier group within a specified bandwidth range and that is corresponding to the first time symbol corresponding to each port, and a location of a subcarrier that is within the bandwidth range and that is corresponding to each of time symbols, corresponding to each port and in a time period occupied by the resources, except the first time symbol; the subcarrier group includes a plurality of subcarriers; the bandwidth range is configured by the transmitting device; and the bandwidth range includes a plurality of subcarriers; and sending, on the resources that are indicated by the configuration information and that are occupied by the reference signals corresponding to the plurality of ports, the reference signals corresponding to the plurality of ports.

The memory 2004 is configured to store a program and the like. Specifically, the program may include program code, where the program code includes a computer operation instruction. The memory 2004 may include a random access memory (RAM), and may further include a non-volatile memory, for example, at least one magnetic disk memory. The processor 2002 performs an application program stored in the memory 2004, to implement the foregoing functions, thereby implementing the reference signal transmission method shown in FIG. 8.

According to the transmitting device provided in this embodiment of the present disclosure, the transmitting device sends, on the resources indicated by the configuration information of the reference signals for the plurality of ports, the reference signals corresponding to the plurality of ports; and a receiving device receives, on the resources, the reference signals corresponding to the plurality of ports that are sent by the transmitting device, and determines a channel parameter of each of the plurality of ports based on the received reference signals. The configuration information includes: in time domain, the location of the first time symbol; and in frequency domain, the location of each subcarrier that is in the subcarrier group within the specified bandwidth range and that is corresponding to the first time symbol corresponding to each port, and the location of the subcarrier that is within the bandwidth range and that is corresponding to each of time symbols, corresponding to each port and in the time period occupied by the resources, except the first time symbol. It can be learnt from the configuration information that one reference signal group is configured in the first time symbol corresponding to each port and one reference signal is configured in each of time symbols, corresponding to each port, except the first time symbol. Compared with the prior art in which at least one reference signal is configured in each OFDM symbol corresponding to each subband corresponding to each port, in the method according to this embodiment of the present disclosure, on the premise that the receiving device can obtain the channel parameter of each of the plurality of ports, overheads of resources occupied by transmitted reference signals in the communications system can be reduced, so that service data transmission efficiency is improved.

Figure 21:
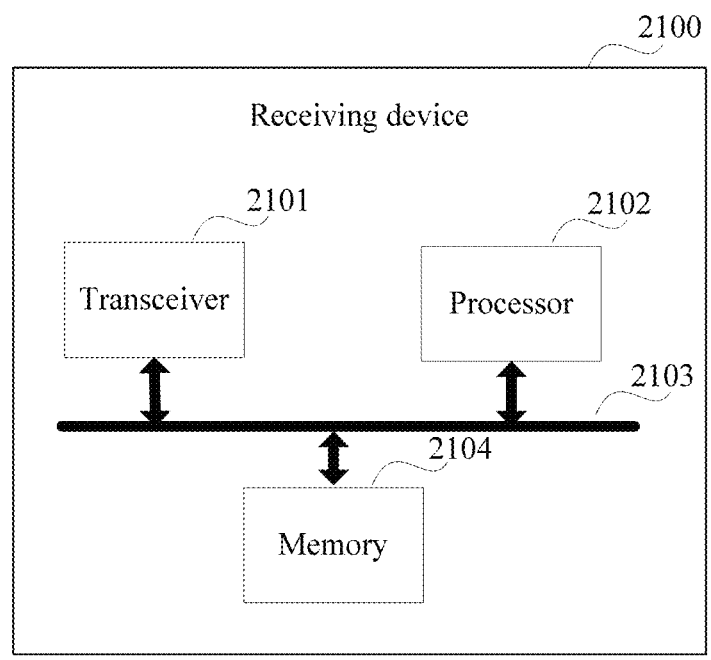
FIG. 21 is a structural diagram of another receiving device according to an embodiment of the present disclosure.

Based on the foregoing embodiment, an embodiment of the present disclosure further provides a receiving device, where the receiving device is applied to a communications system, the communications system further includes the transmitting device 2000 shown in FIG. 20, and the receiving device can implement the reference signal transmission method shown in FIG. 13 and has functions of the receiving device 1700 shown in FIG. 17. Referring to FIG. 21, the receiving device 2100 includes a transceiver 2101, a processor 2102, a bus 2103, and a memory 2104, where the transceiver 2101, the processor 2102, and the memory 2104 are connected to each other by using the bus 2103. The bus 2103 may be a Peripheral Component Interconnect (PCI) bus, an Extended Industry Standard Architecture (EISA) bus, or the like. The bus may be divided into an address bus, a data bus, a control bus, and the like. For ease of representation, the bus is represented by using only one bold line in FIG. 21, which, however, does not mean that there is only one bus or one type of bus.

The transceiver 2101 is configured to perform communication interaction with another device in the communications system.

The processor 2102 is configured to implement the reference signal transmission method shown in FIG. 13, including:

obtaining scheduling information of the transmitting device, where the scheduling information includes a port number of each of a plurality of ports and a bandwidth range configured by the transmitting device, and the bandwidth range includes a plurality of subcarriers;

obtaining configuration information of reference signals for the plurality of ports based on the scheduling information, where the configuration information is used to indicate locations of resources occupied by the reference signals corresponding to the plurality of ports; the configuration information includes: in time domain, a location of a first time symbol; and in frequency domain, a location of each subcarrier that is in a subcarrier group within the bandwidth range and that is corresponding to the first time symbol corresponding to each port, and a location of a subcarrier that is within the bandwidth range and that is corresponding to each of time symbols, corresponding to each port and in a time period occupied by the resources, except the first time symbol; and the subcarrier group corresponding to the first time symbol corresponding to each port includes a plurality of subcarriers;

receiving, on the resources, the reference signals corresponding to the plurality of ports that are sent by the transmitting device;

performing channel estimation based on a reference signal received on each subcarrier that is in the subcarrier group and that is corresponding to the first time symbol corresponding to each port, and determining a channel parameter of each subcarrier that is in the subcarrier group and that is corresponding to the first time symbol corresponding to each port; and performing channel estimation based on a reference signal received on the subcarrier that is within the bandwidth range and that is corresponding to each of the other time symbols corresponding to each port, and determining a channel parameter of the subcarrier corresponding to each of the other time symbols corresponding to each port; and determining a channel parameter of each of the plurality of ports based on the channel parameter of each subcarrier that is in the subcarrier group and that is corresponding to the first time symbol corresponding to each port and based on the channel parameter of the subcarrier corresponding to each of the other time symbols corresponding to each port.

The memory 2104 is configured to store a program and the like. Specifically, the program may include program code, where the program code includes a computer operation instruction. The memory 2104 may include a random access memory (RAM), and may further include a non-volatile memory, for example, at least one magnetic disk memory. The processor 2102 performs an application program stored in the memory 2104, to implement the foregoing functions, thereby implementing the reference signal transmission method shown in FIG. 13.

According to the receiving device provided in this embodiment of the present disclosure, the transmitting device sends, on the resources indicated by the configuration information of the reference signals for the plurality of ports, the reference signals corresponding to the plurality of ports; and the receiving device receives, on the resources, the reference signals corresponding to the plurality of ports that are sent by the transmitting device, and determines the channel parameter of each of the plurality of ports based on the received reference signals. The configuration information includes: in time domain, the location of the first time symbol; and in frequency domain, the location of each subcarrier that is in the subcarrier group within the specified bandwidth range and that is corresponding to the first time symbol corresponding to each port, and the location of the subcarrier that is within the bandwidth range and that is corresponding to each of time symbols, corresponding to each port and in the time period occupied by the resources, except the first time symbol. It can be learnt from the configuration information that one reference signal group is configured in the first time symbol corresponding to each port and one reference signal is configured in each of time symbols, corresponding to each port, except the first time symbol. Compared with the prior art in which at least one reference signal is configured in each OFDM symbol corresponding to each subband corresponding to each port, in the method according to this embodiment of the present disclosure, on the premise that the receiving device can obtain the channel parameter of each of the plurality of ports, overheads of resources occupied by transmitted reference signals in the communications system can be reduced, so that service data transmission efficiency is improved.

Based on the foregoing embodiment, an embodiment of the present disclosure further provides a communications system, where the communications system includes a transmitting device and a receiving device. The transmitting device has functions of implementing operations of the transmitting device in the method instance shown in FIG. 3, and the receiving device has functions of implementing operations of the receiving device in the method instance shown in FIG. 7.

According to the communications system provided in this embodiment of the present disclosure, the transmitting device sends, on a resource indicated by configuration information of a reference signal for a first port, the reference signal corresponding to the first port; and the receiving device receives, on the resource, the reference signal corresponding to the first port that is sent by the transmitting device, and determines a channel parameter of the first port based on the received reference signal. The configuration information includes: in time domain, a location of a first time symbol; and in frequency domain, a location of each subcarrier that is in a subcarrier group within a specified bandwidth range and that is corresponding to the first time symbol, and a location of a subcarrier that is within the bandwidth range and that is corresponding to each of time symbols, in a time period occupied by the resource, except the first time symbol. It can be learnt from the configuration information that one reference signal group is configured in the first time symbol and one reference signal is configured in each of time symbols except the first time symbol. Compared with the prior art in which at least one reference signal is configured in each OFDM symbol corresponding to each subband, in the method according to this embodiment of the present disclosure, on the premise that the receiving device can obtain the channel parameter of the first port, overheads of resources occupied by transmitted reference signals in the communications system can be reduced, so that service data transmission efficiency is improved.

Based on the foregoing embodiment, an embodiment of the present disclosure further provides another communications system, where the communications system includes a transmitting device and a receiving device. The transmitting device has functions of implementing operations of the transmitting device in the method instance shown in FIG. 8, and the receiving device has functions of implementing operations of the receiving device in the method instance shown in FIG. 13.

According to the communications system provided in this embodiment of the present disclosure, the transmitting device sends, on resources indicated by configuration information of reference signals for a plurality of ports, the reference signals corresponding to the plurality of ports; and the receiving device receives, on the resources, the reference signals corresponding to the plurality of ports that are sent by the transmitting device, and determines a channel parameter of each of the plurality of ports based on the received reference signals. The configuration information includes: in time domain, a location of a first time symbol; and in frequency domain, a location of each subcarrier that is in a subcarrier group within a specified bandwidth range and that is corresponding to the first time symbol corresponding to each port, and a location of a subcarrier that is within the bandwidth range and that is corresponding to each of time symbols, corresponding to each port and in a time period occupied by the resources, except the first time symbol. It can be learnt from the configuration information that one reference signal group is configured in the first time symbol corresponding to each port and one reference signal is configured in each of time symbols, corresponding to each port, except the first time symbol. Compared with the prior art in which at least one reference signal is configured in each OFDM symbol corresponding to each subband corresponding to each port, in the method according to this embodiment of the present disclosure, on the premise that the receiving device can obtain the channel parameter of each of the plurality of ports, overheads of resources occupied by transmitted reference signals in the communications system can be reduced, so that service data transmission efficiency is improved.

In conclusion, according to the reference signal transmission method and the apparatus that are provided in the embodiments of the present disclosure, the transmitting device sends, on the resource indicated by the configuration information of the reference signal for the first port, the reference signal corresponding to the first port; and the receiving device receives, on the resource, the reference signal corresponding to the first port that is sent by the transmitting device, and determines the channel parameter of the first port based on the received reference signal. The configuration information includes: in time domain, the location of the first time symbol; and in frequency domain, the location of each subcarrier that is in the subcarrier group within the specified bandwidth range and that is corresponding to the first time symbol, and the location of the subcarrier that is within the bandwidth range and that is corresponding to each of time symbols, in the time period occupied by the resource, except the first time symbol. It can be learnt from the configuration information that one reference signal group is configured in the first time symbol and one reference signal is configured in each of time symbols except the first time symbol. Compared with the prior art in which at least one reference signal is configured in each OFDM symbol corresponding to each subband, in the method according to the embodiments of the present disclosure, on the premise that the receiving device can obtain the channel parameter of the first port, overheads of resources occupied by transmitted reference signals in the communications system can be reduced, so that service data transmission efficiency is improved.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a magnetic disk memory, a CD-ROM, and an optical memory) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Persons skilled in the art can make various modifications and variations to the embodiments of the present disclosure without departing from the spirit and scope of the embodiments of the present disclosure. The present disclosure is intended to cover these modifications and variations provided that they fall within the scope defined by the following claims and equivalent technologies of the present disclosure.

What is claimed is:

1. A device, comprising:
   a receiver, configured to:
      obtain scheduling information of a transmitting device, wherein the scheduling information comprises a port number of a first port and a bandwidth range configured by the transmitting device, and the bandwidth range comprises a plurality of subcarriers;
      obtain configuration information of a reference signal for the first port based on the scheduling information, wherein the configuration information is used to indicate a location of a resource occupied by the reference signal corresponding to the first port, wherein:
         the configuration information comprises: in time domain, a location of a first time symbol; and in frequency domain, a location of each subcarrier that is in a subcarrier group within the bandwidth range and that is corresponding to the first time symbol, and a location of a subcarrier that is within the bandwidth range and that is corresponding to each of time symbols, in a time period occupied by the resource, except the first time symbol, and
         a subcarrier group corresponding to the first time symbol corresponding to each port comprises a plurality of subcarriers; and
      receive, on the resource, the reference signal corresponding to the first port that is sent by the transmitting device; and
   a processor, configured to:
      perform channel estimation based on a reference signal received on each subcarrier that is in the subcarrier group and that is corresponding to the first time symbol, and determine a channel parameter of each subcarrier that is in the subcarrier group and that is corresponding to the first time symbol;
      perform channel estimation based on a reference signal received on the subcarrier that is within the bandwidth range and that is corresponding to each of the other time symbols, and determine a channel parameter of the subcarrier corresponding to each of the other time symbols; and
      determine a channel parameter of the first port based on the channel parameter of each subcarrier that is in the subcarrier group and that is corresponding to the first time symbol and based on the channel parameter of the subcarrier corresponding to each of the other time symbols;
   wherein the bandwidth range is divided into a plurality of subcarrier sets, a quantity of the plurality of subcarrier sets that are obtained by dividing the bandwidth range is the same as a quantity of subcarriers that are comprised in the subcarrier group and that are corresponding to the first time symbol, and each subcarrier set comprises one subcarrier that is in the subcarrier group and that is corresponding to the first time symbol; and
   wherein determining the channel parameter of the first port based on the channel parameter of each subcarrier that is in the subcarrier group and that is corresponding to the first time symbol and based on the channel parameter of the subcarrier corresponding to each of the other time symbols includes:
      using the channel parameter of each subcarrier that is in the subcarrier group and that is corresponding to the first time symbol, as a channel parameter of a subcarrier set to which each subcarrier that is in the subcarrier group and that is corresponding to the first time symbol belongs, and using the channel parameter of the subcarrier corresponding to each of the other time symbols, as a channel parameter of a first subcarrier set to which the subcarrier corresponding to each of the other time symbols belongs, wherein the subcarrier set is obtained by grouping the plurality of subcarriers within the bandwidth range, and each subcarrier set comprises one subcarrier that is in the subcarrier group and that is corresponding to the first time symbol;
      determining a channel parameter of each of subcarrier sets, corresponding to a time symbol, except the first subcarrier set based on the channel parameter of the subcarrier set to which each subcarrier that is in the subcarrier group and that is corresponding to the first time symbol belongs and based on the channel parameter of the first subcarrier set to which the subcarrier corresponding to each of the other time symbols belongs; and
      determining the channel parameter of the first port based on a channel parameter of each subcarrier set corresponding to each time symbol in the time period.

2. The device according to claim 1, wherein obtaining the location of the first time symbol includes:
   determining, based on a stored correspondence between a port number and a location of a time symbol, the location of the first time symbol corresponding to a port number of the first port.

3. The device according to claim 2, wherein obtaining the location of each subcarrier that is in the subcarrier group and that is corresponding to the first time symbol includes:
   determining, based on any one or a combination of the following: the port number of the first port, a timeslot number of the resource, a cell number of the transmitting device, and a device number of the device, the location of each subcarrier that is in the subcarrier group and that is corresponding to the first time symbol.

4. The device according to claim 2, wherein obtaining the location of each subcarrier that is in the subcarrier group and that is corresponding to the first time symbol includes:

determining, based on the port number of the first port or based on the port number of the first port and any one or a combination of the following: a timeslot number of the resource, a cell number of the transmitting device, and a device number of the device, the location of each subcarrier that is in the subcarrier group and that is corresponding to the first time symbol.

5. The device according to claim 1, wherein obtaining the location of the subcarrier that is within the bandwidth range and that is corresponding to each of the time symbols in the time period except the first time symbol includes:
determining, based on a port number of the first port and any one or a combination of the following: a location of a second time symbol in the time period, a timeslot number of the resource, a cell number of the transmitting device, and a device number of the device, a location of a subcarrier that is within the bandwidth range and that is corresponding to the second time symbol, wherein the second time symbol is any time symbol in the time period other than the first time symbol.

6. The device according to claim 1,
wherein determining the channel parameter of each of the subcarrier sets, corresponding to the time symbol, except the first subcarrier set, includes:
determining, based on the channel parameter of the subcarrier set to which each subcarrier that is in the subcarrier group and that is corresponding to the first time symbol belongs and based on a channel parameter of the first subcarrier set to which a subcarrier corresponding to a third time symbol belongs, a channel parameter of a second subcarrier set corresponding to the third time symbol, wherein the third time symbol is any time symbol in the time period other than the first time symbol, and the second subcarrier set is any subcarrier set that is other than the first subcarrier set and that is corresponding to the third time symbol; and
wherein determining the channel parameter of the second subcarrier set corresponding to the third time symbol, includes:
multiplying a channel parameter of the second subcarrier set corresponding to the first time symbol by the channel parameter of the first subcarrier set corresponding to the third time symbol, and dividing an obtained multiplication result by a channel parameter of the first subcarrier set corresponding to the first time symbol, to obtain the channel parameter of the second subcarrier set corresponding to the third time symbol.

7. The device according to claim 1, wherein the scheduling information further comprises a timeslot number of the resource and a cell number of the transmitting device, and obtaining the location of the first time symbol includes:
determining the location of the first time symbol based on any one or a combination of the following: a port number of the first port, a timeslot number of the resource, a cell number of the transmitting device, and a device number of the device.

* * * * *